US012730500B2

(12) United States Patent
Bowman et al.

(10) Patent No.: US 12,730,500 B2
(45) Date of Patent: *Sep. 8, 2026

(54) SYSTEMS AND METHODS FOR CONTROLLING SECONDARY DEVICES USING MIXED, VIRTUAL OR AUGMENTED REALITY

(71) Applicant: Light Wand LLC, Media, PA (US)

(72) Inventors: Chase Bowman, Media, PA (US); Seth Johnson, Pasadena, CA (US)

(73) Assignee: LIGHT WAND LLC, Media, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/267,523

(22) Filed: Jul. 12, 2025

(65) Prior Publication Data

US 2025/0341883 A1 Nov. 6, 2025

Related U.S. Application Data

(63) Continuation of application No. 18/766,651, filed on Jul. 9, 2024, now Pat. No. 12,386,416, which is a (Continued)

(51) Int. Cl.
*G06F 3/01* (2006.01)
*G06F 3/16* (2006.01)
(Continued)

(52) U.S. Cl.
CPC .............. *G06F 3/011* (2013.01); *G06F 3/017* (2013.01); *G06F 3/165* (2013.01); *G06T 19/006* (2013.01);
(Continued)

(58) Field of Classification Search
None
See application file for complete search history.

(56) References Cited

U.S. PATENT DOCUMENTS

2009/0300535 A1 12/2009 Skourup et al.
2014/0378222 A1 12/2014 Balakrishnan et al.
(Continued)

OTHER PUBLICATIONS

Patent Cooperation Treaty, International Search Report and Written Opinion, International PCT Application No. PCT/US2021/057837, dated Feb. 23, 2022, 16 pages.
(Continued)

*Primary Examiner* — Christopher J Kohlman
(74) *Attorney, Agent, or Firm* — Fenwick & West LLP

(57) ABSTRACT

Disclosed are embodiments for systems and methods for controlling secondary devices at fine scales using mixed, virtual and/or augmented reality. Examples of secondary devices may include those involved in lighting (i.e., light emitting diodes), sound, and the production of videos, film, and movies. In some embodiments, a system may include a server, mixed reality user device and secondary device communicatively coupled via a network. The server may be configured to generate a virtual object based on gestural data that is configured for display within a mixed reality environment. The server may also be configured to generate secondary device settings based on gestural data, where the secondary device settings may be used to control the operation of a secondary device.

16 Claims, 44 Drawing Sheets

Related U.S. Application Data continuation of application No. 18/198,040, filed on May 16, 2023, now Pat. No. 12,067,160, which is a continuation of application No. 17/517,976, filed on Nov. 3, 2021, now Pat. No. 11,669,155.

(60) Provisional application No. 63/108,900, filed on Nov. 3, 2020.

(51) Int. Cl.
*G06T 19/00* (2011.01)
*G02B 27/01* (2006.01)

(52) U.S. Cl.
CPC .... *G02B 2027/014* (2013.01); *G02B 27/0172* (2013.01)

(56) References Cited

U.S. PATENT DOCUMENTS

| | | | | |
|---|---|---|---|---|
| 2015/0012168 | A1 | 1/2015 | Kuklish et al. | |
| 2016/0274762 | A1 * | 9/2016 | Lopez | G06T 19/006 |
| 2017/0276494 | A1 | 9/2017 | Kusano et al. | |
| 2019/0005733 | A1 * | 1/2019 | Wehner | G06T 7/20 |
| 2020/0320965 | A1 | 10/2020 | Barbone et al. | |
| 2021/0201581 | A1 | 7/2021 | Xie et al. | |

OTHER PUBLICATIONS

United States Office Action, U.S. Appl. No. 17/517,976, Oct. 27, 2022, 30 pages.

United States Office Action, U.S. Appl. No. 18/198,040, Dec. 7, 2023, 16 pages.

* cited by examiner

SYSTEMS AND METHODS FOR CONTROLLING SECONDARY DEVICES USING MIXED, VIRTUAL OR AUGMENTED REALITY

PRIORITY

This application is a continuation of U.S. patent application Ser. No. 18/766,651, filed Jul. 9, 2024, SYSTEMS AND METHODS FOR CONTROLLING SECONDARY DEVICES USING MIXED, VIRTUAL OR AUGMENTED REALITY, which is a continuation of U.S. patent application Ser. No. 18/198,040, now U.S. Pat. No. 12,067,160, filed May 16, 2023, SYSTEMS AND METHODS FOR CONTROLLING SECONDARY DEVICES USING MIXED, VIRTUAL OR AUGMENTED REALITY, which is a continuation of U.S. patent application Ser. No. 17/517,976, now U.S. Pat. No. 11,669,155, filed Nov. 3, 2021, entitled SYSTEMS AND METHODS FOR CONTROLLING SECONDARY DEVICES USING MIXED, VIRTUAL OR AUGMENTED REALITY, which claims priority to U.S. Provisional Application No. 63/108,900 filed on Nov. 3, 2020, entitled SYSTEMS AND METHODS FOR CONTROLLING SECONDARY DEVICES USING MIXED, VIRTUAL OR AUGMENTED REALITY, each of which is hereby incorporated by reference in its entirety.

TECHNICAL FIELD

The present disclosure is directed towards the control of secondary devices (e.g., light emitting diodes, audio speakers, digital audio workstations, cameras, camera control systems, drones, robots) using mixed, virtual, and/or augmented reality.

BACKGROUND

Augmented reality utilizes technology that superimposes a computer-generated image on a user's view of the real world, thus providing a composite view. Virtual reality includes simulated experiences that can be similar to or completely different from the real world. Mixed reality merges real and virtual worlds to produce new environments and visualizations, and allows for physical and digital objects to co-exist and interact in real time.

Augmented reality, virtual reality and mixed reality have commonly been used for video games, sport, military, medical training, fashion, education, and the like.

However, there remains a need for systems and methods capable of controlling secondary devices at fine scales using mixed, virtual, and/or augmented reality.

One area of application may include the lighting industry. For example, lighting is a critical component of all live concerts, theater, and the film, tv, and movie industry. Critically, lighting must be controlled in real-time, reliably, and responsive to any adjustments. As light emitting diodes (LED) lights are adopted in these industries, the LED lights may allow for more exacting control of the light parameters such as color and/or intensity. However, working with LED lights may also expand and complicate the parameters that need to be organized and executed in real time. Existing control systems for LED lights such as lighting desks (including mixing boards having sliders and knobs), tablets, and smart phone interfaces, may be limited in their ability to provide the finite tuning of lighting parameters such as color and/or intensity that is achievable with LED lights. Further, existing control systems may be counter-intuitive for user control, and delayed responses.

Another area of application may include the audio industry. For example, controls for audio tracks may require precise control for mixing.

Another area of application may include video, film, and movie production processes which may involve devices such as cameras, drones, and robots.

SUMMARY

The present disclosure includes embodiments for systems and methods for controlling secondary devices at fine scales using mixed, virtual and/or augmented reality. Examples of secondary devices may include those involved in lighting, sound, and camera.

In some embodiments, a system for controlling the operation of a secondary device in a mixed reality environment includes a server that has at least one processor programmed to: receive user positional data from a mixed reality user device; determine gestural data based on the user positional data; generate a virtual object corresponding to the generated gestural data; generate secondary device settings for a secondary device communicatively coupled to the server via the network; cause the mixed reality user device to display the virtual object; and transmit the secondary device settings to the secondary device to effectuate a change in a configuration of the secondary device.

Optionally, the secondary device includes a light emitting diode. Optionally, the secondary device settings include at least one of color, brightness, hue, saturation, luminosity, focus, ultraviolet channel, strobe, red channel, blue channel, green channel, white channel, amber channel, pan, tilt, roll, movement on x, y, and z vectors of physical space, magnetometer, ambient light, heat, and intensity. Optionally, the secondary device includes a digital audio workstation. Optionally, the secondary device settings include at least one of tracks, volume, gain, pan, wet, dry, frequency, pitch, tempo, clip trigger, clip stop, quantization, send volume, trigger a scene, delay feedback, looper feedback, clip and effecting triggering, and routing levels. The processor may be programmed to: receive second user positional data from the mixed reality user device, wherein the second user positional data indicates a user requested adjustment to the virtual object; determine adjustment gestural data corresponding to the received second user positional data; regenerate the virtual object to correspond to the adjustment gestural data; transmit the regenerated virtual object to the mixed reality user device for display; regenerate secondary device settings for the secondary device based on the adjustment gestural data; and update the secondary device based on the regenerated secondary device settings. Optionally, the processor is programmed to: generate one or more pre-configured virtual objects for display by the mixed reality user device, wherein each of the pre-configured virtual objects corresponds to a parameter of the secondary device; and update the secondary device based on the parameter corresponding to the pre-configured virtual object responsive to the virtual object interacting with the one or more pre-configured virtual objects in a mixed reality environment generated by the mixed reality user device.

In some embodiments, a method for controlling the operation of a secondary device in a mixed reality environment, includes the steps of: receiving user positional data from a mixed reality user device; generating, at a server communicatively coupled to the mixed reality user device via a network, gestural data based on the user positional data;

generating a virtual object corresponding to the generated gestural data, wherein the virtual object is configured for display in the mixed reality environment; generating secondary device settings for a secondary device communicatively coupled to the server via the network; transmitting the generated virtual object to the mixed reality user device; and transmitting the secondary device settings to the secondary device to effectuate a change in the settings of the secondary device.

Optionally, the method may also include the steps of: receiving second user positional data from the mixed reality user device, wherein the second user positional data indicates a user requested adjustment to the virtual object; determining adjustment gestural data corresponding to the received second user positional data; regenerating the virtual object to correspond to the adjustment gestural data; transmitting the regenerated virtual object to the mixed reality user device for display; regenerating secondary device settings for the secondary device based on the adjustment gestural data; and updating the secondary device based on the regenerated secondary device settings. Further, the method may include the step of generating a confirmation virtual object for display by the mixed reality user device responsive to the secondary device settings being applied to the secondary device. Still further, the method may include the steps of: generating one or more pre-configured virtual objects for display by the mixed reality user device, wherein each of the pre-configured virtual objects corresponds to a parameter of the secondary device; and updating the secondary device based on the parameter corresponding to the pre-configured virtual object responsive to the virtual object interacting with the one or more pre-configured virtual objects in a mixed reality environment generated by the mixed reality user device.

In some embodiments, a system may include a server having at least one processor programmed to: receive user positional data from a mixed reality user device; determine gestural data based on the user positional data; generate a virtual object corresponding to the generated gestural data; generate secondary device settings for a secondary device communicatively coupled to the server via a network; cause the mixed reality user device to display the virtual object; and transmit the secondary device settings to the secondary device to effectuate a change in a configuration of the secondary device. The system may also include a mixed reality user device having: a sensor configured to determine user positional data; and a display configured to generate a mixed reality environment including the virtual object. And the secondary device may be configured to receive secondary device settings from the server and update a configuration of the secondary device. Optionally, the secondary device may include at least one of a light emitting diode, and a digital audio workstation, camera controls, robotic camera movement system, or drone. Examples of secondary device settings include, but are not limited to, at least one of color, brightness, hue, saturation, luminosity, focus, ultraviolet channel, strobe, red channel, blue channel, green channel, white channel, amber channel, movement of the camera or camera support system such as a modular dolly on the x, y, or z axis, movement of a drone on these axis, pan, tilt, roll, magnetometer, ambient light, heat, intensity, tracks, volume, gain, pan, wet, dry, frequency, pitch, tempo, clip trigger, clip stop, quantization, send volume, trigger a scene, delay feedback, looper feedback, clip and effecting triggering, and routing levels, focus plane, iris control. Further, the server may be configured to: receive second user positional data from the mixed reality user device, wherein the second user positional data indicates a user requested adjustment to the virtual object; determine adjustment gestural data corresponding to the received second user positional data; regenerate the virtual object to correspond to the adjustment gestural data; transmit the regenerated virtual object to the mixed reality user device for display; regenerate secondary device settings for the secondary device based on the adjustment gestural data; and update the secondary device based on the regenerated secondary device settings. Optionally, the server may be configured to: generate one or more pre-configured virtual objects for display by the mixed reality user device, where each of the pre-configured virtual objects corresponds to a parameter of the secondary device; and update the secondary device based on the parameter corresponding to the pre-configured virtual object responsive to the virtual object interacting with the one or more pre-configured virtual objects in a mixed reality environment generated by the mixed reality user device. Further, the server may be configured to: generate a confirmation virtual object for display by the mixed reality user device responsive to the secondary device settings being applied to the secondary device. The server may also be configured to update the secondary device via transmitting at least one of an open sound control (OSC), digital multiplex (DMX), remote device management (RDM), or musical instrument digital interface (MIDI) file to the secondary device. Optionally, the mixed reality environment may include at least one of an image from the real-world environment of a user of the mixed reality device, a virtual representation of real-world objects from the real-world environment of the user and virtual objects generated by the server. Optionally, the mixed reality device comprises a head-mounted display device.

FIGURES

The present disclosure, as well as additional objects and advantages thereof, will best be understood when the following detailed description is read in connection with the accompanying drawing, in which.

DETAILED DESCRIPTION

The present disclosure is directed to systems and methods for a mixed reality device and environment, where a mixed reality device may be used to control one or more secondary devices (i.e., LED lights, audio controls, camera controls, drones, robotic camera systems and the like). For example, in some embodiments, one or more virtual images may be projected into a mixed reality environment and used to control one or more secondary devices. For example, in some embodiments, a virtual image may include a sphere, and manipulating the sphere may adjust one or more controls of an LED light, audio component, and/or combination thereof. In some embodiments, the virtual image may be controlled using hand gestures and the like. The disclosed embodiments may provide superior and finer resolution of control of the secondary device.

Further, embodiments of the present disclosure may provide a metaphor for physical object within a projected object in a mixed reality environment, allowing a user of the mixed reality device further control over projected objects, as well as secondary devices controlled by the projected objects.

Embodiments of the present disclosure may operate in a mixed reality environment which merges real worlds and virtual worlds, where a physical, real-world person and/or objects in physical, real-world scenes co-exist with virtual, computer-generated people and/or objects in real time. For example, a mixed reality environment can augment a physical, real-world scene and/or a physical, real-world person with computer-generated graphics in the physical, real-world scene viewed via a mixed reality display device.

Figure 1:
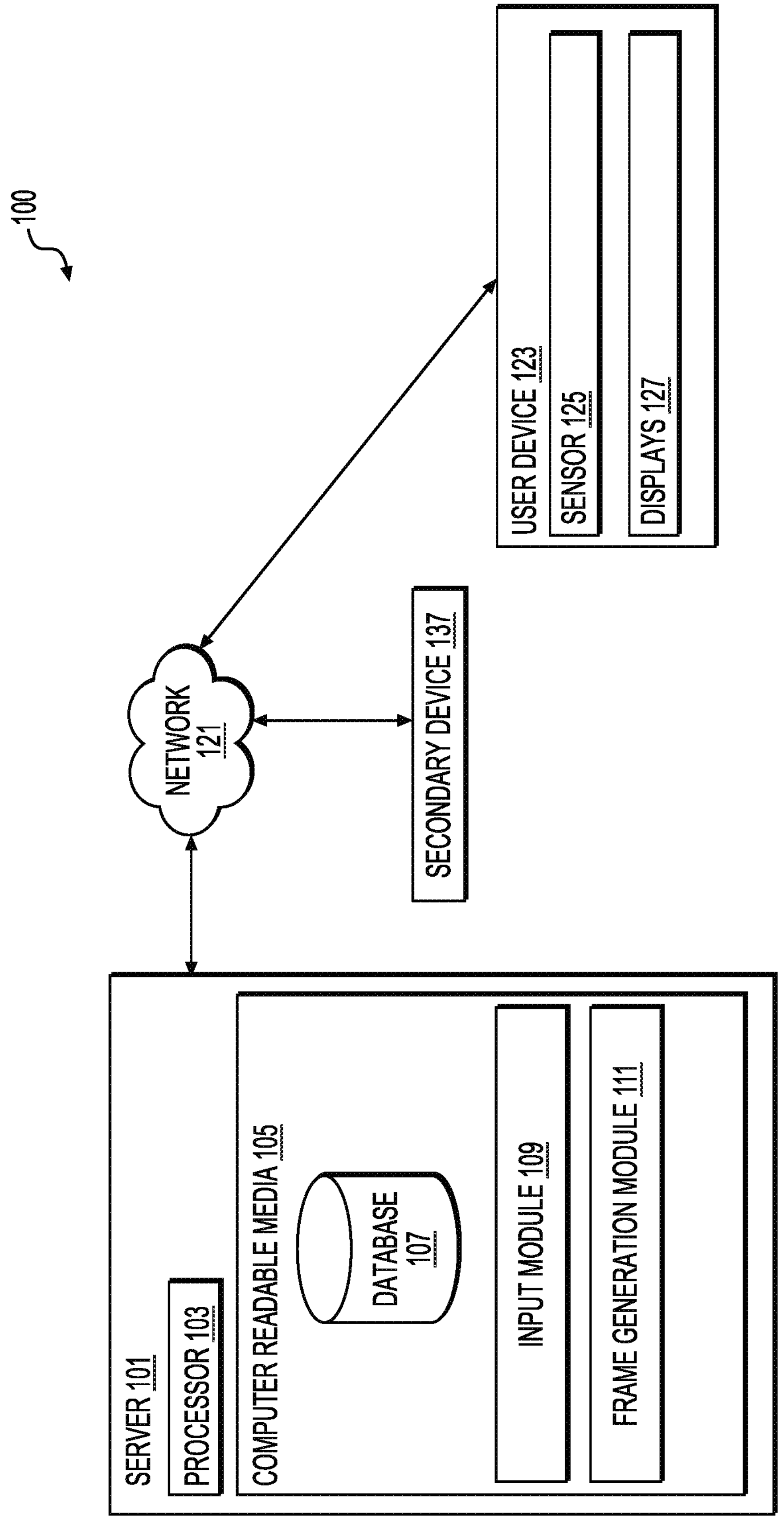
FIG. 1 illustrates a schematic diagram showing an example of a mixed reality system, in accordance with embodiments of the present disclosure.

FIG. 1 illustrates a schematic diagram showing an example of a mixed reality system 100, in accordance with embodiments of the present disclosure. For example, a mixed reality user device 123 may be communicatively coupled to a server 101 by way of a network 121. In some embodiments, the mixed reality user device 123 may be used in connection with the server 101 to control operation of a secondary device 137. The secondary device 137 may include a digital audio workstation, LED lights, camera controls, drones, robotic camera systems and the like.

Examples of the mixed reality user device 123 include an augmented reality, mixed reality, and/or virtual reality display device such as a wearable headset. In some embodiments, an augmented reality, mixed reality, and/or virtual reality display device or computing device may be used. Examples of augmented, mixed, and/or virtual reality display or computing devices include wearable headsets. Examples of these computing devices may include those implemented by Microsoft and their HoloLens product (A Trademark of Microsoft, Inc.), Oculus Rift VR (A Trademark of Facebook, Inc. by assignment), Sony's PlayStation VR (A Trademark of Sony, Inc.), HTC Vive (A Trademark of HTC, Inc.), Google Glass (A Trademark of Google, Inc.), Samsung's Gear VR (A Trademark of Samsung, Inc.), Razer's OSVR (A Trademark of Razer, Inc.) or Magic Leap One (A Trademark of Magic Leap, Inc.).

In some embodiments, the mixed reality user device 123 may include one or more sensors 125 and/or displays 127. In some embodiments, the user device 123 may be head mounted and include one or more sensors 125 and displays 127. The one or more sensors 125 may be used to reconstruct a real scene in which the user of the user device is physically located. For example, the sensors may be used to locate and track real people and/or objects within the real scene. Examples of sensors include, but are not limited to image cameras, stereoscopic cameras, depth sensors, color sensors, acoustic sensors, optical sensors, pattern sensors, gravity sensors and the like. Sensors may be configured to output streams of data in real time. Data streams may include moving image data and/or still image data (e.g., tracking data) representative of movement of real people and/or real objects in a real scene that is observable by the cameras and/or sensors. Additionally, the data can include depth data.

In some embodiments, the sensors 125 may be configured to recognize the position and distance between the hands of a user of the mixed reality user device 123. In some embodiments, the sensors may be part of a wearable mixed reality user device 123. Alternatively, in some embodiments, external sensors may be used in connection with the mixed reality user device 123. Additional sensors may be used to recognize objects in addition to a user's hands. For example, sensors may be embedded within the secondary device.

In some embodiments, the position and distance between the hands, limbs, or other body parts of a user of the mixed reality user device may be translated into gestural data. Positional data retrieved from the sensors 125 may be used to determine the position and velocity of knuckles, joints, wrists, and the like of a user making a gesture with the mixed reality user device 123. The positional and velocity data may be used to determine gestural data corresponding to poses. Example poses include fingers, pointing up and down, thumbs up and down, hands open (palm), hands in any position (facing up, down, back, left, right, and in between), back of the hands, fists (any orientation), and the like. Sensors may be used to determine gestural data based on measuring the distance between user hands in a pose, the relative angle between user hands in a pose, or the absolute angle determined between any use hand in a pose and the physical space. Additionally, sensors may be used to measure the velocity of movement for any gesture. Gestural data as obtained by the sensors, may include, but is not limited to the position, relative position, angles, and velocity of elements such as hands involved in a gesture. The gestural data may be obtained at high spatial and temporal resolutions (e.g., 1/10000 of a unit of spatial measurement and intervals of 90 updates per second). The gestural data may be converted into "floats" which may then be translated in accordance with the receiving protocols of secondary devices.

In some embodiments, sensors 125 may be configured to recognize virtual "flags" placed in physical space. Virtual "flags" may be placed in physical space to be shared with other users. For example, a user may mark a location within the physical space in the mixed reality environment using a virtual "flag." The "flag" may be viewable by multiple users in the mixed reality environment. The "flag" may be present in the physical space and/or mixed reality environment that is shared between multiple users and their respective wearable mixed reality user devices. The flag may be present for all users and remain the mixed reality space after a user has left. The wearable mixed reality user devices may be configured to calculate their relationship (e.g., distance) from the virtual flag. Additionally, virtual "flags" may be placed on a physical object (e.g., LED light). Virtual "flags" may be used to trigger real events such as camera movements, lighting cues, camera drone movement and the like. For example, when a virtual "flag" is triggered by a user (e.g., an actor or a prop), the camera and or lighting cue may be adjusted accordingly. In some embodiments, the placement of virtual "flags" may be saved a digital information that is incorporated into the file representing the virtual or mixed reality environment.

In some embodiments, the sensors 125 may be configured to be able to sense or detect color, texture (smoothness, roughness, porous, etc.), hue, albedo, brightness, fluorescence, transmissivity, reflectivity, size, volume, relative height, sound intensity or frequency, heat, temperature, magnetic field, electric field, gravitational field, radioactivity, resonance fields, kinematic (e.g., velocity, acceleration, rotation, etc.) vectors and/or magnitudes, and the like. Additional sensors may include gravitometers, magnetometers, radiometers, directional microphones, optical thermometers and the like.

In some embodiments, the user device 123 may be coupled with additional tracking devices. Tracking devices may include optical tracking devices, magnetic tracking devices, acoustic tracking devices, gyroscopic tracking devices, mechanical tracking devices, depth cameras, inertial sensors and the like. Tracking devices may be configured to determine streams of volumetric data corresponding a volume of space occupied by a body of a user, skeletal data corresponding to data used to approximate a skeleton and track the movement of a skeleton within an environment, perspective data corresponding to an outline of a body of a user, and the like. In some embodiments, body representations can be developed from at least one of volumetric data, skeletal data, and/or perspective data can be used to determine where to render virtual content in the 3D coordinate system corresponding to the real space or environment where the particular user is physically located.

In some embodiments, the mixed reality user device 123 may also include one or more displays 127 configured to present visual content to the user of the mixed reality user device 123. For example, the display 127 may present a spatial region that is coextensive with the user's actual field of vision, or a portion thereof. The display 127 may be transparent in that it allows a user of the user device to view the real scene where the user is located. The display 127 may be physically transparent, in that the user device 123 is optically see-through such that the user is able to see the real scene or environment where the user is physically present. The display 127 may be virtually see through, where a mounted camera on the user device 123 is used to provide a video image to the user of the environment where the user is physically present. Additionally, the display 127 may be configured to present virtual content to the user. In some embodiments, the virtual content may augment the real scene that is presented to the user. The virtual content may include virtual items generated by the server 101 and configured for display on the display component 127 of the user device 123.

The server 101 may include a processor 103, computer readable media 105 including a database 107 and input module 109. The server 101 may include one or more servers having a processor 103, and computer readable media 105 having memory. The server may receive data from users at input module 109 regarding the mixed reality environment and positional data regarding real world objects and user position within the environment, and data associated with virtual content items. The server may include a frame generation module 111 be further configured to generate frames for the mixed reality environment. The generated frames may include virtual content that is configured to be displayed in the mixed reality environment. Examples of generated frames may include instructions describing the position, geometry, viewpoint, texture, lighting, shading, etc. for a virtual content item. In some examples, the server 101 may send rendering data to user devices 123 via the network 121 and the user devices 123 can render the graphical representations via displays associated with the devices. The generated frames may then be transmitted from the server 101 to the user device 123 for display via displays 127.

In some embodiments, the system 100 may also include a service provider that is configured to manage frame generation, requests, and display across other devices. The service provider may be configured to synchronize communications between the server 101 and mixed reality user devices 123 such that virtual content items are displayed appropriately on one or more user mixed reality devices 123.

In some embodiments, the mixed reality user device 123 may be configured to receive confirmation from one or more secondary devices. The system 100 may include modules configured to communicate with devices including networking languages such as open sound control (OSC), digital multiplex (DMX), remote device management (RDM), and the like. In some embodiments, the system 100 may include modules configured to communicate with networking languages involved in robotics, and mechanical motion, such as RF Communication protocol. The disclosed mixed reality system may enable users in a mixed reality environment to interact with one another and with virtual content that is presented in the mixed reality environment. Such an environment may enable a single user in the mixed reality environment to interact with virtual content that is presented in the mixed reality environment. While a server 101, network 121, mixed reality user device 123, and secondary device 137 is illustrated in FIG. 1, it is envisioned that in some embodiments, the mixed reality system 100 may include one or more secondary devices 137, one or more mixed reality user devices 123 associated with one or more users, one or more networks 121, and/or one or more servers 101.

In some embodiments, network 121 may be any type of network 121 known in the art, such as the Internet. Moreover, the user devices 123 can communicatively couple to the networks 121 in any manner, such as by a global or local wired or wireless connection (e.g., local area network (LAN), intranet, Bluetooth, etc.). The networks 121 can facilitate communication between the server 101 and the devices 123 associated with the one or more users.

In some embodiments, the server 101 may include one or more computing devices, including, but not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Figure 2:
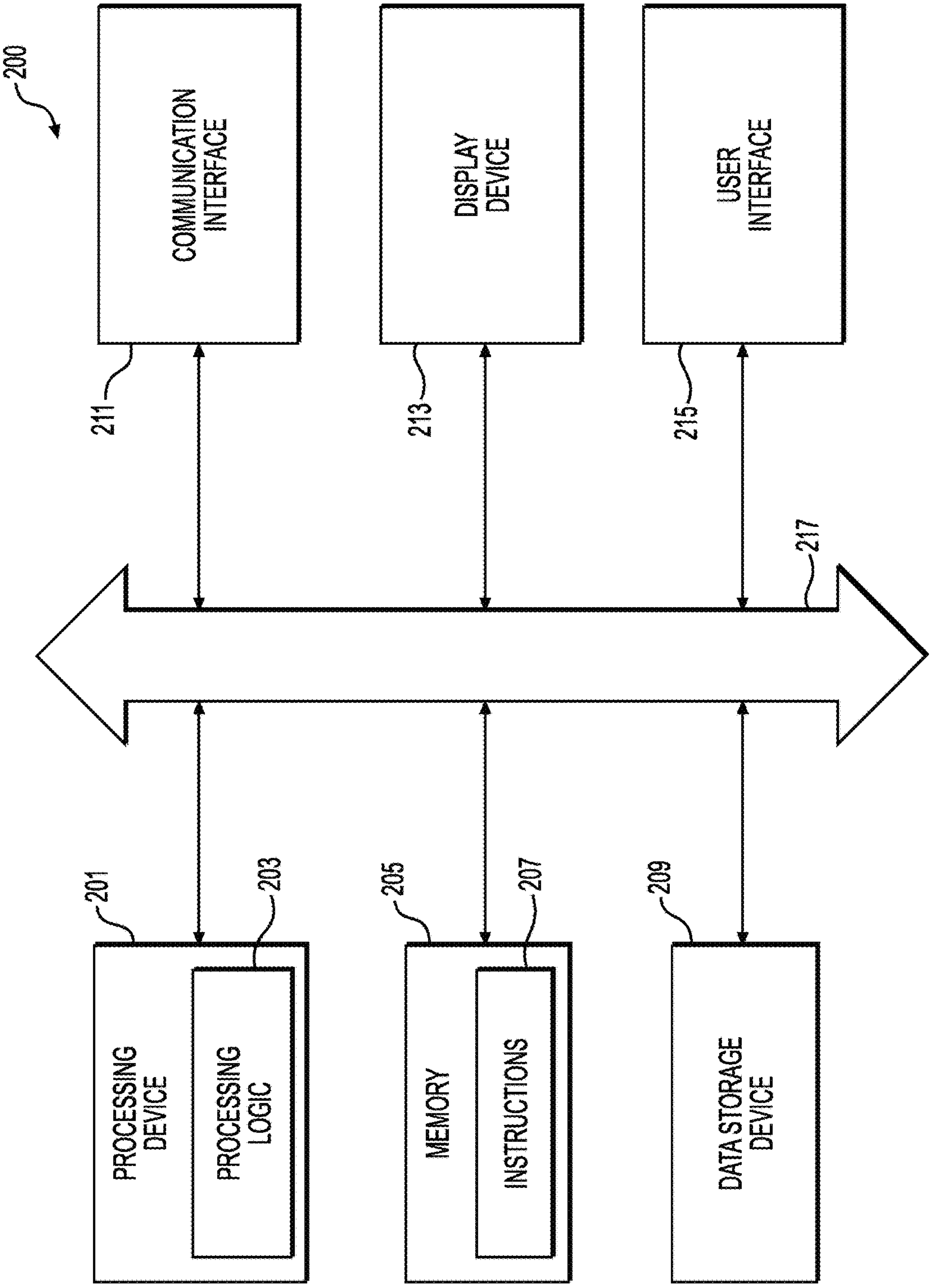
FIG. 2 illustrates a diagram of a computing device, in accordance with embodiments of the present disclosure.

FIG. 2 illustrates a functional block diagram of a machine in the example form of computer system 200, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the mixed reality user computing device 123, secondary device and/or the server 101 may be implemented by the example machine shown in FIG. 2 (or a combination of two or more of such machines).

Example computer system 200 may include processing device 201, memory 205, data storage device 209 and communication interface 211, which may communicate with each other via data and control bus 217. In some examples, computer system 200 may also include display device 213 and/or user interface 215.

Processing device 201 may include, without being limited to, a microprocessor, a central processing unit, an application specific integrated circuit (ASIC), a field programmable gate array (FPGA), a digital signal processor (DSP) and/or a network processor. Processing device 201 may be configured to execute processing logic 203 for performing the operations described herein. In general, processing device 201 may include any suitable special-purpose processing device specially programmed with processing logic 203 to perform the operations described herein.

Memory 205 may include, for example, without being limited to, at least one of a read-only memory (ROM), a random access memory (RAM), a flash memory, a dynamic RAM (DRAM) and a static RAM (SRAM), storing computer-readable instructions 207 executable by processing device 201. In general, memory 205 may include any suitable non-transitory computer readable storage medium storing computer-readable instructions 207 executable by processing device 201 for performing the operations described herein. Although one memory device 205 is illustrated in FIG. 2, in some examples, computer system 200 may include two or more memory devices (e.g., dynamic memory and static memory).

Computer system 200 may include communication interface device 211, for direct communication with other computers (including wired and/or wireless communication), and/or for communication with network 121 (see FIG. 1). In some examples, computer system 200 may include display device 213 (e.g., a liquid crystal display (LCD), a touch sensitive display, etc.). In some examples, computer system 200 may include user interface 215 (e.g., an alphanumeric input device, a cursor control device, etc.).

In some examples, computer system 200 may include data storage device 209 storing instructions (e.g., software) for performing any one or more of the functions described herein. Data storage device 249 may include any suitable non-transitory computer-readable storage medium, including, without being limited to, solid-state memories, optical media and magnetic media.

Figure 3:
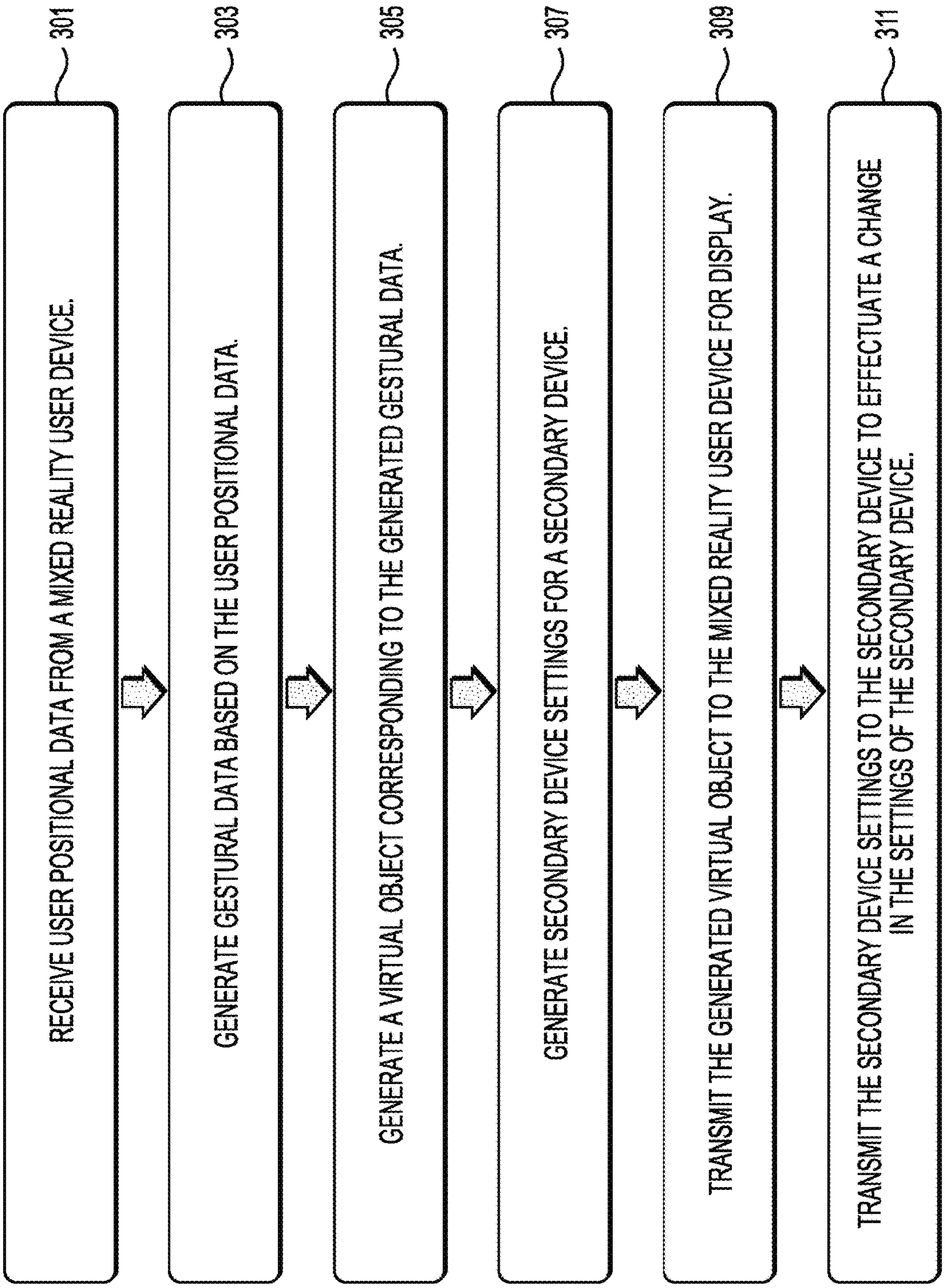
FIG. 3 is a schematic diagram showing an example of a method associated with a mixed reality environment wherein a user can interact with virtual content that is presented in the mixed reality environment, in accordance with embodiments of the present disclosure.

FIG. 3 illustrates a flowchart for a method built in accordance with the present disclosure. In some embodiments a method for controlling the operation of a secondary device in a mixed reality environment, may be performed at a server such as server 101 of FIG. 1. The method for controlling the operation of a secondary device may include the steps of receiving user positional data from a mixed reality user device 301, generating gestural data based on the user positional data 303, generating a virtual object corresponding to the generated gestural data 305, where the virtual object is configured for display in the mixed reality environment, generating secondary device settings for a secondary device communicatively coupled to the server via the network 307, transmitting the generated virtual object to the mixed reality user device 309 and transmitting the secondary device settings to the secondary device to effectuate a change in the settings of the secondary device 311.

Optionally, in some embodiments, after the settings of the secondary device 311 have been changed or modified, data may be transmitted from the secondary device 311 back to the mixed reality user device 301. In some embodiments, this data may include data in a format compatible with the secondary device 311 that is then converted back into a float format. The float format may then be applied to the virtual object. For example, after the settings of the secondary device 311 have been changed or modified, a signal sent back to the mixed reality user device 301 may result in the virtual object changing its color, or behavior.

For example, in some embodiments, the secondary device may include a camera and/or motorized dolly. In such an example, after the focal length and focus data is changed or modified such that a particular depth of field and frame is realized, a motorized dolly on which the camera sits may send data describing how far and in what direction it has moved to the mixed reality user device. The path of the motorized dolly may be presented as a virtual object within the mixed reality space.

In some embodiments, the determined secondary device settings may be stored in a database and may be capable of being retrieved and sent to the secondary device 311 at a later time. In this manner, for example, parameters and settings determined during a dress rehearsal may be recalled at a later time. The stored secondary device settings may be edited, modified, or saved, before being ultimately instated at the secondary device. In this manner, the disclosed systems may be used as a planning system, in addition to a performance and execution tool. For example, the disclosed system may be used as a planning system for a film shoot, stage production and the like.

In some embodiments, the user positional data received by the server system in step 301 may include user representation data from mixed reality user devices. In some embodiments, a user may use a mixed reality user device such as user device 123 of FIG. 1 to generate a mixed reality environment including representations of the physical environment that the user is located in, as well as virtual objects created by a server such as server 101 of FIG. 1. In some embodiments, the mixed reality user device may determine and track user positional data. For example, the mixed reality user device may track positions of the user, such as the user hands, or user hand joints. Based on the determined user positional data, the mixed reality device may then generate user representation data. For example, the mixed reality user device may use the user positional data which tracks the position of user hand joints and to generate a vector representation of each hand joint (e.g., forward, up, right). The user representation data which may include the vector representation of each hand joint may be combined with data from tracking devices and the like in forming user positional data that is then transmitted via the network from the mixed reality user device to a server system.

The server system may receive the user positional data, for example at an input module such as input module 109 of FIG. 1. The user positional data which may include directional vectors assigned to each joint may be compared against directional vectors assigned to other joints in order to generate gesture data as discussed in step 303. For example, the two angles may be compared to form gesture data. More particularly, the angle formed between the right index middle knuckle may be compared to the palm forward vector. The angles may be analyzed to determine whether the angles are within a range of degrees, and within a margin of error. If the angles exceed a margin of error additional user positional data may be used in its place.

The gesture data may correspond to a pre-defined hand poses. Examples of pre-defined hand poses include palms parallel, fist open, fist closed and the like. Further pre-defined hand poses include “open palms”, “fists clenched”, “index finger up”, “rock-on” pose (where the index finger and pinky up), “thumbs up”, and “peace” sign. All of the pre-defined hand poses can be done with the right or left hand independently for different input. For example, clenching only the left fist can have a different function than clenching only the right fist or clenching both fists.

In some embodiments, the gesture data may track the movement of other body parts such as fingers, hands, arms, and the whole body. Examples of gesture data may include the position of the hands including whether hands are visible (e.g., right hand only, left hand only, both hands, no hands), hand poses formed by each visible hand, which way a hand is facing relative to the user (as determined relative to a level floor and the user’s orientation), the pose and direction of both hands when they mirror each other, and the like.

Gestures or pre-defined hand poses may also include rotating poses. For example, the rotation of the hand in different poses can have different functions. For example, when a user rotates a single open palm hand it may correspond to a function such as switching the DMX channel that is being controlled. In the same example, one open palm parallel to the floor may be configured to activate the dimmer channel of a light (moving the hand up and down gave the light more or less intensity). In the same example, the user could then rotate the same hand 90 degrees (so that the palm is perpendicular to the floor) to activate a color value channel. Thus, the user can move the hand from right to left to change the color of the light.

Additionally, pre-defined hand poses may require the use of both of the user’s hands. For example, the user can use both hands for independent functions. For example, the user can control the dimmer of two different lights (both hands in open palm pose parallel to floor), or color of two different lights (both palms perpendicular to floor), control brightness of one light and color of another light (one palm parallel to floor, one hand perpendicular to floor), or control two functions of the same light (one light selected for both hands: one palm perpendicular, one palm parallel). In this manner, subtle relationship adjustments between lights may be achieved in an intuitive interactive manner between the user and the lights.

The pre-defined hand poses may then be able to modulate the generation and settings of a virtual or projected object, that will be configured for display within the mixed reality environment as illustrated in step 305. Further, the pre-defined hand poses may be used to construct signals that will control the operation of a secondary device such as secondary device 137 of FIG. 1. These signals may correspond to secondary device settings as illustrated in step 307 of FIG. 3. The generated virtual object may be transmitted from the sever back to the mixed reality user device at step 309. For example, the mixed reality user device may then be configured to display the virtual object within the mixed reality environment. Additionally, the server may be configured to transmit the generated secondary device settings to the secondary device to effectuate a change in the settings of the secondary device 311. For example, the secondary device settings may include control instructions for a digital audio workstation (DAW), physical audio mixing device, LED lighting, cameras, robots, robotic control systems, drones and the like. Alternatively, in some embodiments, the interface may be used to control a computerized mixing board with OSC reception. Additionally, or alternatively, the interface may be used to control secondary devices utilizing Artnet protocols over Wifi, sCAN protocols over Wifi, and/or CRMX (Lumens Radio).

In some embodiments, raw data from the sensors corresponding to the gestural data may include high resolution spatial positioning and velocity determinations. The raw data may then be translated into "floats" which may be formatted to conform with the specifications of the receiving protocols embedded in secondary devices (e.g., LED lights, drones, robots, cameras).

In some embodiments, generating a virtual object and/or secondary device settings based on the gestural data may include calculating a float representation element. For example, if it is determined that the user's hands are in a position corresponding to a pre-defined hand pose, the corresponding function for that hand pose is activated. For example, the distance between the two hands in the pre-defined hand pose may be calculated. The calculated distance between the two hands may be compared with a specified maximum distance, to generate a float representation (i.e., fractional or percentage value) that is used to control the secondary device. For example, if the maximum distance is set to 1, and the actual hand distance of the hands in the hand pose is 0.3, a float representation of 0.3 is determined, and used to control the brightness of a light at 30%.

For example, the float representation element that is generated by gestures may be converted to an open sound control (OSC) float values that are converted to float parameters of different 2D video plugins running in music software (e.g., Ableton or VJ software) and media server (e.g., Resolume Arena). The open sound control values may be used to change the settings and/or parameters of a secondary device such as a speaker, projector, and the like. Additionally, the float representation element may be used to adjust and/or generate a projected object that is displayed in the mixed reality environment. For example, a float corresponding to the distance between hands can scale a virtual projected two-dimensional graphic object for the effect that the gesture is growing and/or shrinking the virtual object.

In some embodiments, the float representation element may be converted into a digital multiplex (DMX) signal that is transmitted to a DMX channel. For example, the float representation element may be converted into a DMX integer proportional to the maximum value for the DMX channel.

In some embodiments, the float representation element may be used to generate open sound control (OSC) values that are then transmitted to a secondary device, such as one for audio control, or a digital audio workstation (DAW). Optionally, the OSC values may be converted at the audio control device into musical instrument digital interface (MIDI) messages and the like in order to trigger audio events. The audio events may then be output through an audio input/output device. In this manner audio may be produced that is then fed to speakers. Output can be a digital file as well as live speakers. In some embodiments, the interface manipulates the project file of the DAW to control live speakers or be converted to a digital audio file such as .wav, .aiff, .mp3, etc.

For example, a float representation of 0.29 determined by the gestural data may be passed to the OSC that is configured to receive a value between 0 to 1. In another example, (e.g., DMX, MIDI, sCAN, and Artnet) where the receiving secondary device is configured to receive a value between 0 and 255, the float representation of 0.29 will be scaled and converted over to a value compatible with the settings of the secondary device (e.g., 72.85=0.29*255).

In some embodiments the virtual object may correspond to a float wheel. And a user may traverse a plurality of virtual objects in order to select a pre-defined float wheels that can be used to change settings on a secondary device. Each float wheel may be matched to a different group of hardware parameters, for example, pre-sorted groups of lights, or different dimensions of control, such as movement. In some embodiments, a user may navigate through different float wheels using gestures such as fists. For example, with fists clenched, the distance between the user's hands travels through a menu of four different float wheels. When the user sees a float wheel they want to engage with, the user may open their fist to open palm position and select that new float wheel. In some embodiments, a plurality of float wheels may be associated with a single color (e.g., four float wheels with a color), and a user may be provided with multiple colors (e.g., white, blue, orange). Further, each float wheel may have a plurality of floats, or float representation elements (e.g., five). Accordingly, a user may be provided with enough floats to control a stage of LEDs or all the lights on a movie set.

In some embodiments, a virtual object such as a float wheel can be used to provide a user with a large amount of options for selecting parameters. Further, the virtual object may be configured to allow a user to quickly navigate across a plurality of parameters available for selection. For example, conventional systems may group selectable parameters such as floats along a physical (lighting or audio desk) or virtual 2D plane (mobile application, computer software). The floats may be arranged so that they are proximate sliders which are parallel to each other on the physical or virtual 2D plane. To move from one slider to another, a user may lift and move from one slide to the other. By contrast, in the systems and methods described herein, a user may intuitively and effortlessly transition between floats or selectable parameters by using a float wheel. A user may use complex gestures to navigate through a 3D virtual representation of data in the physical space in front of the user's body.

In one example, a float wheel may be used for control of audio. For example, audio control may be achieved by a user placing their hands to form a ninety-degree position on the float wheel. Depending on the distance between the two hands two different samples may be triggered (e.g., Sample #1 triggered when casting with user hands 1 ft apart; Sample #2 triggered when casting with user hands 2 ft apart). By moving their hands to a different position along the float wheel, the user may be able to activate an audio effect slider. For example, the float may be used to manipulate the intensity of the reverb audio effect. At the 180-degree position on the float wheel a different audio effect may be controlled (the frequency variable of a high-pass/low pass filter which makes the drums fade in and out). In this manner, the user is able to move between parameters in a fluid manner.

In some embodiments, multiple layers of control are available within the float wheel using different poses. For example, with palms facing in (towards each other) there is one set of functionality, and with palms facing out (casting) there is a whole other set of functionality. Each pose is a multiplier of the data that can be triggered within the float wheel.

In some embodiments, a user may interact with a virtual object within the mixed reality space. Interactions may include making one or more gestures to resize or move the virtual object. User positional data corresponding to the user interaction with the virtual object may be transmitted from the mixed reality user device to the server system. The server system may then generate corresponding gestural data. The gestural data may then be used to update the virtual object (i.e., size, brightness, color, intensity). The gestural data may also be used to adjust the settings of the secondary device.

In some embodiments, the process may be done live or in relatively short times. In this manner, a user may be able to view the impact of the settings that are applied to the secondary device within the mixed reality environment in real-time.

Similarly, in some embodiments, the settings of the secondary device corresponding to the gestural data may be stored and not applied to the secondary device (i.e., not transmitted to the secondary device) until a second gesture is determined by the server. For example, a user may perform a series of gestures corresponding to "conjure" and "cast" movements. During the "conjure" phase, the user may position their hands as if surrounding a circle, and the corresponding gestural data may be used to determine corresponding parameters of the virtual object and/or secondary device. In some embodiments, the corresponding parameters may be stored. During the "cast" phase, the user may position their hands so that their palms are facing outwards towards the secondary device, and the corresponding gestural data may be used to apply the updated parameters that were previously generated and/or stored to the virtual object and the secondary device.

In some embodiments, when secondary device settings are applied to the secondary device the user may receive feedback or confirmation. In some embodiments, the confirmation may take the form of virtually projected confetti, glowing orbs being emitted from the secondary device and the like.

In some embodiments, pre-configured virtual objects corresponding to secondary devices may be generated and presented in the mixed reality environment. For example, in an environment with a plurality of secondary devices, a plurality of orbs corresponding to each of the secondary devices may be present in the mixed reality environment (e.g., red light, blue light, green light, etc.). In another example, each setting, from among a plurality of settings associated with a secondary device may be present as a separate virtual object in the mixed reality environment (e.g., color, brightness, intensity).

In some embodiments, the server may receive user positional data indicative of a selection of a pre-configured virtual object within the mixed reality environment. The server may then receive user positional data corresponding to adjustments in the selected pre-configured virtual object in accordance with the manner described herein.

In some embodiments, the server may receive user positional data indicative of a selection of a pre-configured virtual object within the mixed reality environment as well as user positional data indicating the generation of a "cue" orb or a second orb or virtual object. The second orb may be used to create settings for the secondary device and then pushed towards the pre-configured virtual object in the mixed reality environment to apply the created settings to the secondary device, similar to the "conjure" and "cast" mechanism described herein.

For example, pre-configured virtual objects may take the form of targets in the virtual distance in the mixed reality environment. When hit by a virtual orb, they trigger an event such as a light, sound or both. Virtual targets (i.e., pre-configured virtual objects) may be placed on the walls, or on specific lights, and triggered by "cue" orbs. For example, a user may select the color of the orb using gestures and throw it at different sections of the wall. When the virtual orb hits that part of the wall, the light projected on it changes to the color the user selected for the orb.

In some embodiments, where each of the pre-configured virtual objects corresponds to different settings for the same secondary device, the "cue" virtual object may travel along the space in the mixed reality and apply the settings to the secondary device when the "cue" virtual object contacts the pre-configured virtual object in the mixed reality environment. In some embodiments, the pre-configured virtual objects may be positioned along the z-plane of the mixed reality environment.

For example, by lining up pre-configured virtual object targets along the z axis, a sequence of display settings may be triggered in order when an orb virtual object is thrown at it. The proportional spacing of the targets may translate into proportional timing of the lights: the greater the distance interval, the greater the time interval. This can be used to create and manipulate a timing sequence for any series of events, or to trigger an actual array of LEDs arranged along the z axis.

Additional operational modes and features include "Save Preset", "Moving Orbs", "Physical Zooming", "Hover Orbs", "Swipe Functionality", "Pose Taps", "Posse Taps", "Body Taps", "Fist Open to Spawn", "Proximity Floats", "MultiAxes Gestural Interface", "Shared Experiences", "Drawing Paths", "Hover Orb Interface", "Gaze", "Touch with Velocity", "Casting with Velocity", "Spatial Placement of Sound and Light."

In a "save preset" mode, a user can capture virtual object targets such as orbs in a spatial sequencer. In other words, the virtual targets laid out in space can be saved into a preset or "sequence orb". This orb can then be cast like any other orb to trigger the sequence that was laid out previously. In addition, the user can open this sequence orb to manipulate the sequence.

In a "moving orbs" mode, virtual objects such as orbs in the spatial sequencer may be configured to hover in relative space to the user and the user can pick up and move these orbs around to manipulate the sequence that will be activated.

In a "physical zooming" mode, virtual objects such as orbs may be anchored in the mixed reality environment. The user may then "zoom in or out" by physically moving closer or farther from the hover orbs. In this way the user can walk a few feet away from the orbs to see a full broad view of the sequence. Or conversely, the user can walk close to one part of the sequence and do a fine manipulation of an orb.

In a "Hover Orbs" mode, a virtual object like an orb may hover in the mixed reality space. The orbs may be configured to be touched like buttons. The orbs may be configured to be touched or targeted individually.

In a "swipe functionality" mode, a user may swipe a virtual object such as an orb in different directions in order to perform different functions. In some embodiments, the hovering orbs or virtual objects would not need to be pressed to activate a function, instead they may only need to be touched by a user in the mixed reality environment. Additionally, the virtual objects or orbs may be swiped or moved in different directions for different functions. For example, if a user approaches hover orb A and swipes their finger through hover orb A from left to right, a function such as playing an audio sample may occur. However, if the user swipes their finger from right to left, a different function such as stopping the audio sample may occur. Additionally, swiping the virtual object from down to up directions or up to down directions may also have different functions as well. In this way, multiple interactions are possible with a single virtual object, for example, a hovering orb.

In a "posetaps" mode the user may control or manage the location, positioning, size, and other parameters of virtual objects. For example, by using "pose taps" a user may be able to send different commands with a single virtual tap of a virtual object. For example, the virtual object may be associated with one or more pre-set or stored parameters, and the position or pose of the hand corresponding to the gesture data may determine which of the pre-set or stored parameters may be transmitted when the gesture interacts with the virtual object. For example, the pose hand may include five unique poses (e.g., palm, dorsal, fist, index finger, peace sign) for each hand (e.g., left hand, right hand). Accordingly, a total of ten discrete commands may be available for each virtual object.

In another mode, "posse taps" mode, the user may utilize two or more visual objects. For example, in some embodiments, each visual object may correspond to an object in the physical space such as an LED light on a film stage or stage. The user may spawn the ball to float in front of him and assign them to a particular physical object (e.g., light), or to a preset command. Each time the user taps the visual object with a specific pose tap, the settings of the physical object (e.g., the light) may change. The representation of the virtual object within the mixed environment may also change as the user taps the visual object with a specific pose tap. To assign the virtual object to a particular physical object the virtual object can be thrown towards the physical object, and when the virtual object is paired with the physical object, the virtual object may change in appearance to indicate the pairing to a user.

In some embodiments, a real physical object may be introduced to the mixed-reality environment by a pairing or linking process. For example, in some embodiments, a user may move a virtual icon onto the location of where the physical object appears within the view of the mixed reality environment and execute the pairing with a specific gesture. In an alternative embodiment, the physical object may include a QR code, sticker, or other tag that may be physically attached to the physical object and capable of being read by the mixed reality user device for pairing. In another embodiment, the physical object may be a "smart" device that is capable of emitting a unique identifier pattern that can be read and processed by the mixed reality user device. This may include smart LED panels. In some embodiments, the mixed reality user device may view and recognize physical objects within the mixed reality environment. In some embodiments, the physical objects may include a GPS or other spatial sensor, allowing the physical object to project or broadcast their location to the mixed reality user device.

For example, in some embodiments, a user may be juggling three virtual objects each in the shape of a ball. A tap with an index on one of the virtual objects changes the color of the ball to yellow. However, balancing all three balls on the right palm changes the color of each of the balls to cyan. Yet balancing all three balls on the left back of the hand (or dorsal position) changes all three balls to magenta. Throwing all three balls in the air in the virtual environment, and then juggling the balls by hitting each of the balls with different pose taps can cause the three lights to flash with changing colors. The same gestures could also trigger musical notes or music clips (e.g., drum loops), separately or simultaneously with the changing lights. To assign a virtual object such as a ball to control a particular physical object such as an LED light, the virtual object may be thrown at the physical object and bounce back in an altered state (e.g., glowing) after the virtual object has been paired with a light.

In a "Body Taps" mode a user may control or manage the location, positioning or size of virtual objects by utilizing different parts of their body as virtual buttons. Examples of locations along the body may include the hand, lower arm, wrists, and the like. For example, one finger tap with the right hand on the back of the left hand (left dorsal) may be a unique command. A separate unique command may be tapping one finger on the back of the right hand. As different hand poses, and different hands may be recognized by the system, multiple unique commands may be generated.

In a "fist open to spawn" mode, a user may generate virtual objects for the mixed reality environment by making a fist and then opening the hand. The generated virtual object may be associated with a plurality of pre-programmed settings, the generation of the virtual object may have a different set of settings depending on whether it is spawned by the right hand or the left hand.

In a "proximity floats" mode, a user may utilize commands that are generated from hand positions or other gestures positioned around a virtual object, but not in direct contact with the virtual object.

In a "multi axes gestural interface (MAGI)" mode, a user may utilize their hands as a three-axis joy stick. For example, the Y-axis may correspond to up/down motions, X-axis may correspond to left/right motions and the Z-axis may correspond to forward/back motions. The gestural joystick may be used to move a virtual object through physical and virtual space. Float values can be linked to the different axes for a fluid method of controlling multiple sliders or parameters for a physical object at once. Alternatively, MAGI can be linked to a physical device with multi-axis parameters such as a motorized camera system or a drone.

In some embodiments, the neutral position of MAGI is the user's open palms facing each other with a few inches separating them. In this position the object will not move. Once the user rotates their hand outward, the virtual object begins to move forward (away from the user on the Z axis). In some embodiments, the degree of angle of rotation from the user may determine the velocity at which the virtual object moves. With hands fully rotated away from the user the object may be configured to have maximum velocity. Alternatively, if the user angles their palms towards their body, it will apply reverse thrust to the object. In addition, if the user angles their hands up or down, the object will rise or fall along the Y axis. In addition, from the neutral position, if just the right or left hand is rotated out, a right or left thrust will be applied respectively. And if one hand is turned out and one hand turned in, this applies a curve.

In some embodiments, the distance between the user's palms may be used a secondary throttle control. For example, the greater the distance between the two palms, the less maximum force that can be applied. Accordingly, the closer the distance between the two palms, the greater the maximum force that is available to be applied. This adds another way of adjusting and fine tuning a virtual object's velocity.

In some embodiments, a user will only be controlling a virtual object such as an orb using MAGI. In other embodiments, a user may be controlling only a physical object such as a drone using MAGI. In other embodiments, a user may be controlling both a virtual object and a physical object using MAGI.

In some embodiments, the coordinates of the virtual object the user is controlling will be linked to world coordinates of the physical space. For example, the mixed reality user device may map the space and create a virtual environment that overlays the physical world. The device may be programmed to create a map that remembers the location of walls, chairs, doorways, and devices within the environment. Through pairing, the mixed reality user device can be taught which objects are located within the "map" and are addressable and controllable. In this way, the user can assign a sound or light value to the virtual object and easily and fluidly move a sound or light through a physical space.

In some embodiments, the speed of motion, or the velocity of the physical object and/or virtual object in an direction through space, is based on two factors: 1) how far the hands are turned in the same direction (the degree of angle of rotation) and 2) the distance between the two hands. The two modes work simultaneously and affect each other. For example, the two modes may act as multipliers of each other. For maximum velocity, hands may be turned fully outward and close together, while for minimum velocity hands may be far apart and only slightly turned out.

In a "Shared Experience" mode a user may control or manage the location, positioning or size of virtual objects by—sharing a virtual object between two or more users who may all be experiencing the same virtual environment. For example, a first user may set the parameters for the virtual object (e.g., light colors, sound clip) and then pass the virtual object to the second user. The second user may tap the virtual object with a gesture to trigger an event before passing the virtual object back to the first user or on to another user. In some embodiments, a shared experience may also be referred to as a collaborative experience or a multi-user experience.

In a "Drawing Paths" mode a user may control or manage the location, positioning or size of virtual objects in order to control the operation of secondary devices such as cameras. For example, in some embodiments the user may draw a camera path in the virtual space by making a fist and extending other gestures (e.g., pinky and index finger) to simulate the edges of the frame that the camera will see. The user may then move their hands through the virtual space to draw the path the secondary device (e.g., camera) may follow when executed. The "Drawing Paths" mode may provide a high level of functionality in that a lot of information may be tracked by the virtual reality device including the pan, tilt, height on the Y-axis, third axis head rotation, movement on the X-axis, movement on the Z-axis and the like. The data obtained by the virtual reality device may include the timing of each movement, the speed, acceleration and the deceleration. Accordingly, when the secondary device in the physical space follows the track drawn by the virtual object in the mixed reality environment, advanced motional instructions may be provided to the secondary device. For example, by following the virtual path, a motorized camera dolly may have an exact path to follow for film shooting.

In a "Hover Orb Interface" mode a user may control or manage the location and positioning of virtual objects such as hover orbs. For example, by performing a gesture (i.e., both index fingers in the air) the hover orbs can reassemble around a user. In this way the user can move anywhere in physical space and easily gather the hover orb interface when needed.

In a "gaze" mode, control of the virtual objects (such as hover orbs) may be controlled in a hands-free manner using eye tracking and/or head tracking. The user's eyes may be scanned to determine where the user is looking, or where the user is pointing their head. The user may select a virtual object (such as a hover orb) and a smaller virtual object (indicative of the user's selection) may be placed adjacent to the virtual object. The user can then use eye tracking and/or head tracking to move the virtual object.

For example, a drummer DJ-ing while playing a drum set may be able to use the gaze mode to operate triggering lighting cues in a hands-free manner. In some embodiments, a combination of both eye tracking and head tracking may be used. For example, to select a hover orb, eye tracking is used. Once selected, a smaller orb may appear above the hover orb called the "gaze target orb". The orb spawns for only 1 second before being destroyed. The user can then use head tracking to aim the cursor from the hover orb to the gaze target orb to trigger it before it is destroyed.

While eye tracking may be used to select a virtual object because it is accurate in determining where a user is looking in 3D space, the head tracking may be used to trigger because it is faster than eye tracking. Further, the movement of the head has proven to be more comfortable and natural (like a nod). Gaze mode may balance the eye tracking and head tracking capabilities of the mixed reality user device in order to balance function while minimizing accidental commands (false triggers).

Additionally, in some embodiments, gaze mode can be used such that a single virtual object is used to activate a plurality of virtual objects. For example, a single hover orb can activate a gaze target orbs on four sides, such that it looks like a compass. With this, the user has four commands that can be executed with gaze mode from a single hover orb.

In "touch with velocity" mode, a user may touch a virtual object with different amounts of velocity within a mixed reality environment in order to trigger different intensities for the respective command associated with the virtual object. For example, a user can touch an orb in the hover interface with different amounts of velocity to trigger different intensity of a command. For example, a user can touch a hover orb gently to trigger an audio sample at a low volume. And then the user may touch the same orb with a higher rate of force (velocity is measured by the headset) to trigger that sample with a higher volume. This functionality may be seen as analogous to pressure-sensitive pads or keys on a piano or midi control hardware.

In a "cast with velocity" mode the velocity with which the user casts a virtual object may impact the functionality. For example, the intensity that a user casts a virtual object such as an orb has an effect on the environment and the secondary devices. In one example, the user can cast a red colored orb with a low velocity (slower motion of casting) to send a lower value to one DMX light channel. The result in this case would be the light changing to red but with low intensity (low dimmer value). Conversely, the user could cast that same red orb with a higher intensity (higher velocity) such that the light changes to red with a higher intensity (higher dimmer value).

With audio, an orb can be cast with velocity to determine the intensity (the volume) that a sample is triggered. This can be mapped to any audio parameter.

In some embodiments, when building the spatial sequencer, casting with greater velocity determines the distance that that orb will hover in front of the user. Casting a hover orb with a high velocity will put the orb farther away; casting with a low velocity will land the orb closer to the user. In this way, the user can quickly build a sequence along the Z axis by casting orbs at different velocities. Then the user can "fine tune" placement of the orbs by walking through the sequence and moving the orbs that have been cast.

In a "Spatial Placement of Sound and Light" mode, the user may be able to spatially map sound and light. For example, if the environment includes an array of 50 LED lights in a big room and 50 addressable speakers under each light. With a sweep of the user's hand in the mixed reality environment, sound and light may travel across the room. Using this mode, mixed reality can be used to visualize and control the spatial placement of sound and light.

In another example, a first virtual object, a white hover orb may be placed somewhere in the room. The white orb represents white light and has a sound sample associated with it. The lights that the white orb is near are bright white. The lights that are farther away have less white intensity. The speakers that are close to the white orb play the audio sample with more volume than the speakers that are farther away. The user can pick up the virtual object, the white hover orb, and move this white orb to have the light and sound travel across the room.

In some embodiments, a user may move from one of the described modes above (live application, conjure and cast, pre-configured virtual objects, etc.) through the use of gestures (e.g., tapping the left hand).

In some embodiments, the user positional data received from a mixed reality user device may correspond to an adjustment of a virtual object within the mixed reality space. For example, the user may change the position of their hands and generate gestural data for adjusting the size or brightness of the virtual object and it may correspond to a change in the settings of a secondary device. Accordingly, as opposed to a point and click model of conventional systems where a user's gestures are used to control a mouse or other feature, here the user uses their own hands (location, orientation in space) and the relative distance between hands as gestures that can control the operation of secondary devices. In this manner, finer control of secondary devices may be obtained.

Additional gestures are envisioned. For example, the gesture-based system may recognize "thumb to finger buttons", where a single touch of the thumb to any one of the four fingers is a discrete command, a double touch provides a different command, and a touch and hold may be a third type of command. Another gesture is a "floats between fingers" gesture, where a float value is created based on the distance between the thumb and another finger (e.g., thumb and index finger). Another additional gesture is a "fist brake" where forming the gesture of a fist may stop a virtual object in the middle of a motion and the virtual object may wait for another command. A further gesture is a parameter copy and paste gesture, where a user who is controlling a plurality of secondary devices may set the parameters on a first secondary device and then copy all of the parameters and apply them to other secondary devices. In some embodiments, the copy gesture may be a fist followed by an open palm. The virtual object may be configured to emit sparks and colors in the mixed reality environment to indicate that the parameters have been copied and are able to be applied to other secondary devices. Using this feature, a user may control a plurality of secondary devise, such as a dozen lights on a movie set. In some embodiments, a user may save all the parameters in a mixed reality environment by using a global preset gesture. For example, a particular "thumb to finger" gesture may be used to save all the parameters in a mixed reality environment. The mixed reality environment may provide visual feedback to a user to indicate that the action has been completed. For example, a virtual glass container may be filled with all the parameter settings, and a separate gesture parameter may be used to save and name the settings. In some embodiments, a user may use a "prayer position" gesture as an on or off switch for the entire gesture system.

Example gestures in the mixed reality environment include, but are not limited to, "open palms," "pointers," "palms out', "double fists", "fist squeeze and palm face up", "thumbs up and gaze" and "thumb to finger button."

Further, in some embodiments, the use of a gesture-based system to control the operation of a secondary device may rely upon muscle memory of a particular distance or hand orientation and may be used to quickly reactivate a command. Further, the interaction with the mixed reality environment may be more intuitive than conventional menu and command systems.

Another benefit of the disclosed embodiments is spatial awareness. For example, the disclosed systems may display where the secondary devices are within an environment (i.e., the position of lights within a room both globally, and relative to a user). Accordingly, selecting a target or secondary device may be faster and more intuitive, because the user may look at or reach out to the actual physical light within the mixed reality environment. By contrast, in a conventional lighting interface, a secondary device such as a light is typically represented by an icon or a 2D avatar, which creates delays in the ability of the user to identify and quickly change settings for the light.

In some embodiments, gestures and user input may be performed by any of a number of techniques. Selection of different menu options as well as objects may be performed by selecting objects from the air by making a tapping motion. For example, a user's hand or finger(s) may be used to make a "tapping" motion in space. The user may also select objects using a "pinching" motion in space. These motions may be made in air, against a virtual representation of a physical object, or against a virtual representation of a virtual object. In some embodiments, gestures and user input may be made by a user interacting with a physical object. For example, existing physical objects such as a tabletop or parts of a hand or arm may be used in connection with the object.

Figure 4:
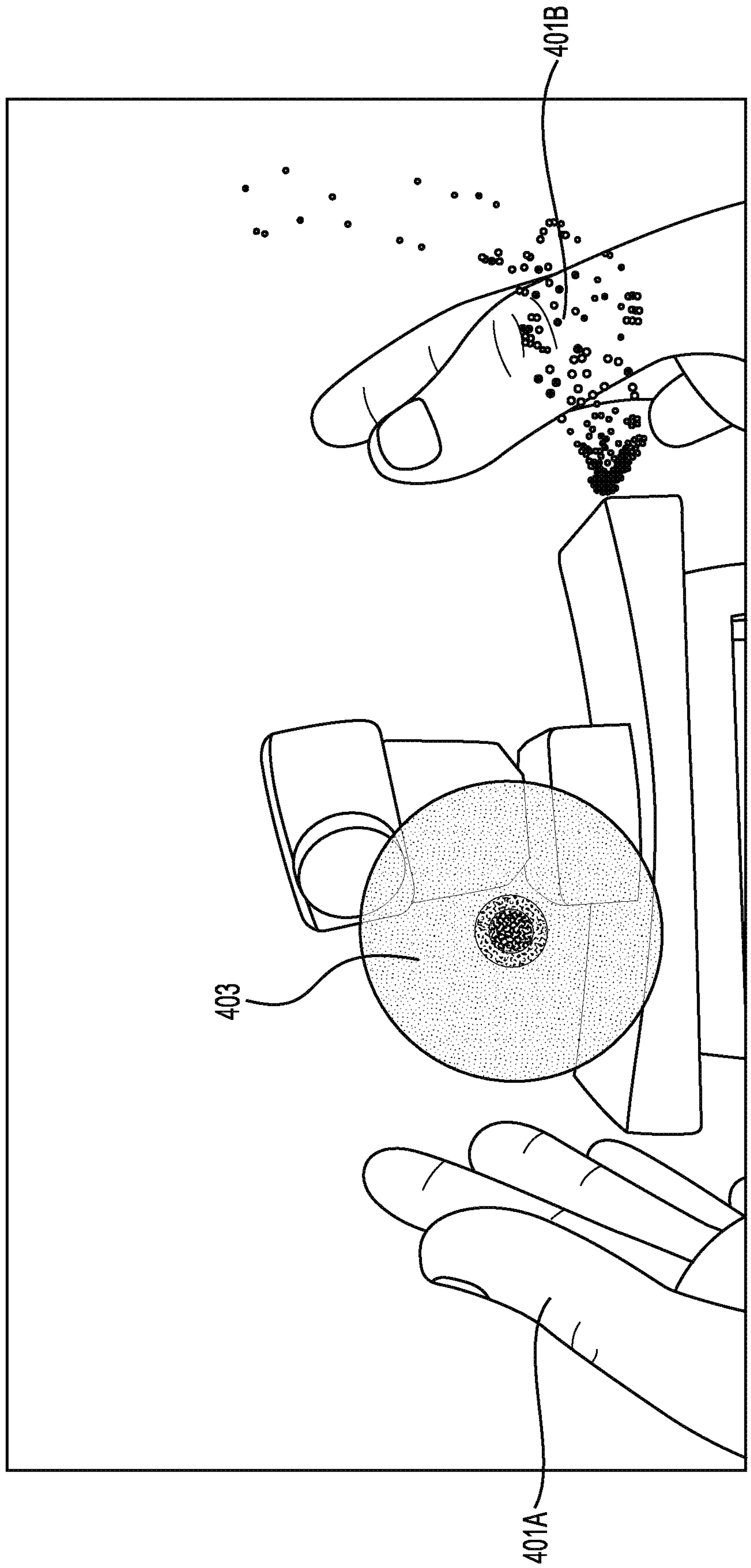
FIG. 4 is a schematic diagram showing an example of a view of a mixed reality environment wherein a user can interact with virtual content that is presented in the mixed reality environment, in accordance with embodiments of the present disclosure.

FIG. 4 is a schematic diagram showing an example of a view of a mixed reality environment wherein a user can interact with virtual content that is presented in the mixed reality environment. As illustrated, a projected image 403 may be controlled by gestures generated by a user of a mixed reality device. For example, the gestures may include hand movements by the user hands 401A, 401B.

Figure 5:
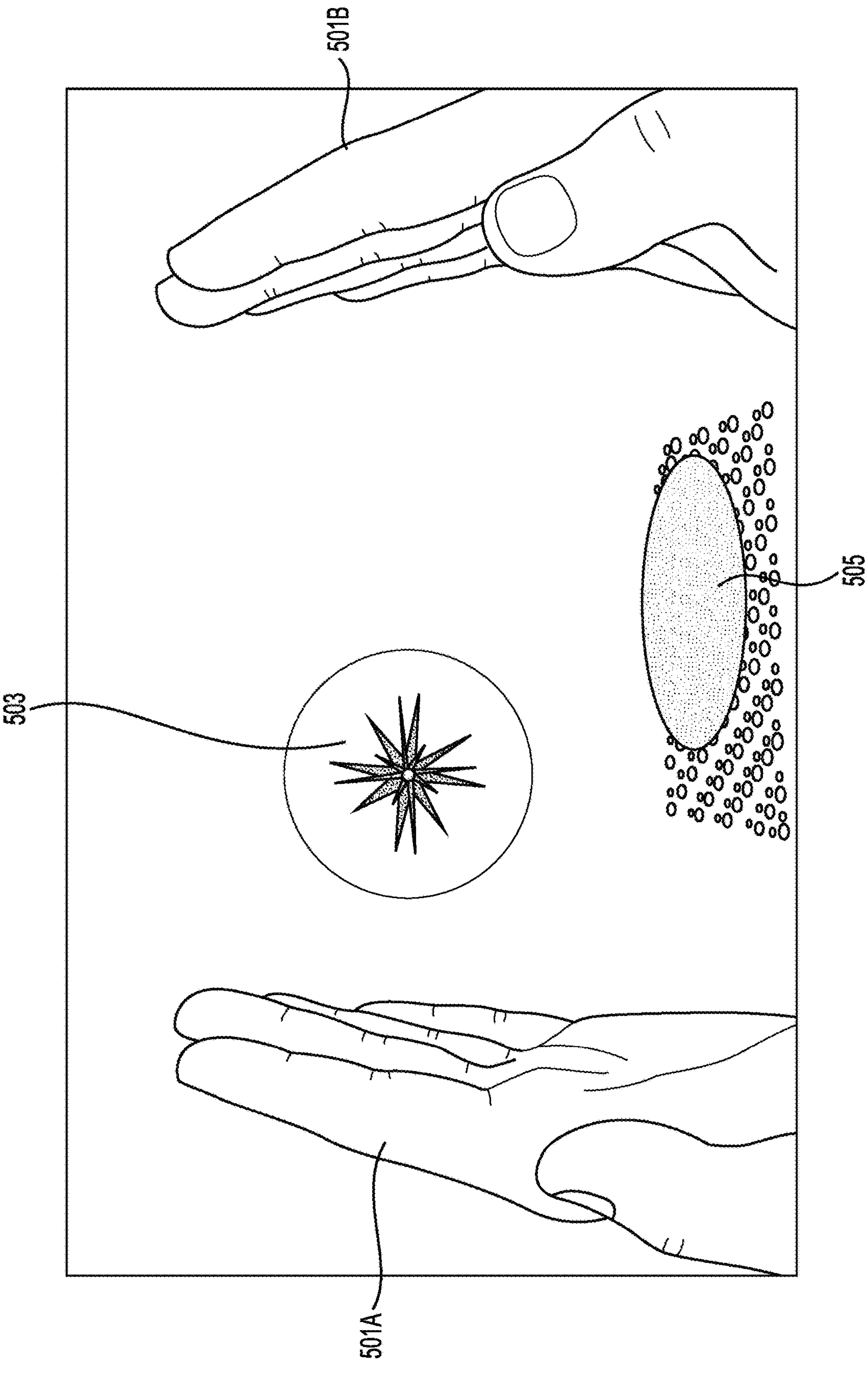
FIG. 5 is a schematic diagram showing an example of a view of a mixed reality environment wherein a user can interact with virtual content that is presented in the mixed reality environment, in accordance with embodiments of the present disclosure.

FIG. 5 is a schematic diagram showing an example of a view of a mixed reality environment wherein a user can interact with virtual content that is presented in the mixed reality environment. As illustrated, a projected image 503 may be adjusted by gestures generated by a user of a mixed reality device. For example, the gestures may include hand movements by the user hands 501A, 501B. In turn, the adjustments of the projected image 503 (i.e., brightness, size) may control the operation of a secondary device 505. As illustrated in FIG. 5, the secondary device 505 may include one or more light emitting diodes. In some embodiments, as a user brings their hands 501A, 501B closer together, the brightness and/or size of the projected image 503 may increase, and the brightness of the secondary device 505 may also increase. In some embodiments, the secondary device 505 may include a plurality of light emitting diodes.

Figure 6:
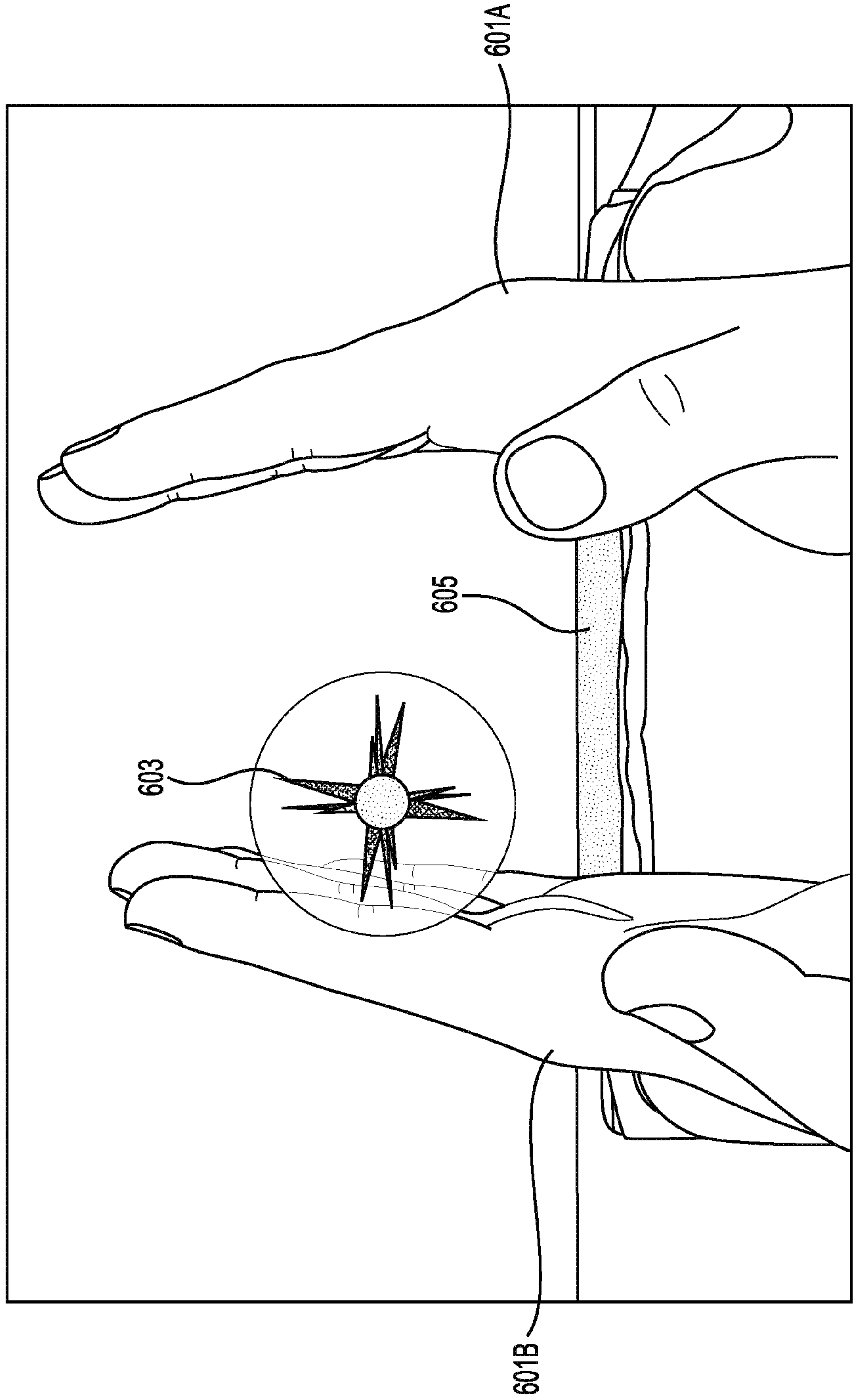
FIG. 6 is a schematic diagram showing an example of a view of a mixed reality environment wherein a user can interact with virtual content that is presented in the mixed reality environment, in accordance with embodiments of the present disclosure.

FIG. 6 is a schematic diagram showing an example of a view of a mixed reality environment wherein a user can interact with virtual content that is presented in the mixed reality environment. As illustrated, a projected image 603 may be adjusted by gestures generated by a user of a mixed reality device. For example, the gestures may include hand movements by the user hands 601A, 601B. In turn, the adjustments of the projected image 603 (i.e., brightness, size) may control the operation of a secondary device 605. As illustrated in FIG. 6, the secondary device 605 may include one or more light emitting diodes. In some embodiments, as a user brings their hands 601A, 601B closer together, the brightness and/or size of the projected image 603 may increase, and the brightness of the secondary device 605 may also increase. In some embodiments, the secondary device 605 may include a single light emitting diode.

Figure 7:
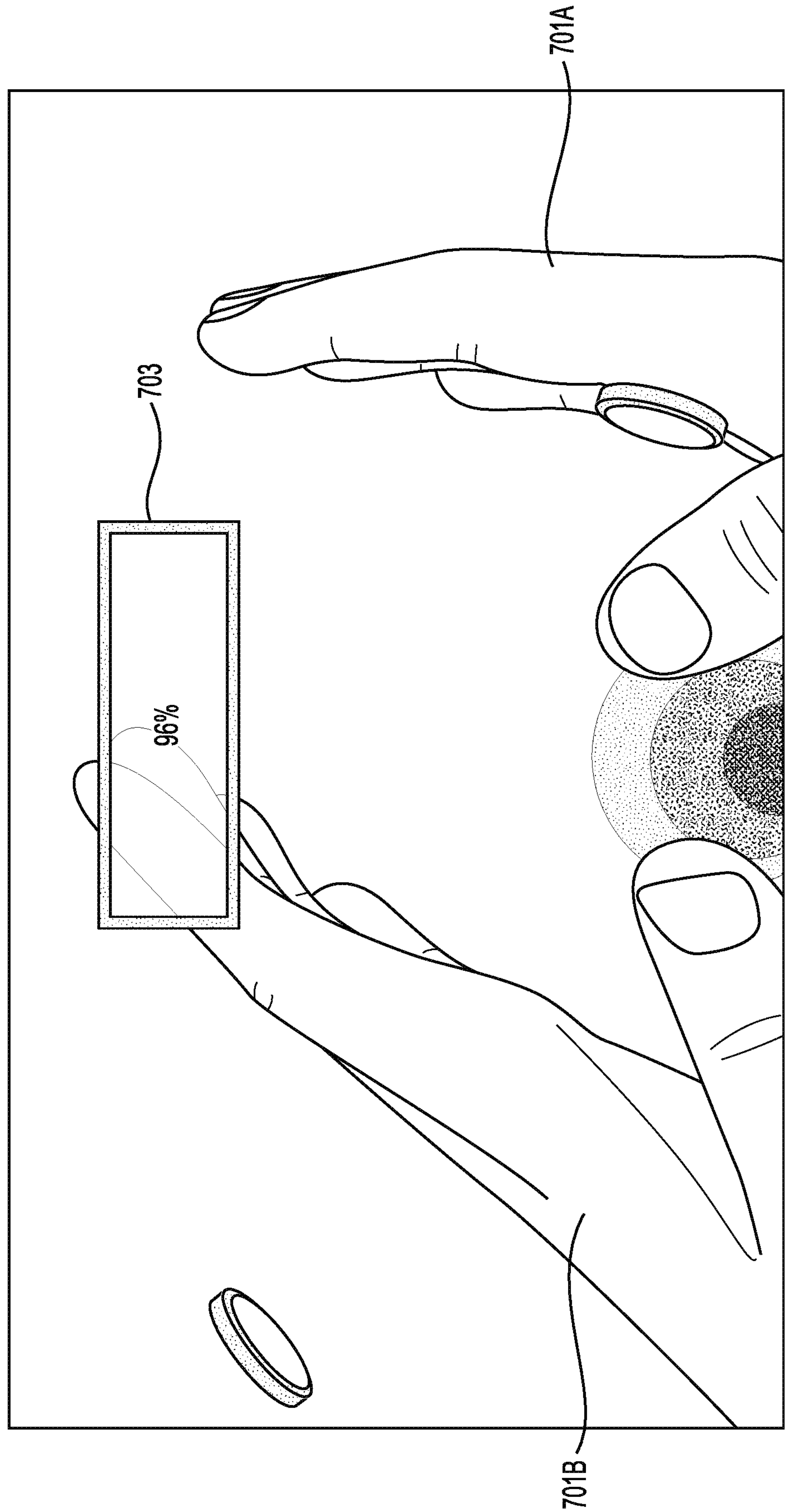
FIG. 7 is a schematic diagram showing an example of a view of a mixed reality environment wherein a user can interact with virtual content that is presented in the mixed reality environment, in accordance with embodiments of the present disclosure.

FIG. 7 is a schematic diagram showing an example of a view of a mixed reality environment wherein a user can interact with virtual content that is presented in the mixed reality environment. As illustrated, a projected image 703 may be adjusted by gestures generated by a user of a mixed reality device. For example, the projected image may be a sphere that is accompanied by an indicator. For example, the indicator may provide an indication to the user of the percentage of brightness and/or size for the projected image. For example, the gestures may include hand movements by the user hands 701A, 701B. In turn, the adjustments of the projected image 703 (i.e., color, brightness, size) may control the operation of a secondary device 705. As illustrated in FIG. 7, the secondary device 705 may include one or more light emitting diodes. In some embodiments, as a user brings their hands 701A, 701B closer together, the brightness and/or size of the projected image 703 may increase, and the brightness of the secondary device 705 may also increase.

Figure 8:
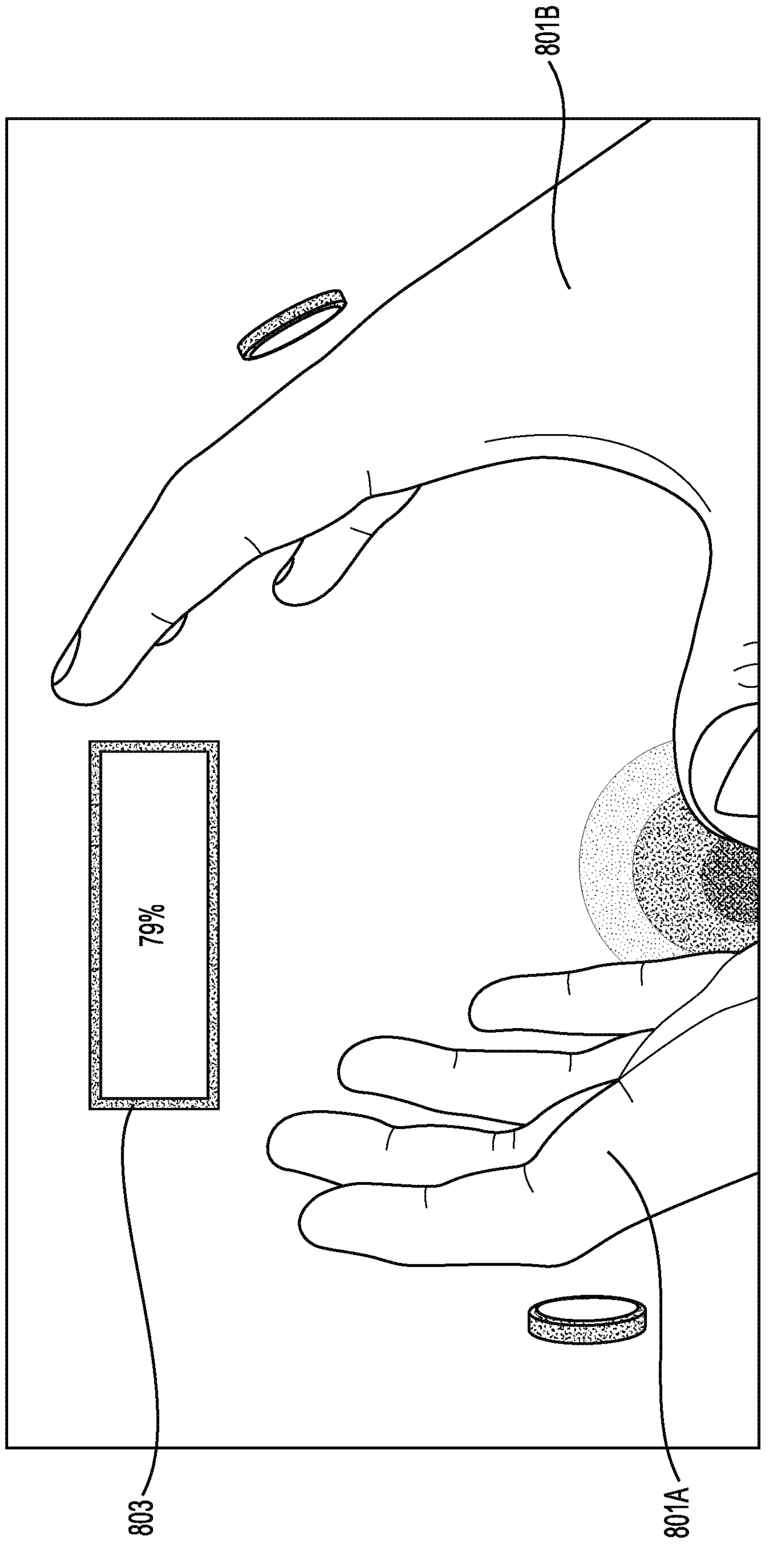
FIG. 8 is a schematic diagram showing an example of a view of a mixed reality environment wherein a user can interact with virtual content that is presented in the mixed reality environment, in accordance with embodiments of the present disclosure.

Similarly, FIG. 8 is a schematic diagram showing an example of a view of a mixed reality environment wherein a user can interact with virtual content that is presented in the mixed reality environment. As illustrated, a projected image 803 may be adjusted by gestures generated by a user of a mixed reality device. For example, the projected image may be a sphere that is accompanied by an indicator. For example, the indicator may provide an indication to the user of the percentage of brightness and/or size for the projected image. For example, the gestures may include hand movements by the user hands 801A, 801B. In turn, the adjustments of the projected image 803 (i.e., color, brightness, size) may control the operation of a secondary device 805. As illustrated in FIG. 8, the secondary device 805 may include one or more light emitting diodes. In some embodiments, as a user brings their hands 801A, 801B closer together, the brightness and/or size of the projected image 803 may increase, and the brightness of the secondary device 805 may also increase.

Figure 9:
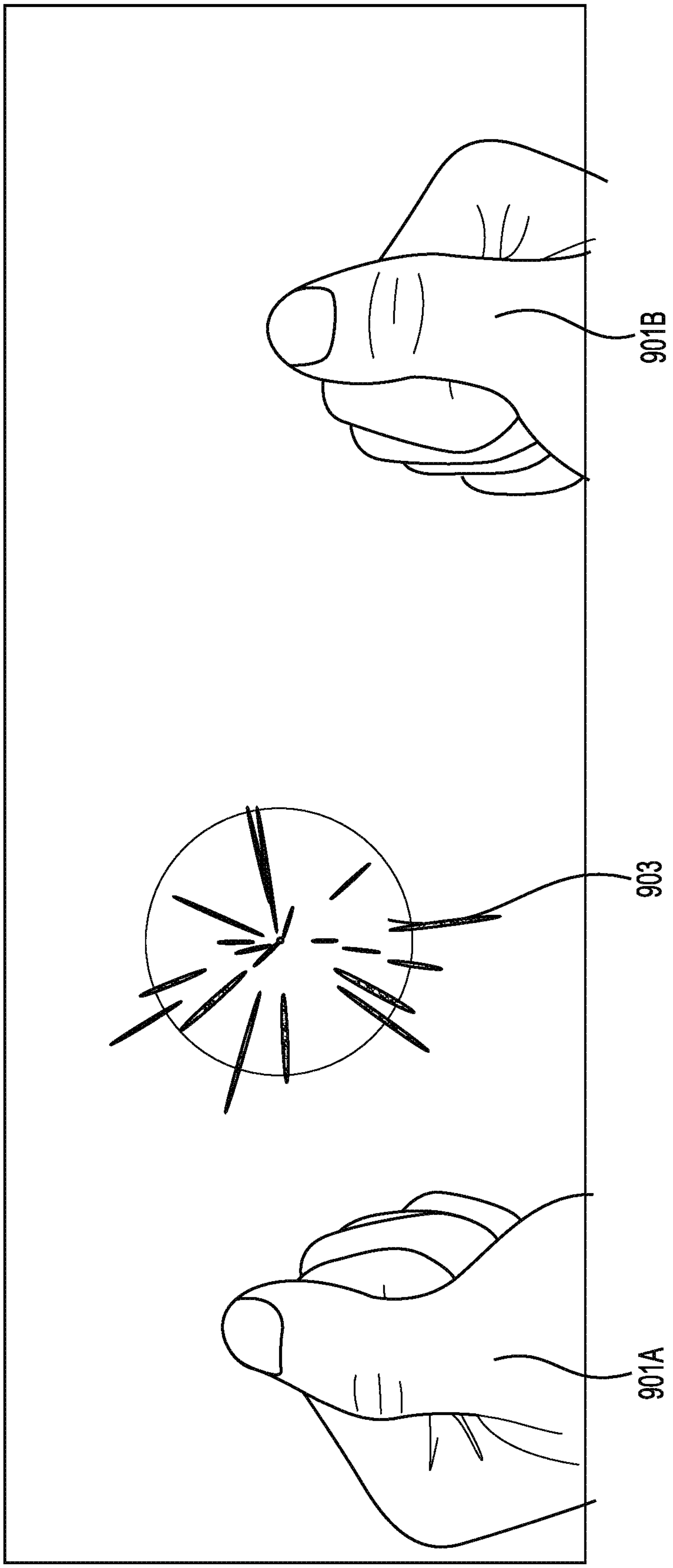
FIG. 9 is a schematic diagram showing an example of a view of a mixed reality environment wherein a user can interact with virtual content that is presented in the mixed reality environment, in accordance with embodiments of the present disclosure.

FIG. 9 is a schematic diagram showing an example of a view of a mixed reality environment wherein a user can interact with virtual content that is presented in the mixed reality environment. As illustrated, a projected image 903 may be adjusted by gestures generated by a user of a mixed reality device. For example, the projected image may be a sphere. Gestures may include hand movements by the user hands resembling a fist 901A, 901B. In turn, the adjustments of the projected image 903 (i.e., color, brightness, size) using the gestures may later control the operation of a secondary device, when the projected image 903 is projected towards the secondary device within the mixed reality environment.

Figure 10:
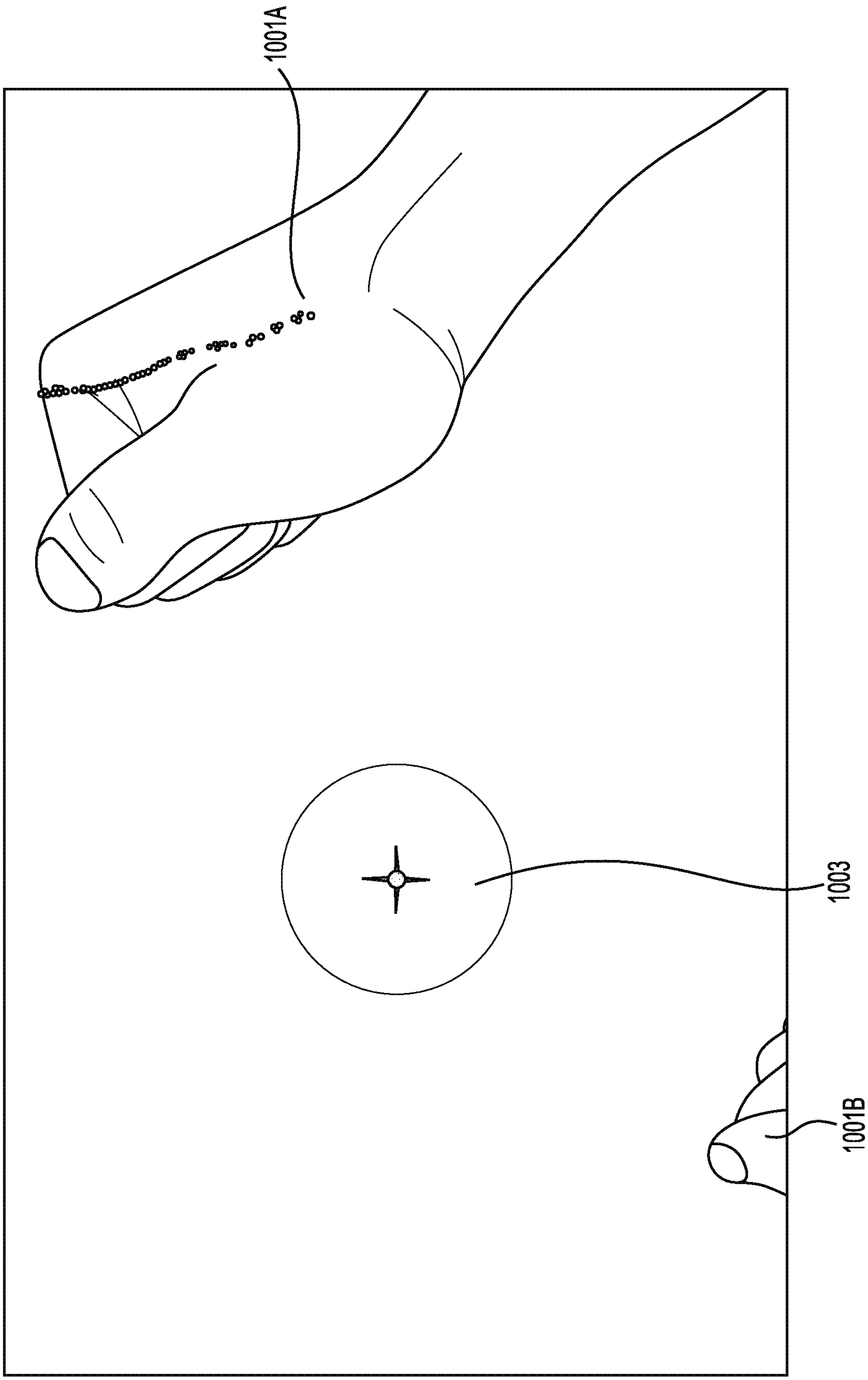
FIG. 10 is a schematic diagram showing an example of a view of a mixed reality environment wherein a user can interact with virtual content that is presented in the mixed reality environment, in accordance with embodiments of the present disclosure.
Figure 11:
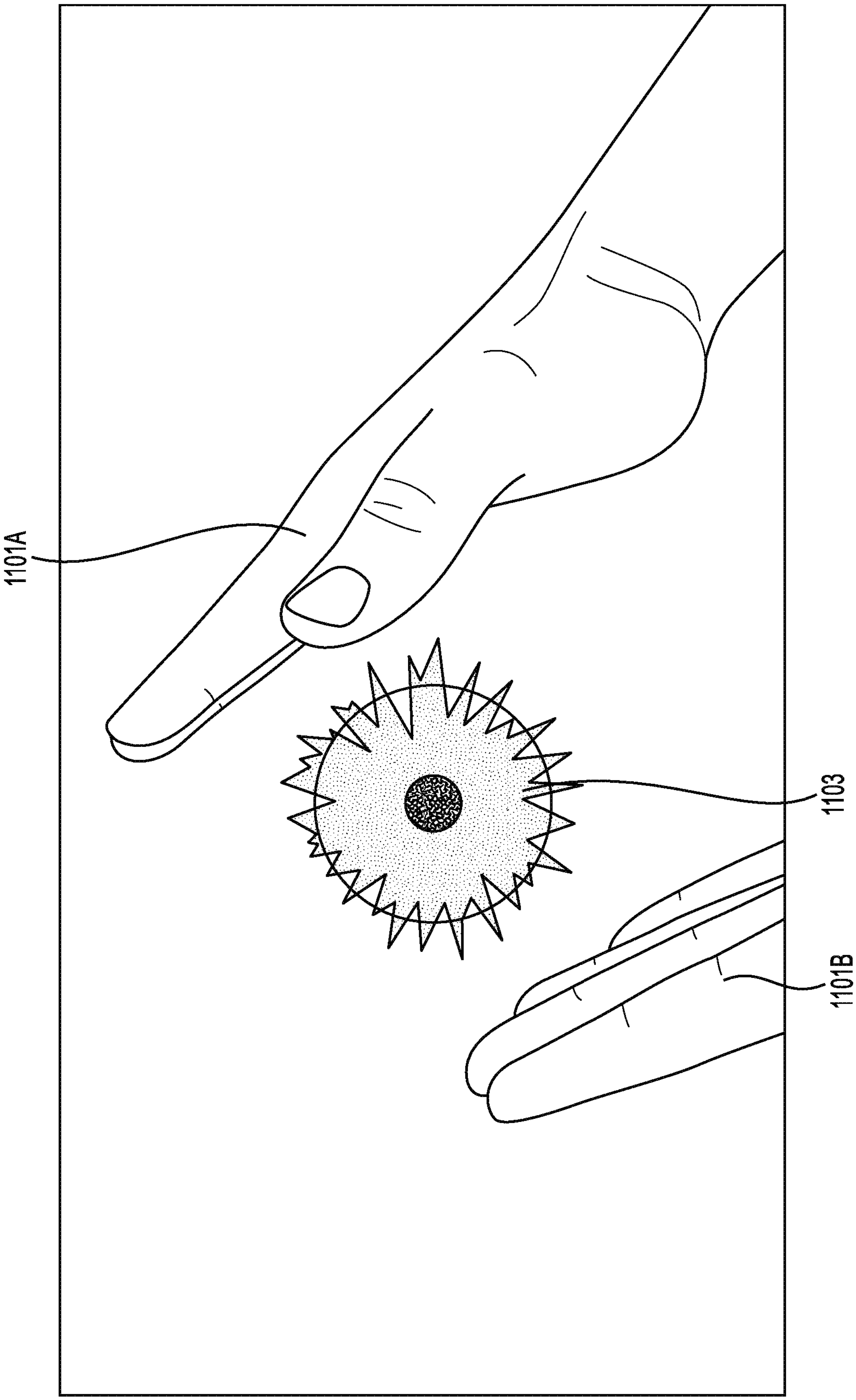
FIG. 11 is a schematic diagram showing an example of a view of a mixed reality environment wherein a user can interact with virtual content that is presented in the mixed reality environment, in accordance with embodiments of the present disclosure.

Similarly, FIG. 10 illustrates the adjustment of the projected image 1003 by gestures made by the hands in a fist formation 1001A, 1001B. Additionally, FIG. 11 illustrates the adjustment of the projected image 1103 by gestures made by the hands in a flat formation 1101A, 1101B.

Figure 12:
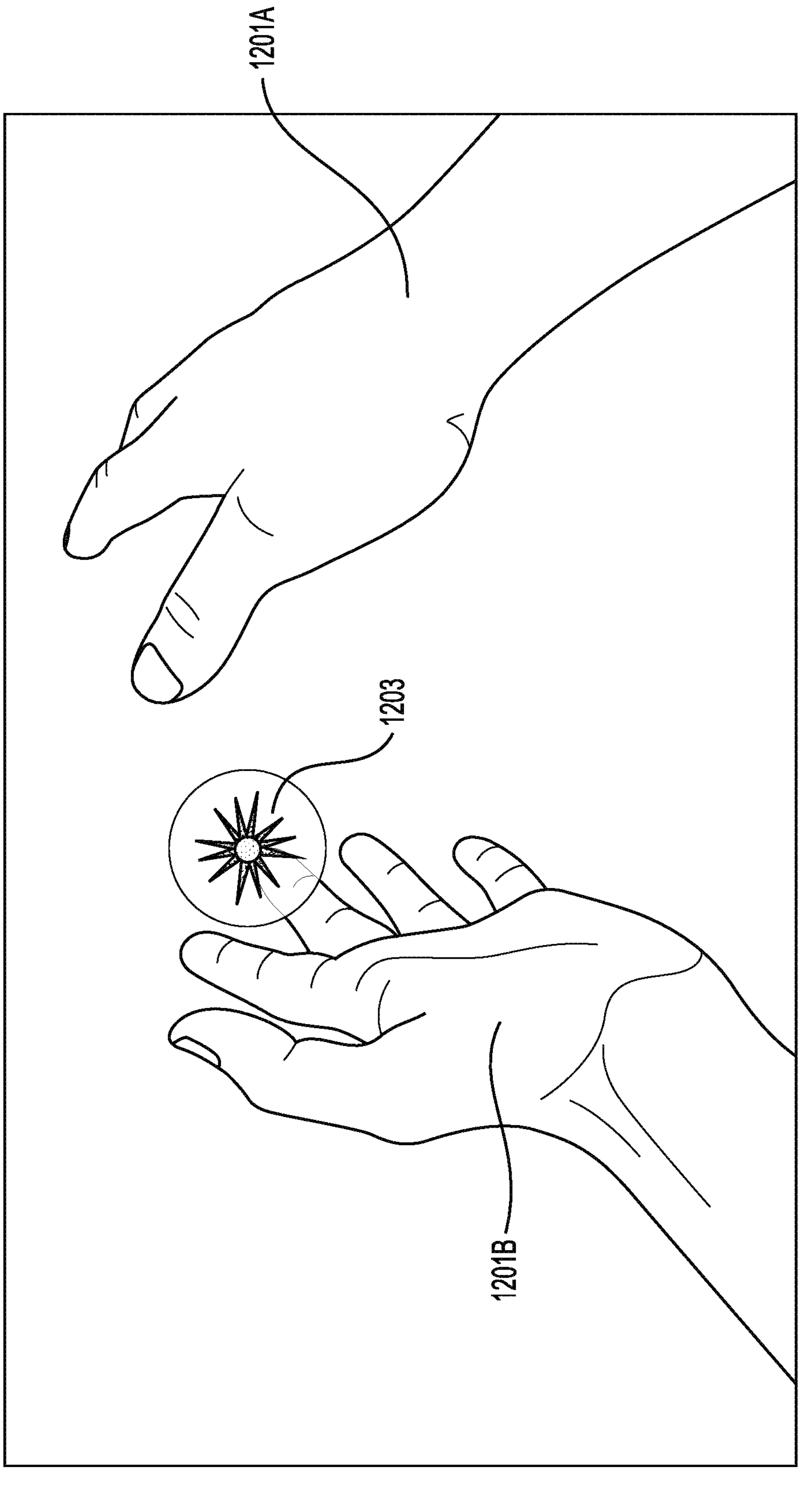
FIG. 12 is a schematic diagram showing an example of a view of a mixed reality environment wherein a user can interact with virtual content that is presented in the mixed reality environment, in accordance with embodiments of the present disclosure.

FIG. 12 provides a schematic diagram showing an example of a view of a mixed reality environment wherein a user can interact with virtual content that is presented in the mixed reality environment. As illustrated, a projected image 1203 may be projected towards a secondary device depicted within the mixed reality environment, responsive to the user making a gesture. For example, the user may make a casting gesture using their hands 1201A, 1201B.

Figure 13:
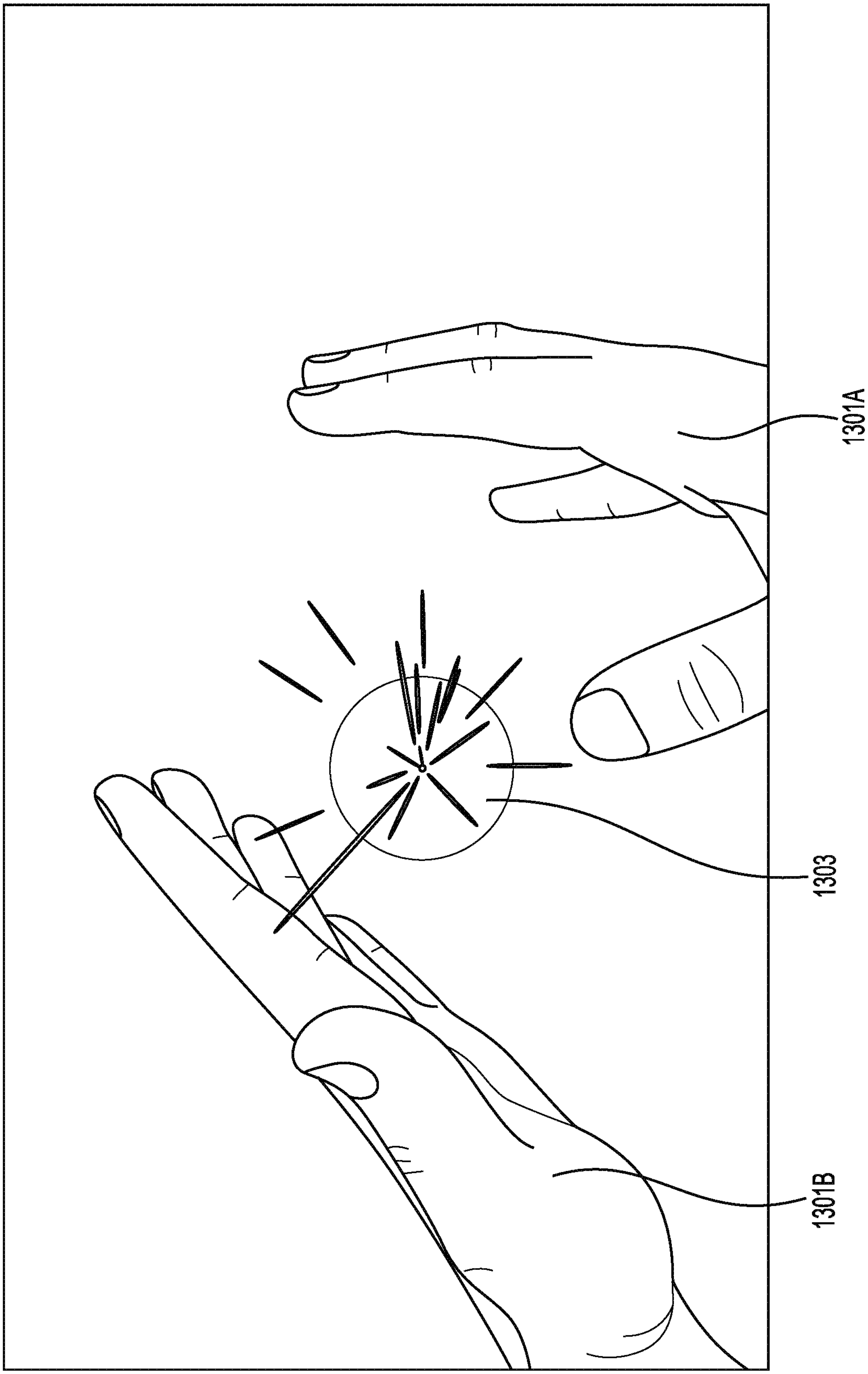
FIG. 13 is a schematic diagram showing an example of a view of a mixed reality environment wherein a user can interact with virtual content that is presented in the mixed reality environment, in accordance with embodiments of the present disclosure.

Additionally, FIG. 13 illustrates the adjustment of the projected image 1303 by gestures made by the hands in an open formation 1301A, 1301B. For example, the projected image 1303 may appear to emit sparks as the user's hands 1301A, 1301B are adjusted in correspondence with one or more parameters for a secondary device.

Figure 14:
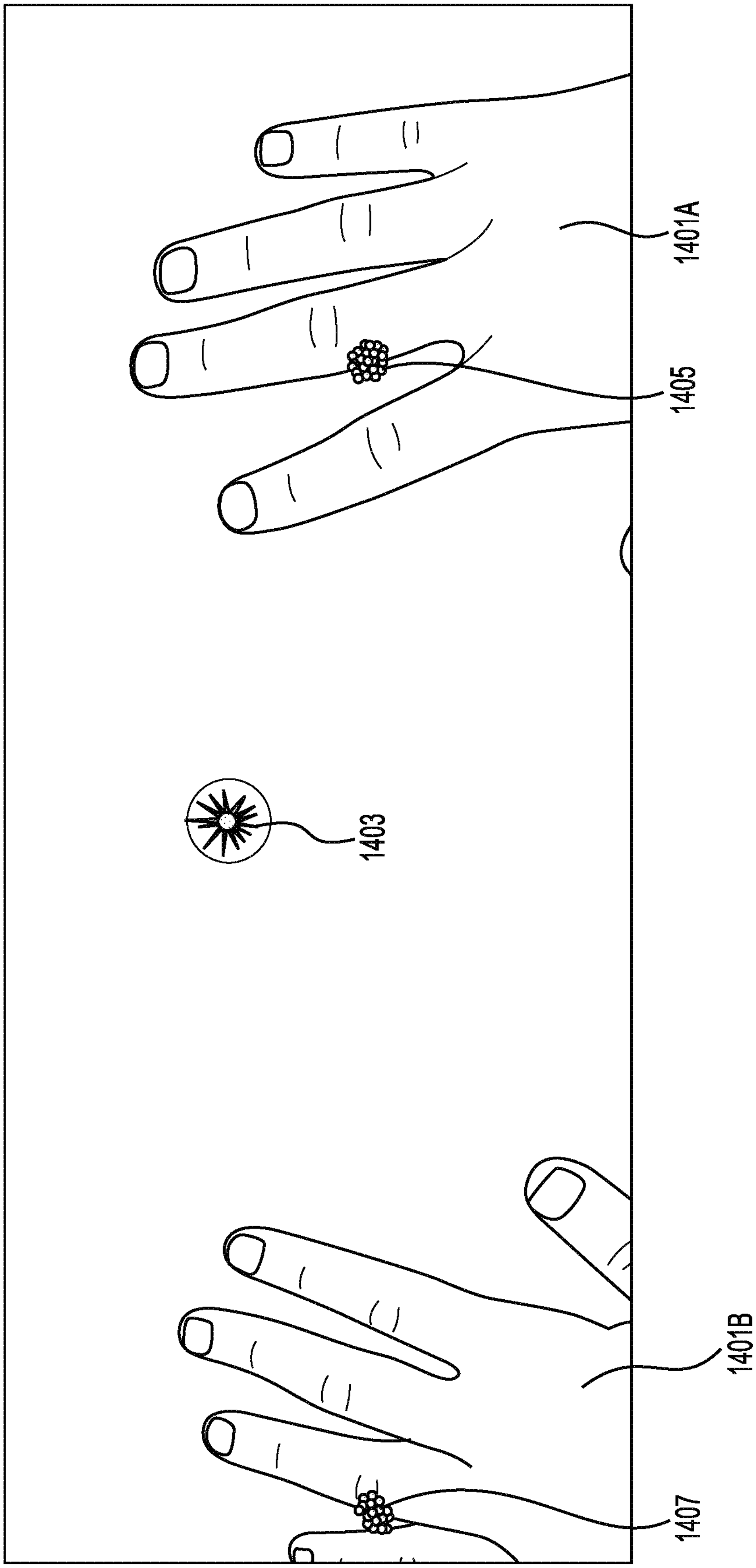
FIG. 14 is a schematic diagram showing an example of a view of a mixed reality environment wherein a user can interact with virtual content that is presented in the mixed reality environment, in accordance with embodiments of the present disclosure.

Further, FIG. 14 also illustrates the adjustment of the projected image 1403 by gestures made by the hands in an open formation 1401A, 1401B. For example, the projected image 1403 may appear to emit smaller orbs 1407 1405 as the user's hands 1401A, 1401B are adjusted in correspondence with one or more parameters for a secondary device. In emitting smaller orbs the user may be provided with feedback regarding the parameters they have selected for a secondary device. Emitting smaller orbs may also create a more interactive experience for the user of the mixed reality user device.

Figure 15:
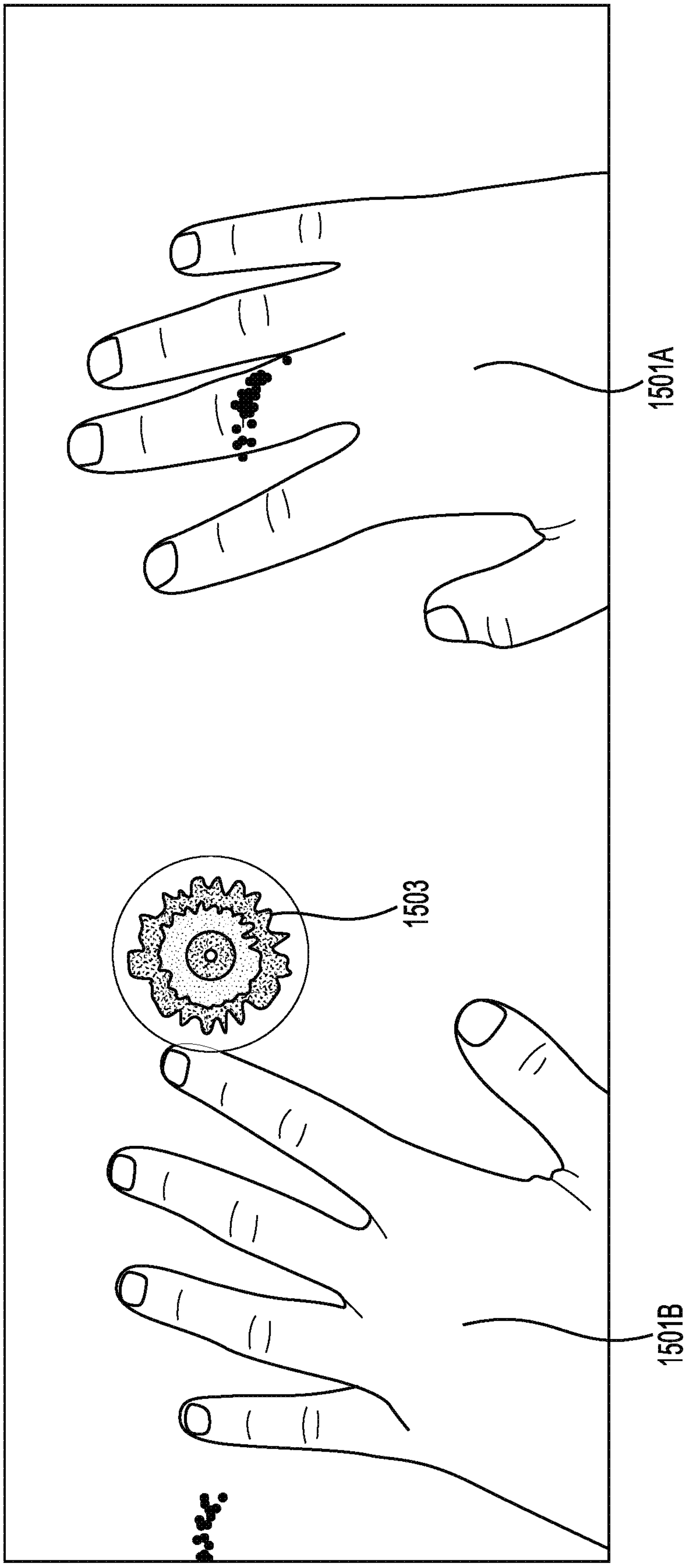
FIG. 15 is a schematic diagram showing an example of a view of a mixed reality environment wherein a user can interact with virtual content that is presented in the mixed reality environment, in accordance with embodiments of the present disclosure.

FIG. 15 also illustrates the adjustment of the projected image 1503 by gestures made by the hands in an open formation 1501A, 1501B, as the projected image 1503 is cast towards another projected image in the mixed reality environment and/or a real object in the mixed reality environment. For example, the projected image 1503 may appear to contain moving, glowing elements and the like as the user's hands 1501A, 1501B are adjusted in correspondence with one or more parameters for a secondary device.

Figure 16:
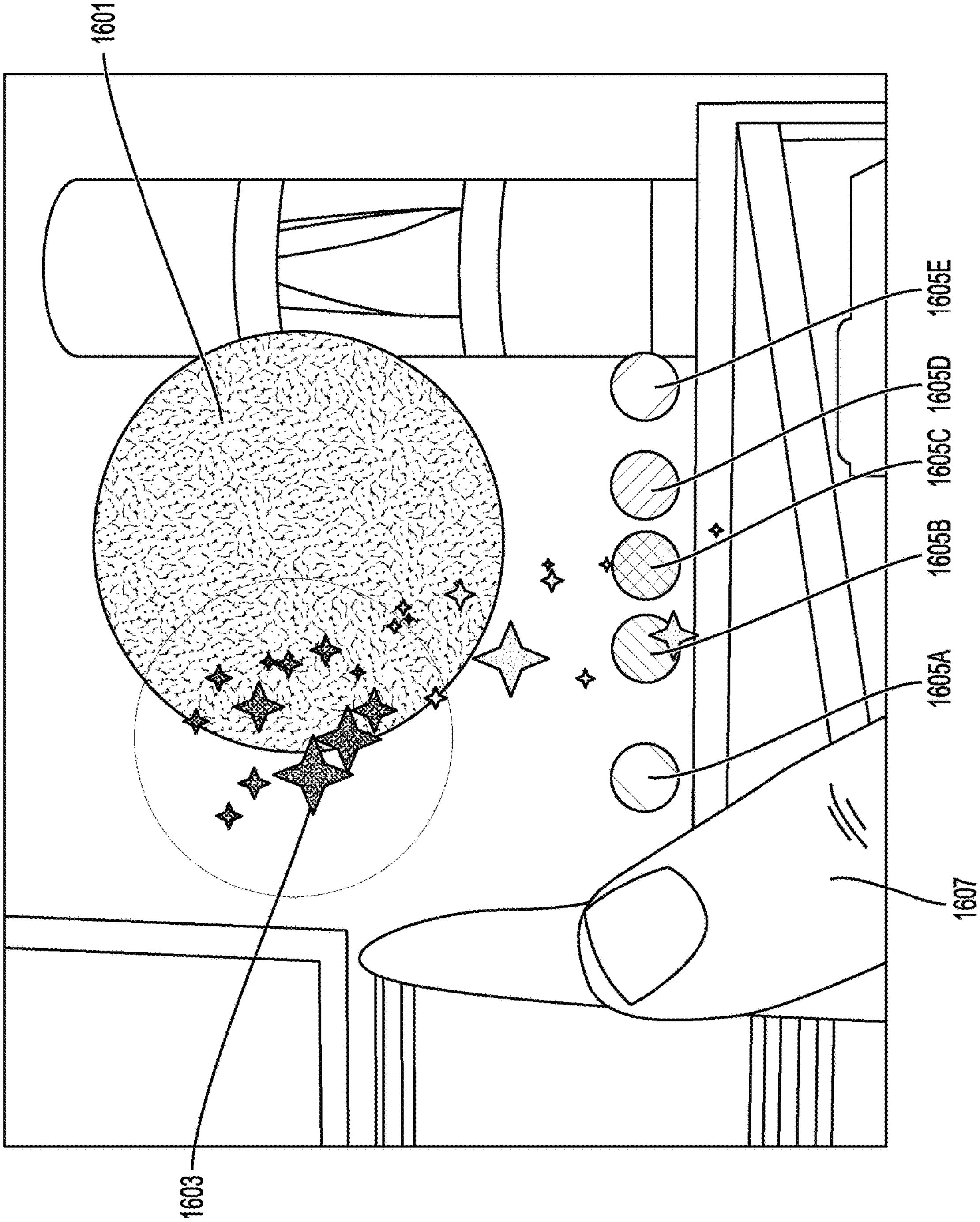
FIG. 16 is a schematic diagram showing an example of a view of a mixed reality environment wherein a user can interact with virtual content that is presented in the mixed reality environment, in accordance with embodiments of the present disclosure.

FIG. 16 provides a schematic diagram showing an example of a view of a mixed reality environment wherein a user can interact with virtual content that is presented in the mixed reality environment. As illustrated, a user's hands or fingers 1607 may be used in a pointing gesture. The user may select one or more projected images 1605A, 1605B, 1605C, 1605D, 1605E, each of which may correspond to a different parameter or setting for the secondary device (i.e., color, size, brightness). As one of the projected images 1605B, 1605B, 1605C, 1605D, 1605E is selected, the projected image may be brought to the center 1601 and illustrated as a larger object. The larger projected image positioned at the center 1601 may indicate the parameter setting that may be applied to the secondary device. The projected image may include one or more external projected ornaments 1063 used to indicate that a user has made their choice.

Figure 17:
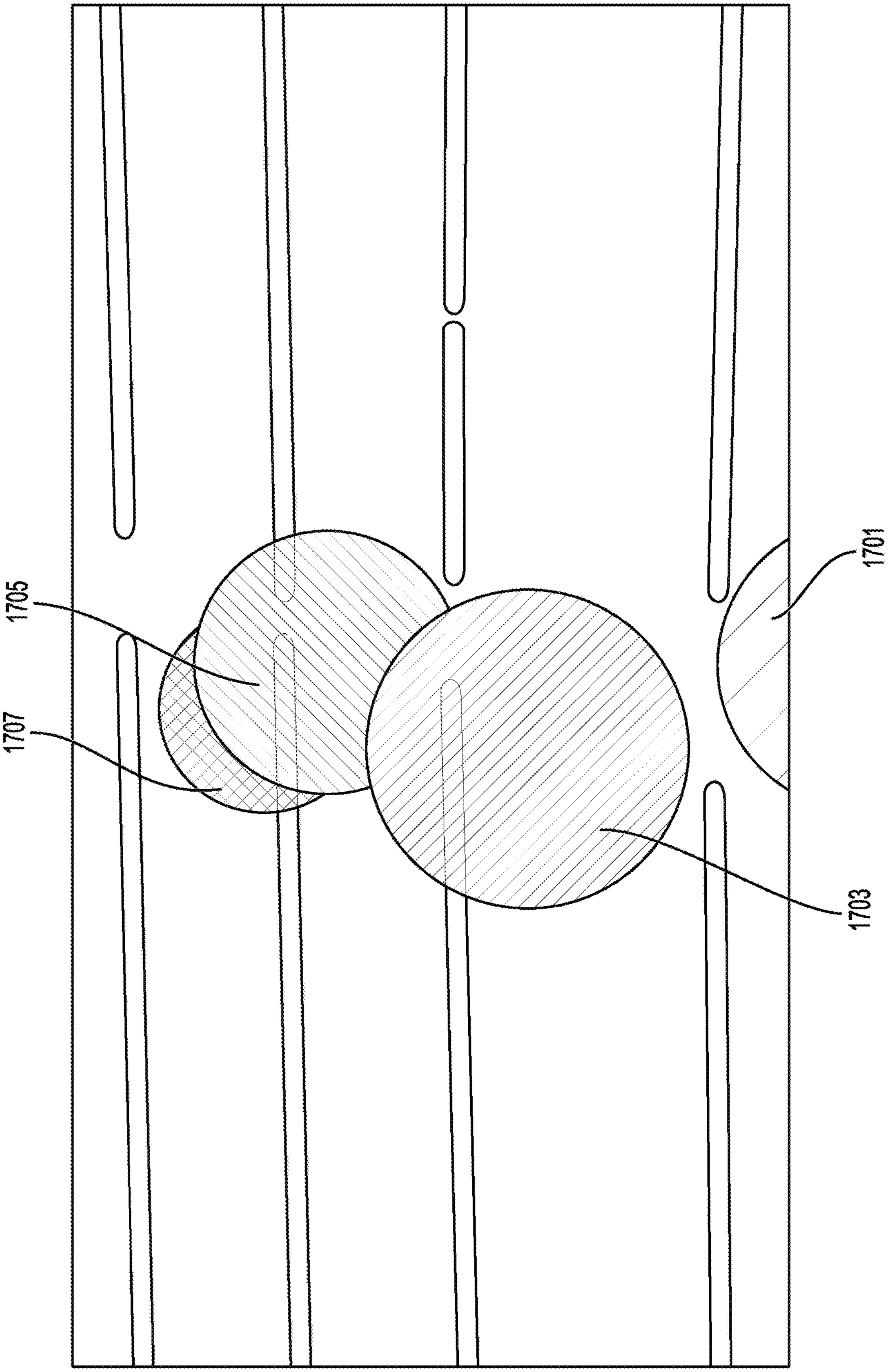
FIG. 17 is a schematic diagram showing an example of a view of a mixed reality environment wherein a user can interact with virtual content that is presented in the mixed reality environment, in accordance with embodiments of the present disclosure.

FIG. 17 provides a schematic diagram showing an example of a view of a mixed reality environment wherein a user can interact with virtual content that is presented in the mixed reality environment. In the embodiment illustrated in FIG. 17, a plurality of projected objects 1703, 1705, 1707 may be positioned in a linear or non-linear orientation within the mixed reality space. Each of the plurality of projected objects 1703, 1705, 1707 may correspond with a setting for the secondary device. Each setting may include a color, brightness, etc. A second, cue, projected object 1701 may be configured to travel along a path upon which the projected objects 1703, 1705, 1707 are located, and when the second cue projected object 1701 interacts with the one of the plurality of projected objects 1703, 1705, 1707, the respective settings of the projected object is applied to the secondary device. For example, a second cue projected may travel along a line of projected objects indicating magenta, yellow, and cyan colors, such that the secondary object is sequentially lit in accordance with the color of the projected objects. In some embodiments, the spacing between individual objects in the plurality of projected objects may be indicative of how long a setting may be applied to the secondary device (i.e., how long the secondary device may project a magenta color before it transitions to a yellow color).

Figure 18:
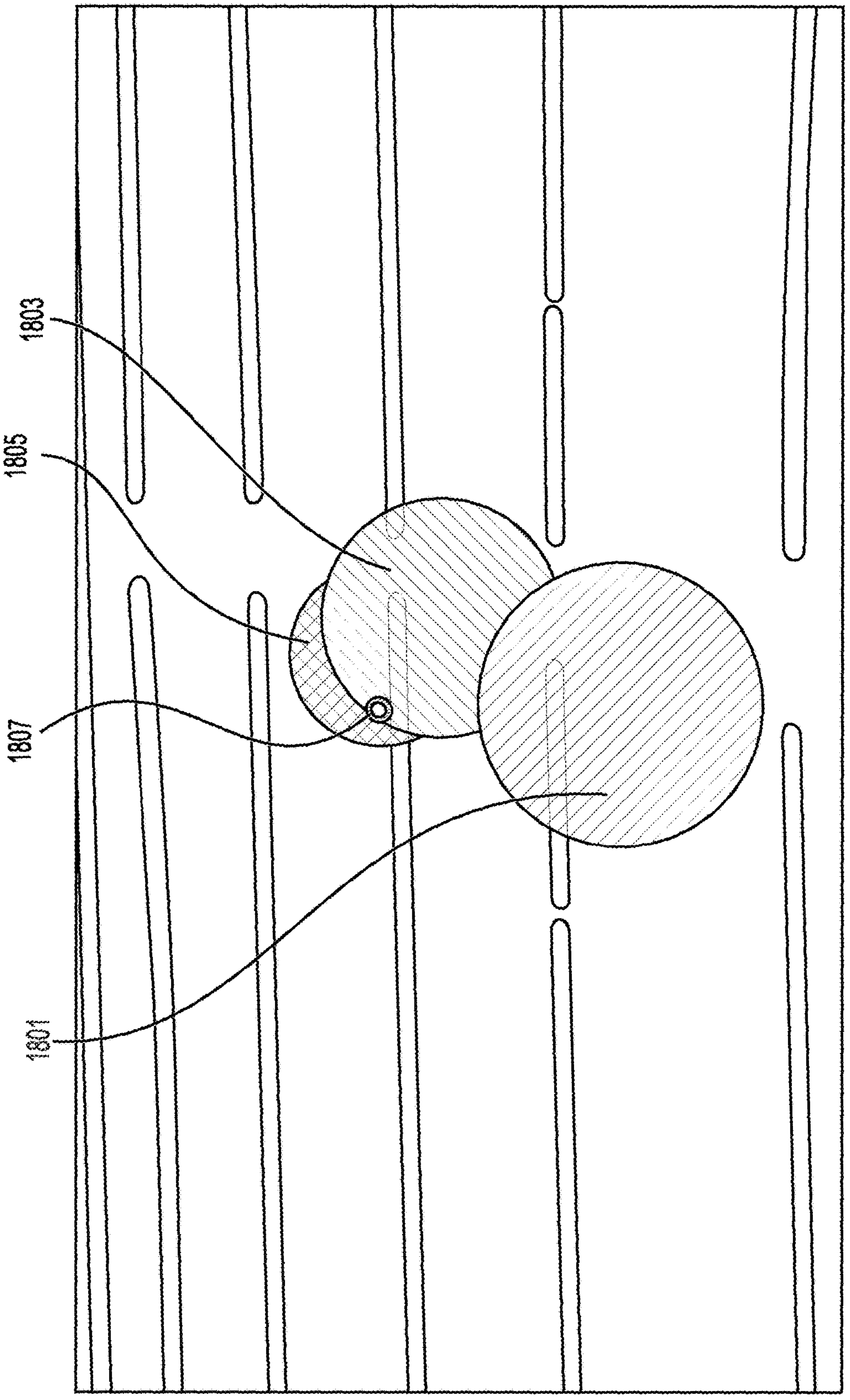
FIG. 18 is a schematic diagram showing an example of a view of a mixed reality environment wherein a user can interact with virtual content that is presented in the mixed reality environment, in accordance with embodiments of the present disclosure.

Similarly, FIG. 18 provides a schematic diagram showing an example of a view of a mixed reality environment wherein a user can interact with virtual content that is presented in the mixed reality environment. In the embodiment illustrated in FIG. 18, a plurality of projected objects 1801, 1803, 1805 may be positioned in a linear or non-linear orientation within the mixed reality space. Each of the plurality of projected objects 1801, 1803, 1805 may correspond with a setting for the secondary device. Each setting may include a color, brightness, etc. A marker projected object 1807 may be used to indicate within the mixed reality environment, which of the settings corresponding to the plurality of projected objects is being applied to the secondary device.

Figure 19:
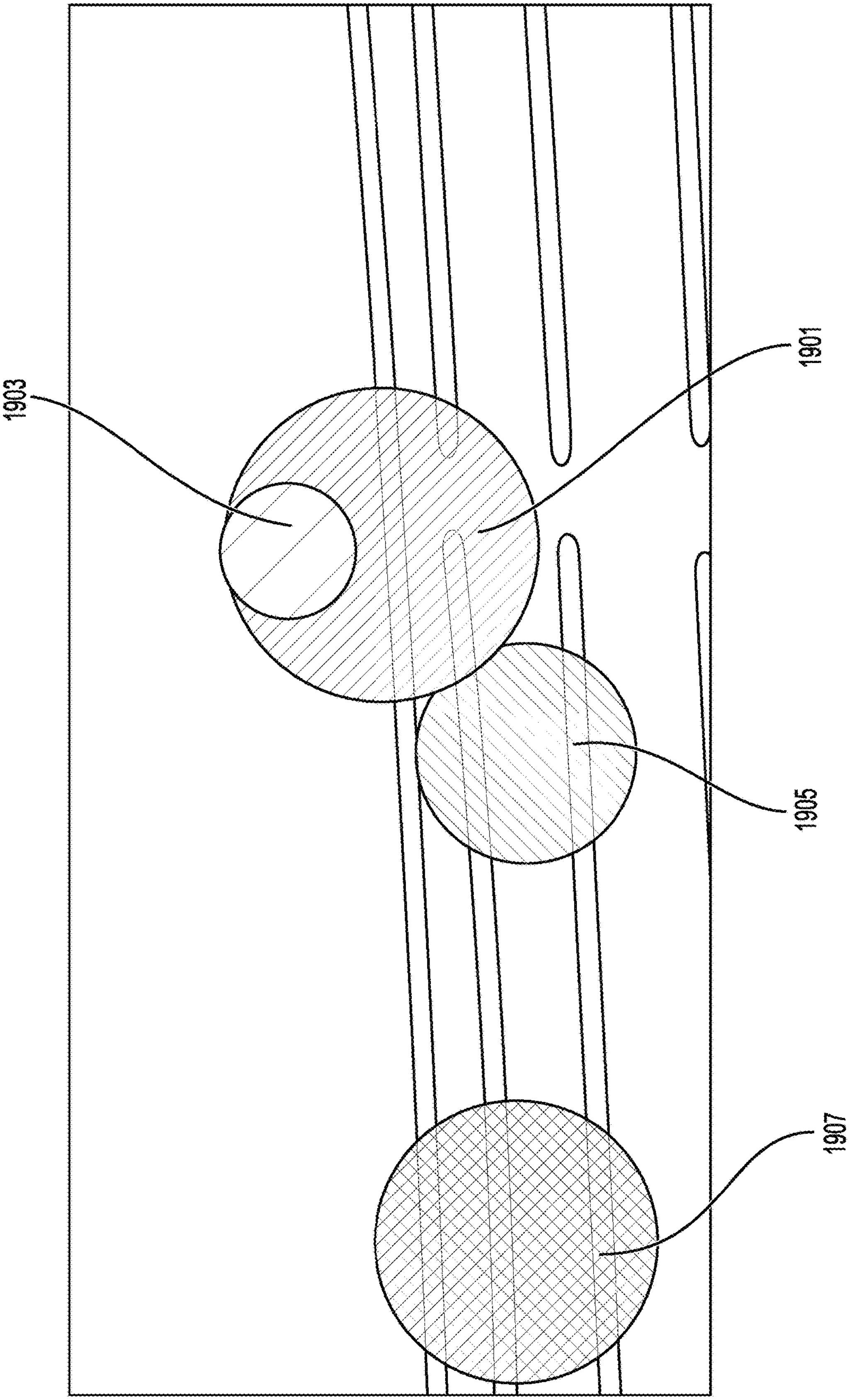
FIG. 19 is a schematic diagram showing an example of a view of a mixed reality environment wherein a user can interact with virtual content that is presented in the mixed reality environment, in accordance with embodiments of the present disclosure.

Similar to the embodiments illustrated in FIGS. 17 and 18, FIG. 19 also provides a schematic diagram showing an example of a view of a mixed reality environment wherein a user can interact with virtual content that is presented in the mixed reality environment. In FIG. 19, a view of when a second cue projected object 1903 interacts with projected images 1901, 1905, 1907 is illustrated. For example, the second cue projected object 1903 may be configured to travel along a path upon which the projected objects 1901, 1905, 1907 are located, and when the second cue projected object 1903 interacts with the one of the plurality of projected objects 1901, 1905, 1907, the respective settings of the projected object is applied to the secondary device.

Figure 20:
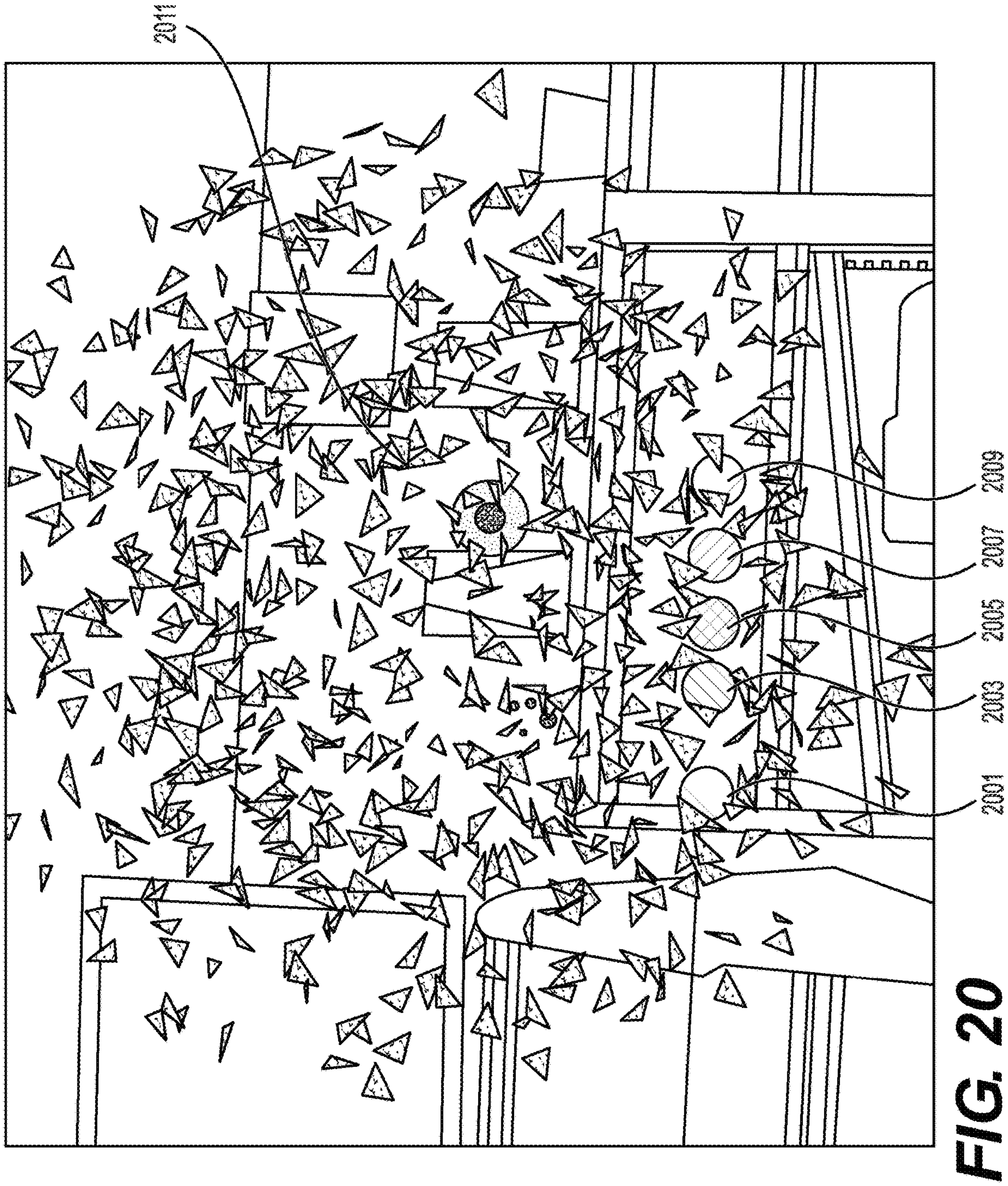
FIG. 20 is a schematic diagram showing an example of a view of a mixed reality environment wherein a user can interact with virtual content that is presented in the mixed reality environment, in accordance with embodiments of the present disclosure.

FIG. 20 provides a schematic diagram showing an example of a view of a mixed reality environment wherein a user can interact with virtual content that is presented in the mixed reality environment. In the embodiment illustrated in FIG. 20, the server system may generate and display a confirmation that a setting has been applied to the secondary device. In some embodiments, the confirmation may take the form of virtually projected confetti 2011 within the mixed reality environment. In some embodiments, the color of the virtually projected confetti 2011 may correspond to the color of the projected object from among the plurality of projected objects 2003, 2005, 2007, 2009 that is selected by the projected cue object 2001.

Figure 21:
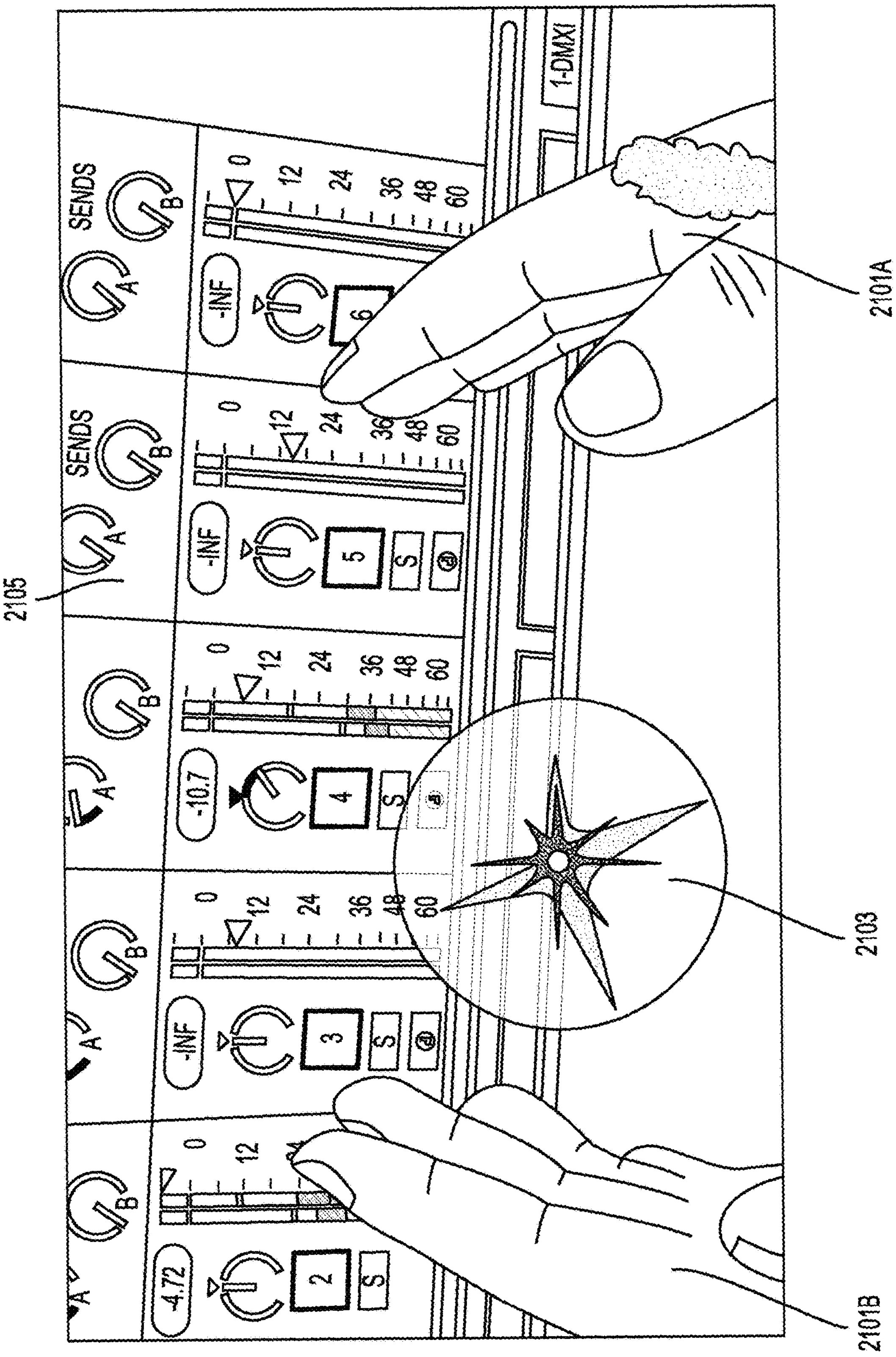
FIG. 21 is a schematic diagram showing an example of a view of a mixed reality environment wherein a user can interact with virtual content that is presented in the mixed reality environment, in accordance with embodiments of the present disclosure.

FIG. 21 provides a schematic diagram showing an example of a view of a mixed reality environment wherein a user can interact with virtual content that is presented in the mixed reality environment. As illustrated, a projected image 2103 may be projected towards a secondary device depicted within the mixed reality environment, responsive to the user making a gesture. As illustrate the secondary device 2105 may include a Digital Audio Workstation ("DAW") or hardware mixer. For example, the user may make a gesture using their hands 2101A, 2101B that may control the projected image 2103 and correspond to one or more settings or parameters for the secondary device 2105. The projected image 2103 may then be projected towards the secondary device 2105 in the mixed reality environment, such that the secondary device 2105 is updated with the chosen parameters. In this manner, the mixed reality user device may be used to control the operation of the secondary device 2105.

Figure 22:
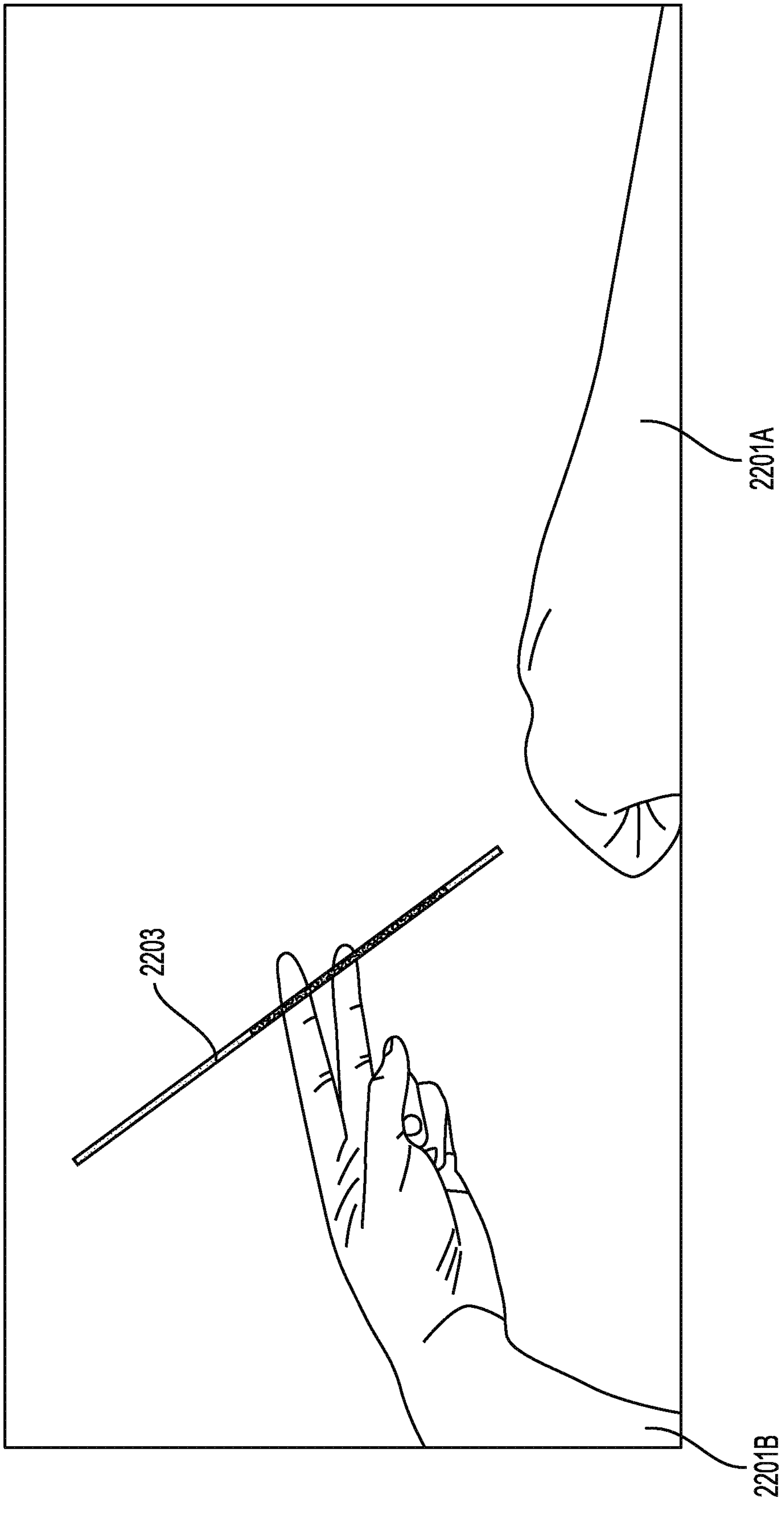
FIG. 22 is a schematic diagram showing an example of a view of a mixed reality environment wherein a user can interact with virtual content that is presented in the mixed reality environment, in accordance with embodiments of the present disclosure.

FIG. 22 provides a schematic diagram showing an example of a view of a mixed reality environment wherein a user can interact with virtual content that is presented in the mixed reality environment. For example, in FIG. 22 the user may be performing a gesture that is used in the mixed reality environment to target secondary devices such as lights or speakers. For example, the user may make a gestural formation that mimes an archer's bow. For example, the user may make the gestural formation using their hands 2201A, 2201B that may control the projected image 2203.

Figure 23:
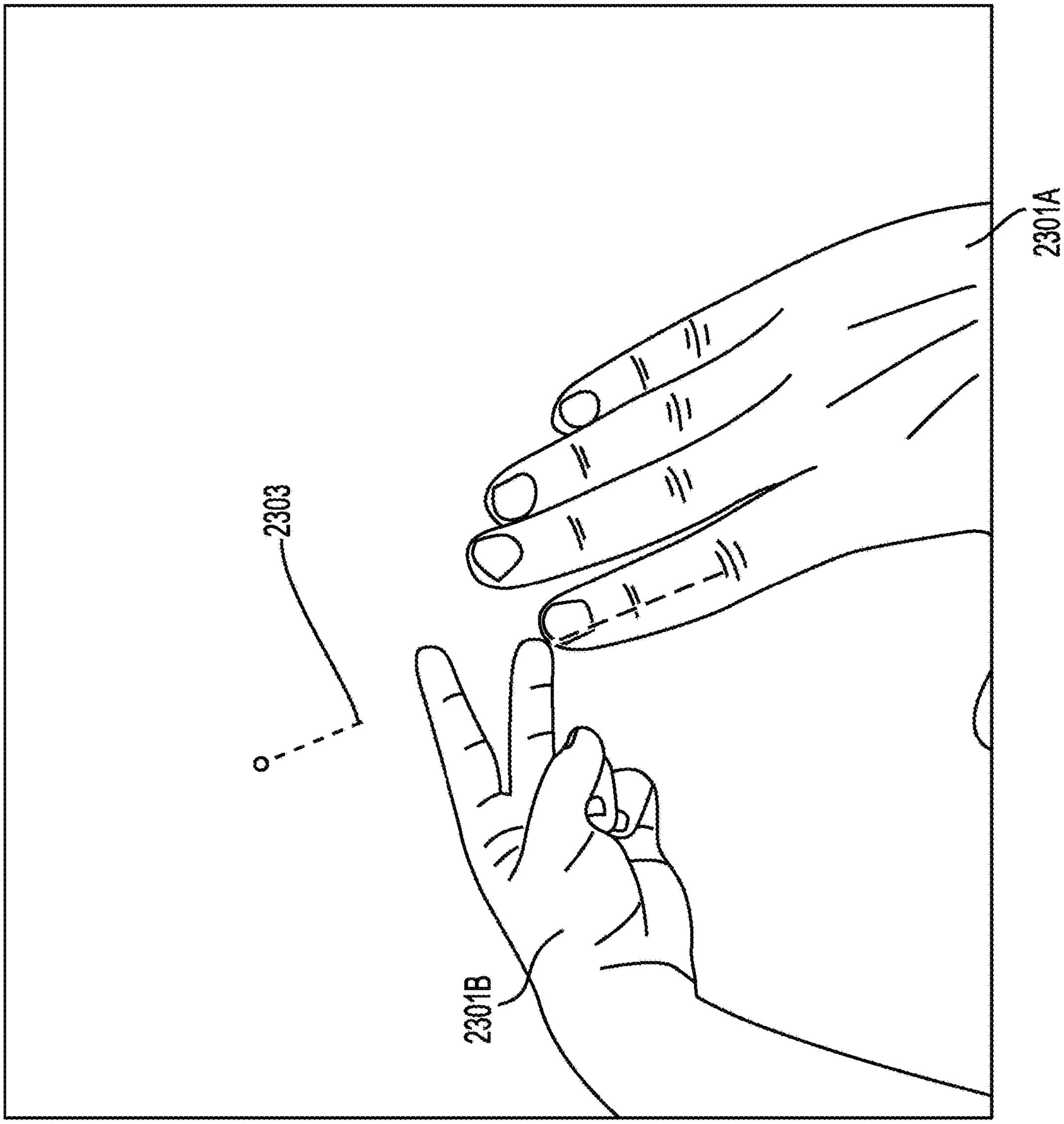
FIG. 23 is a schematic diagram showing an example of a view of a mixed reality environment wherein a user can interact with virtual content that is presented in the mixed reality environment, in accordance with embodiments of the present disclosure.

In accordance with the gesture illustrated in FIG. 22, a user may receive visual, aural and/or haptic feedback responsive to the bow gesture that aids in the targeting of a light or speaker in the mixed reality environment with precision. As illustrated in FIGS. 22 and 23, the bow may be activated by the user extending one hand 2201B, 2301B in front of the body and making a pose with their fingers (the "peace sign" pose). Then, the second hand 2201A makes a fist and is placed behind the first hand. By pulling the fisted hand 2201A back towards the user's body and away from the front hand 2201B, the user can draw a virtual bow. A virtual guide or virtual object 2203 is generated by calculating the angular relationship of the two hands and drawing a virtual line through both hands that extends past the hands until it reaches a target. The user can see this virtual path which aids in the precision of aiming at a target.

In addition, when the virtual guide hits a target (when the bow is properly aimed a secondary device within the mixed reality environment), a virtual overlay of that light indicates that the target is locked. In some embodiments, when the user activates the bow, a virtual arrow appears. By rotating the fisted hand 2201A (i.e., clockwise or counter-clockwise), the color of the virtual arrow changes. In some embodiments, this selects the color data that will be sent to the target light once the bow is released. In some embodiments, the further the fisted hand is pulled back, the brighter the arrow becomes. This gesture may be used to select the brightness (the value of the dimmer channel) that will be sent to the target light once the bow is released. Once the fisted hand is released (the user opens their hand from fist to open palm 2301A), as is illustrated in FIG. 23, the virtual arrow is shot on its path towards the target. The color and brightness data that was selected when drawing the bow is transmitted to the light. While color and brightness are discussed above as parameters that are adjusted thru gestural input, it is envisioned that any other suitable parameters may be used.

The gestural configuration depicted in FIGS. 22 and 23 may also be used for control of audio speakers. For example, the rotation of the fist can select a sample, and the draw of the bow can determine for how long that sample will play for once the bow is launched (e.g., 1 measure to 4 measures). The draw of the bow could also determine the volume of the sample. By targeting speakers in space, the user can act as a virtual archer, that can place audio samples. This may be used in an immersive audio setup where there are 4 or more speakers in a mixed reality environment that can be targeted.

FIG. 23 also provides a schematic diagram showing an example of a view of a mixed reality environment wherein a user can interact with virtual content that is presented in the mixed reality environment. For example, in FIG. 23 the user may be performing a gesture that is used in the mixed reality environment to target secondary devices such as lights or speakers. For example, the user may make a gestural formation that mimes an archer's bow. For example, the user may make the gestural formation using their hands 2301A, 2301B that may control the projected image 2303. The gestural formation in FIG. 23 may be a second step in the formation after the formation illustrated in FIG. 22.

Figure 24:
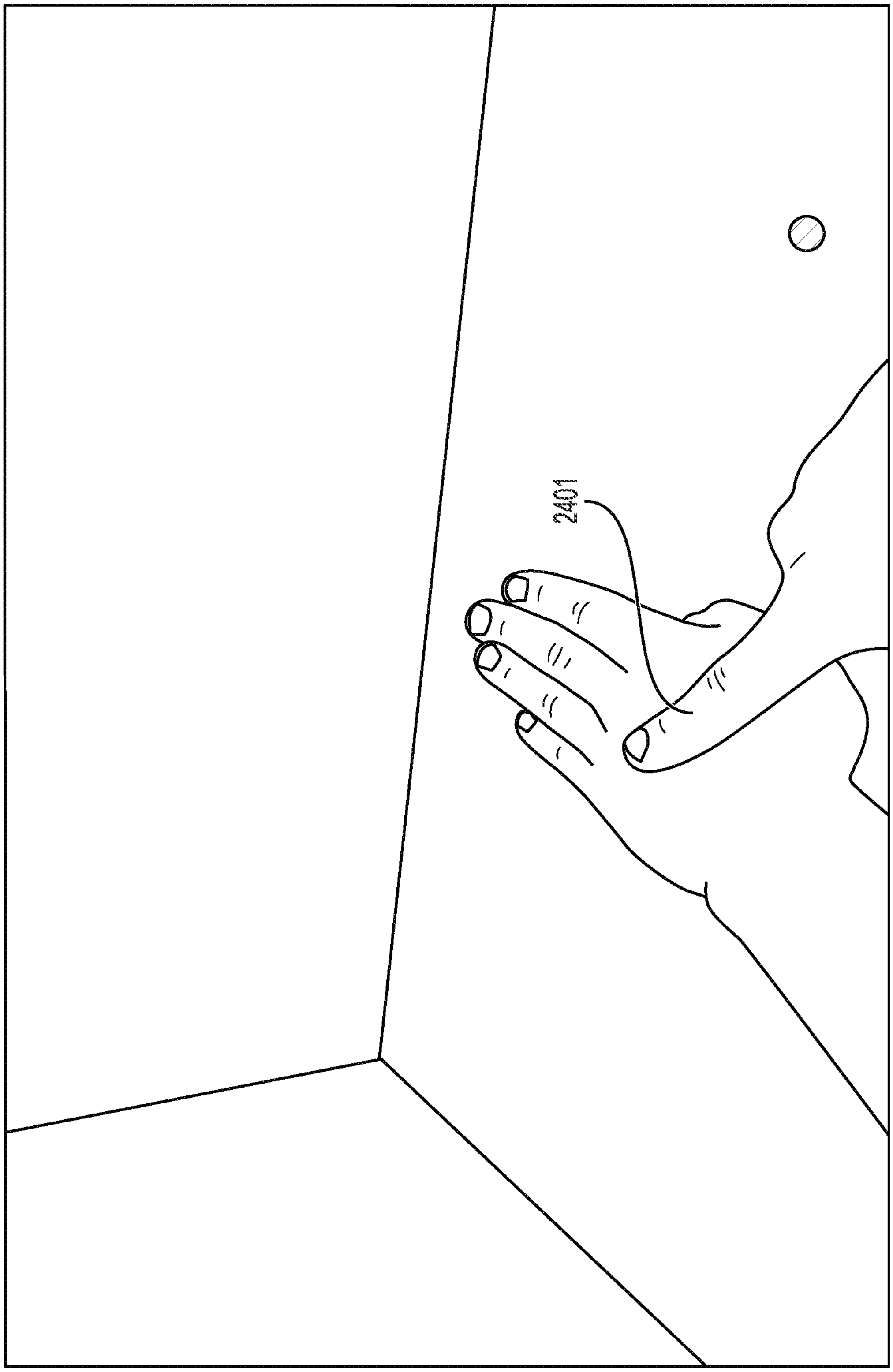
FIG. 24 is a schematic diagram showing an example of a view of a mixed reality environment wherein a user can interact with virtual content that is presented in the mixed reality environment, in accordance with embodiments of the present disclosure.

FIG. 24 provides a schematic diagram showing an example of a view of a mixed reality environment where a user can interact with virtual content presented in the mixed reality environment. For example, in FIG. 24, a user may utilize body taps 2401 to generate a virtual or projected object within the mixed reality environment. In some embodiments, the user may utilize the body taps to control the virtual or projected object. Additionally, in some embodiments, the user may utilize body taps to send a command directly to a secondary device.

Figure 25:
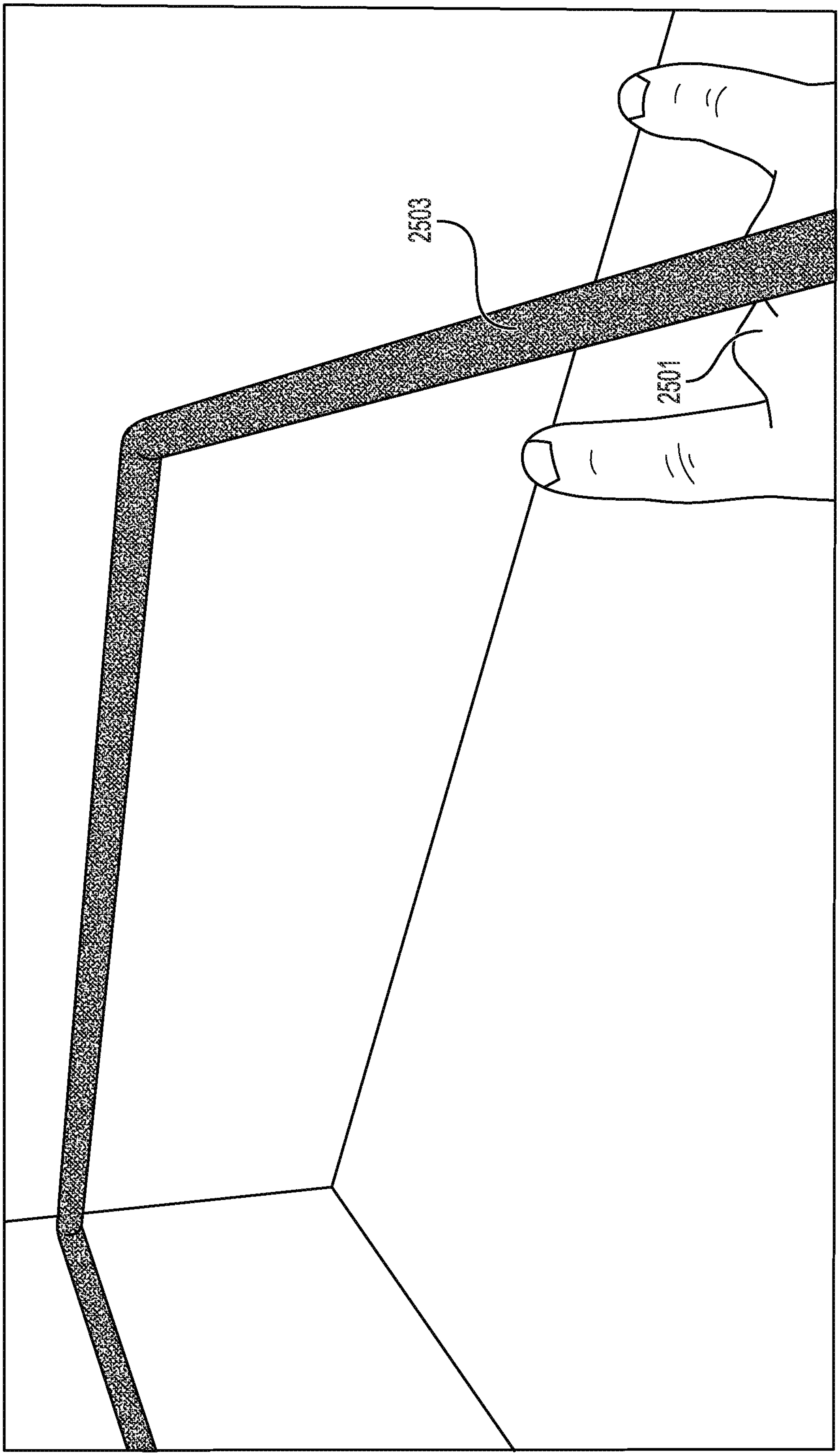
FIG. 25 is a schematic diagram showing an example of a view of a mixed reality environment wherein a user can interact with virtual content that is presented in the mixed reality environment, in accordance with embodiments of the present disclosure.

FIG. 25 provides a schematic diagram showing an example of a view of a mixed reality environment where a user can interact with virtual content presented in the mixed reality environment. For example, in FIG. 25, a user may make a gesture 2501 that is associated with a path 2503 that spans the mixed reality environment. For example, path 2503 may be representative of the physical path of a secondary device like a camera on a motorized dolly.

Figure 26:
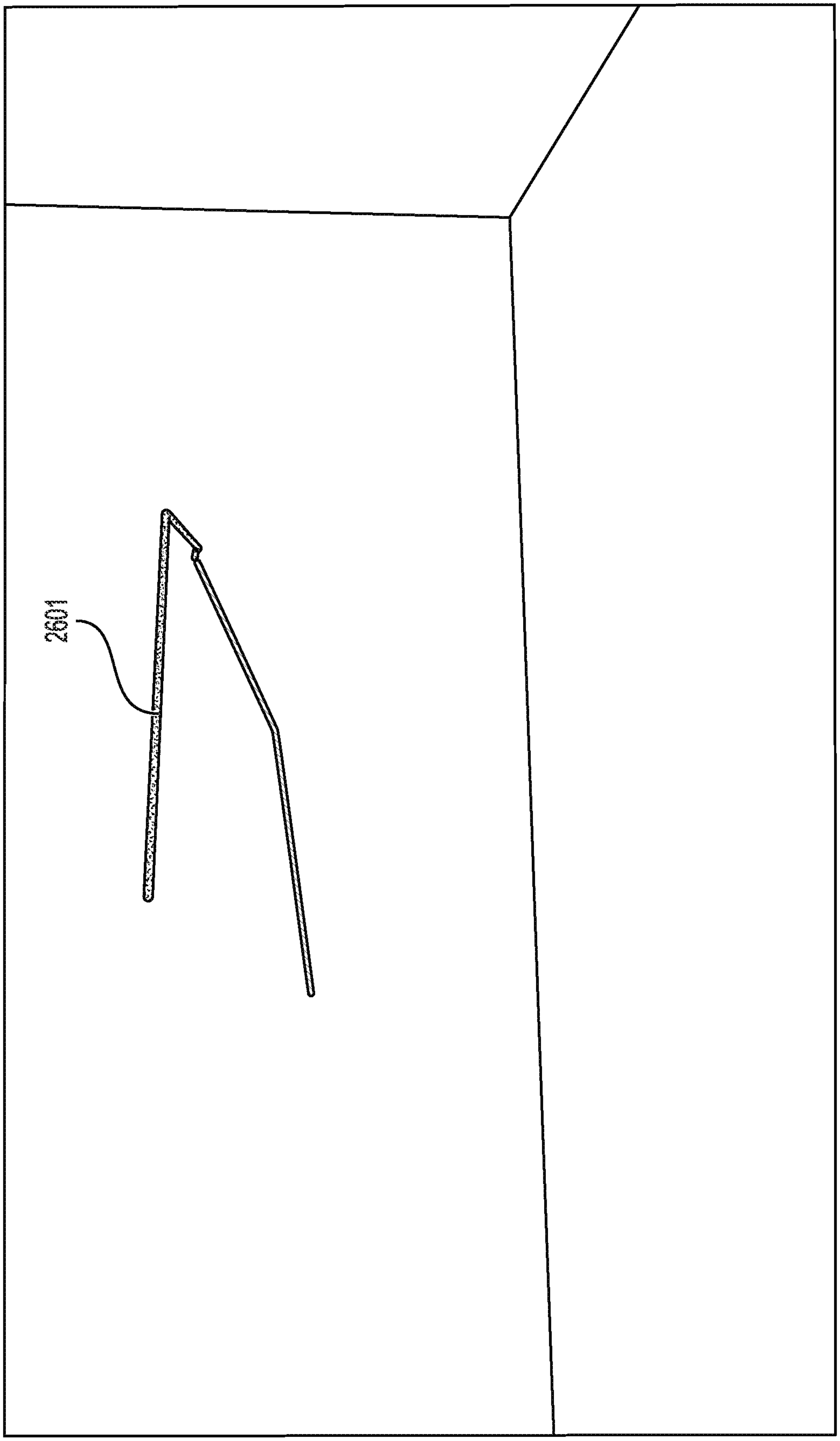
FIG. 26 is a schematic diagram showing an example of a view of a mixed reality environment wherein a user can interact with virtual content that is presented in the mixed reality environment, in accordance with embodiments of the present disclosure.

FIG. 26 provides an illustration of a path within the mixed reality environment 26-1. In some embodiments the path 2601 may represent the movement plan for a secondary device. For example, the path 2601 may represent the movement plan for a dolly carrying a camera, a robotic element, a drone and the like.

Figure 27:
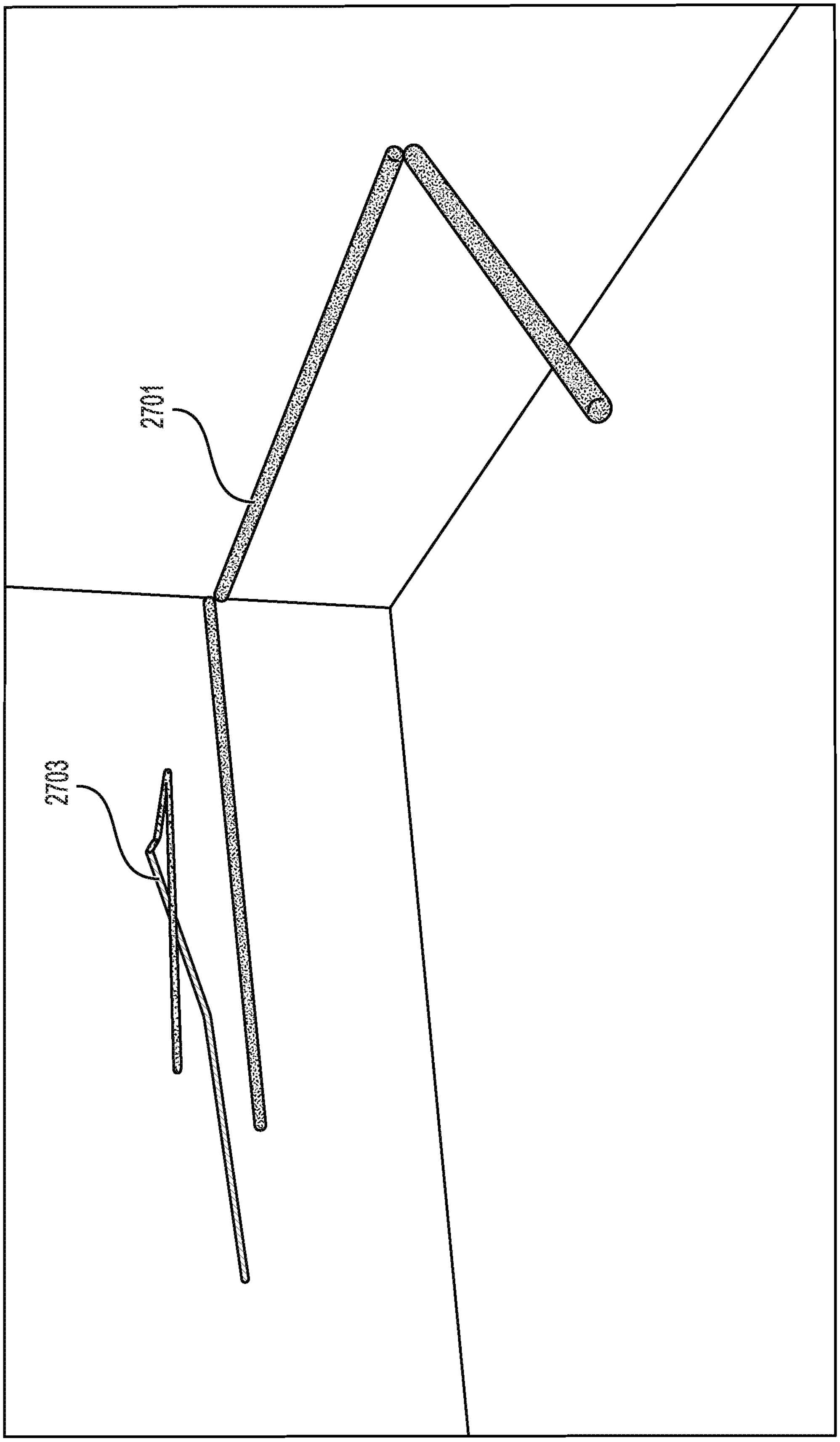
FIG. 27 is a schematic diagram showing an example of a view of a mixed reality environment wherein a user can interact with virtual content that is presented in the mixed reality environment, in accordance with embodiments of the present disclosure.

FIG. 27 illustrates a first secondary device path 2701 and a second secondary device path 2703 in the mixed reality environment. For example, two separate secondary devices or cameras may have paths that are generated using the disclosed systems and shown in the mixed reality environment. The disclosed systems provide advantages over conventional methods for moving virtual objects in space, by allowing hand motions to control objects within a mixed reality environment. For example, paths may guide the movement of motorized dolly systems such as those used on film sets and at live events. The paths may include cinematography paths that can be pre-programmed on a computer or tablet or pre-programmed using gestures in a mixed environment space. The gestural path may be edited, adjusted, saved and copied into a camera path that can be recreated at a later time.

Further, the first secondary device path 2701 and the second secondary device path 2703 may be paths for a single device at two different times. For example, all the different shots that may be taken by a single device camera on a motorized dolly across a particular day may be visualized in the physical space.

Figure 28:
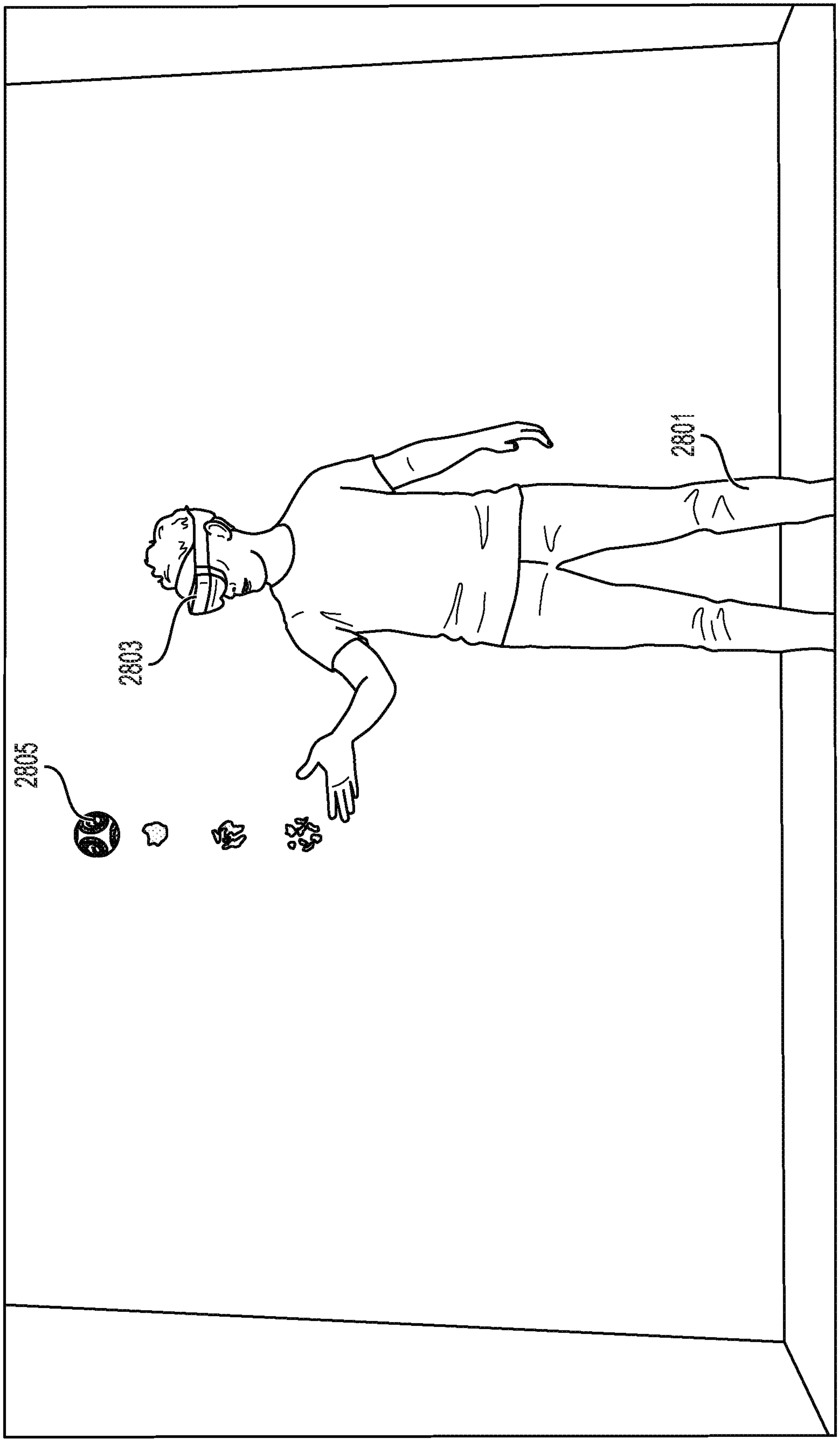
FIG. 28 is a schematic diagram showing an example of a view of a mixed reality environment wherein a user can interact with virtual content that is presented in the mixed reality environment, in accordance with embodiments of the present disclosure.
Figure 29:
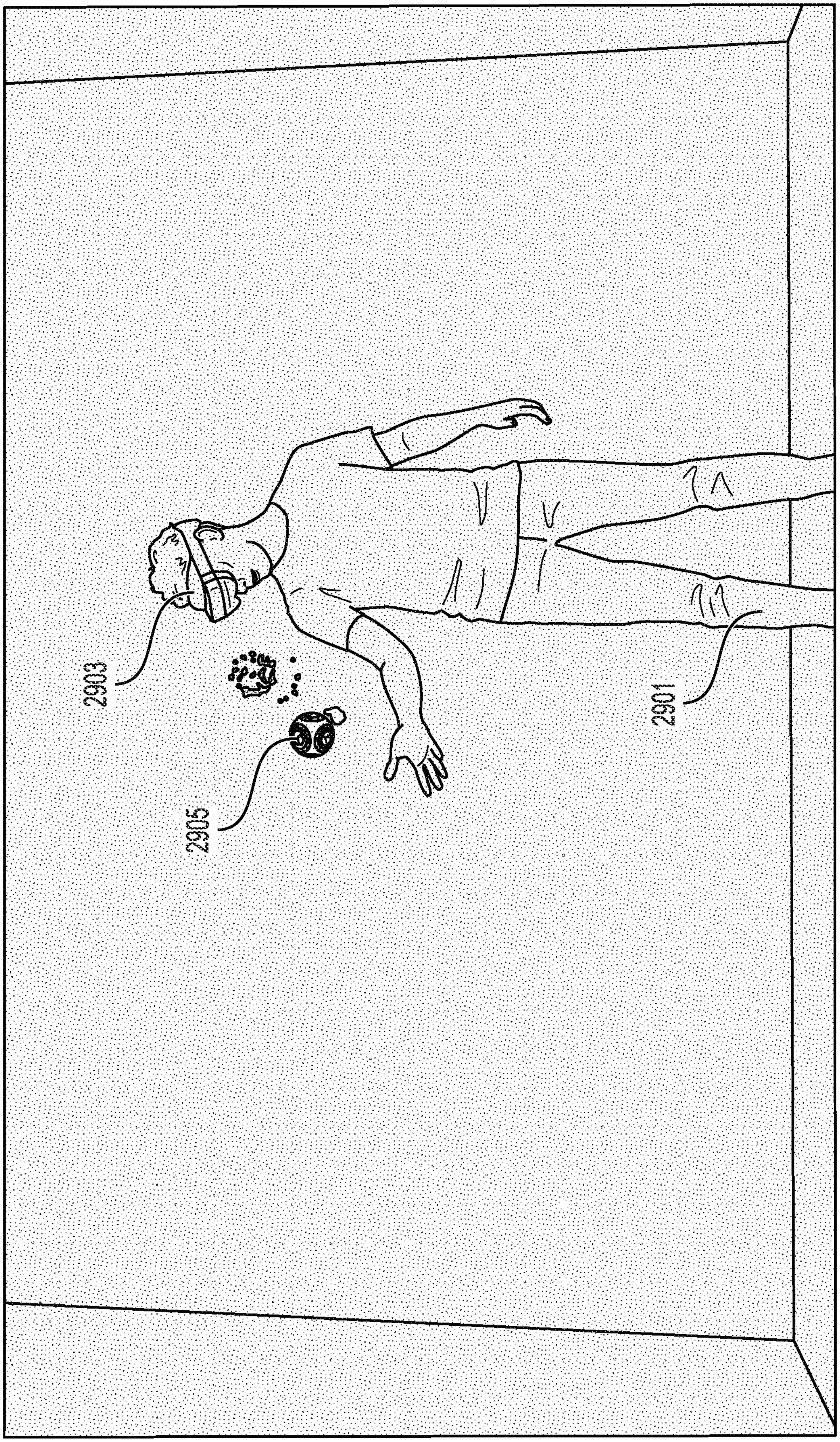
FIG. 29 is a schematic diagram showing an example of a view of a mixed reality environment wherein a user can interact with virtual content that is presented in the mixed reality environment, in accordance with embodiments of the present disclosure.

FIG. 28 illustrates a user 2801 of a mixed reality user device 2803 who has generated and is controlling a virtual object 2805 as shown in the mixed reality environment. Similarly, FIG. 29 illustrates a user 2901 of a mixed reality user device 2903 who has generated and is controlling a virtual object 2905 in a mixed reality environment. As illustrated, the entire body of the user 2801 or 2901 may be used as a controller for the secondary device. The user's physical relationship to the virtual object 2805 and 2905 manipulates the view in the respective mixed reality environment.

Figure 30:
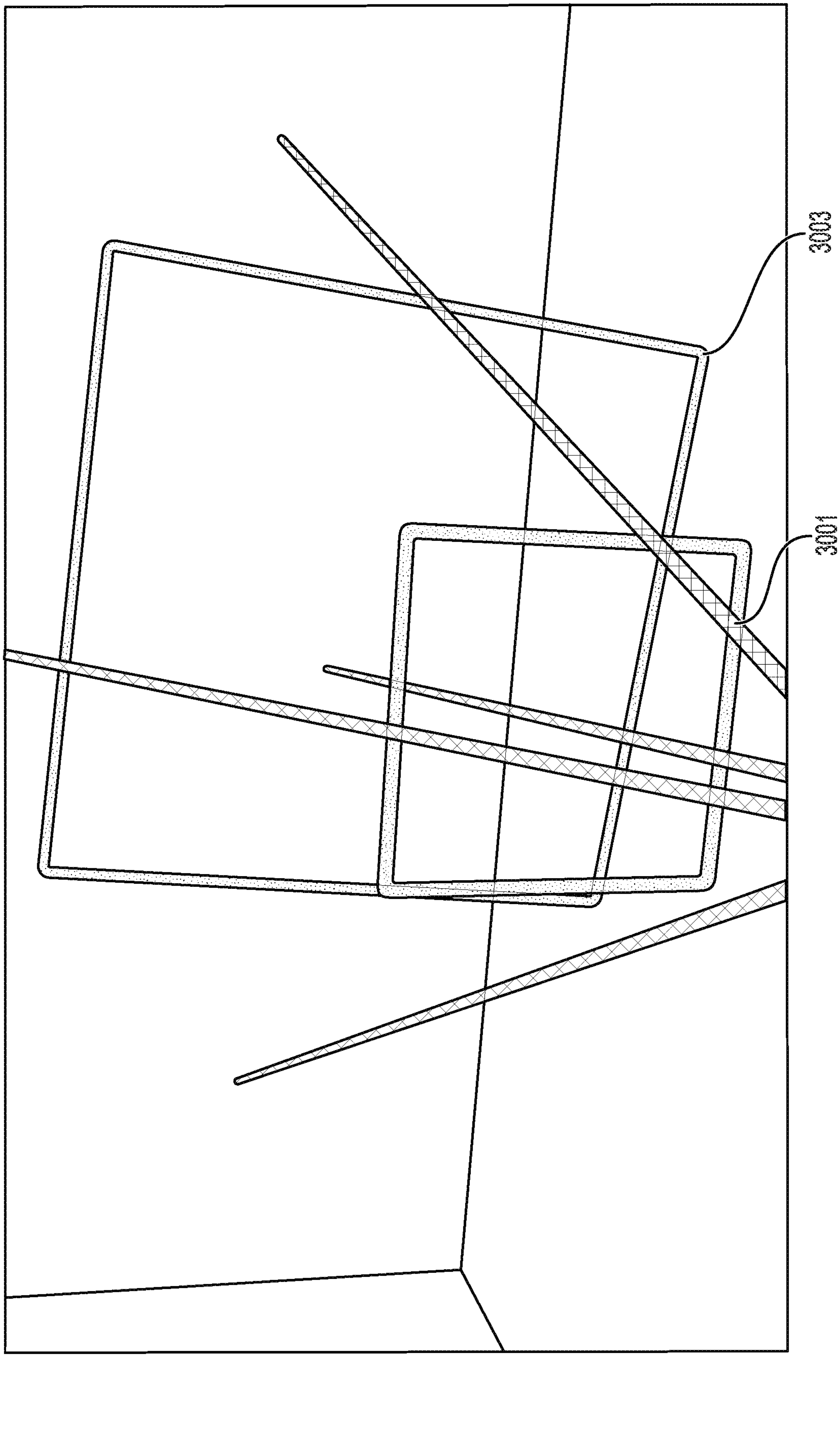
FIG. 30 is a schematic diagram showing an example of a view of a mixed reality environment wherein a user can interact with virtual content that is presented in the mixed reality environment, in accordance with embodiments of the present disclosure.

FIG. 30 illustrates a disclosed system where the mixed reality environment will be used to show a section of the field of view 3003 and the frame lines of the depth of field 3001 of a particular camera within the mixed reality environment.

Figure 31:
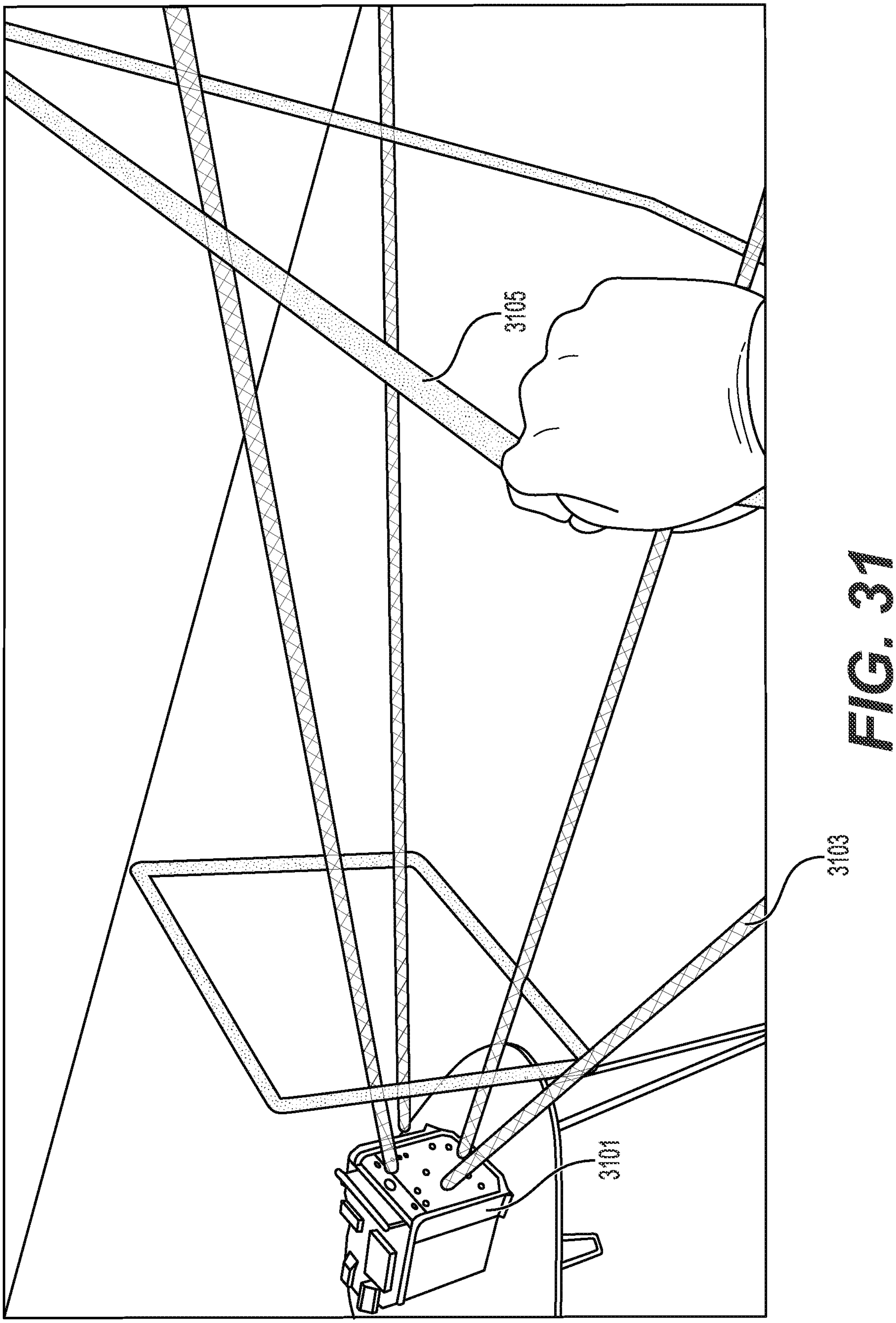
FIG. 31 is a schematic diagram showing an example of a view of a mixed reality environment wherein a user can interact with virtual content that is presented in the mixed reality environment, in accordance with embodiments of the present disclosure.

FIG. 31 illustrates an application of the disclosed system, utilizing a camera 3101 and using the mixed reality environment to determine the area in focus 3105 and field of view cone 3103 of the particular camera's position. As discussed herein, utilizing a camera 3101 may provide advantages in cinematography. A user's hand may be used to move the virtual representation across the z-axis to change the settings on the secondary device or camera.

Figure 32:
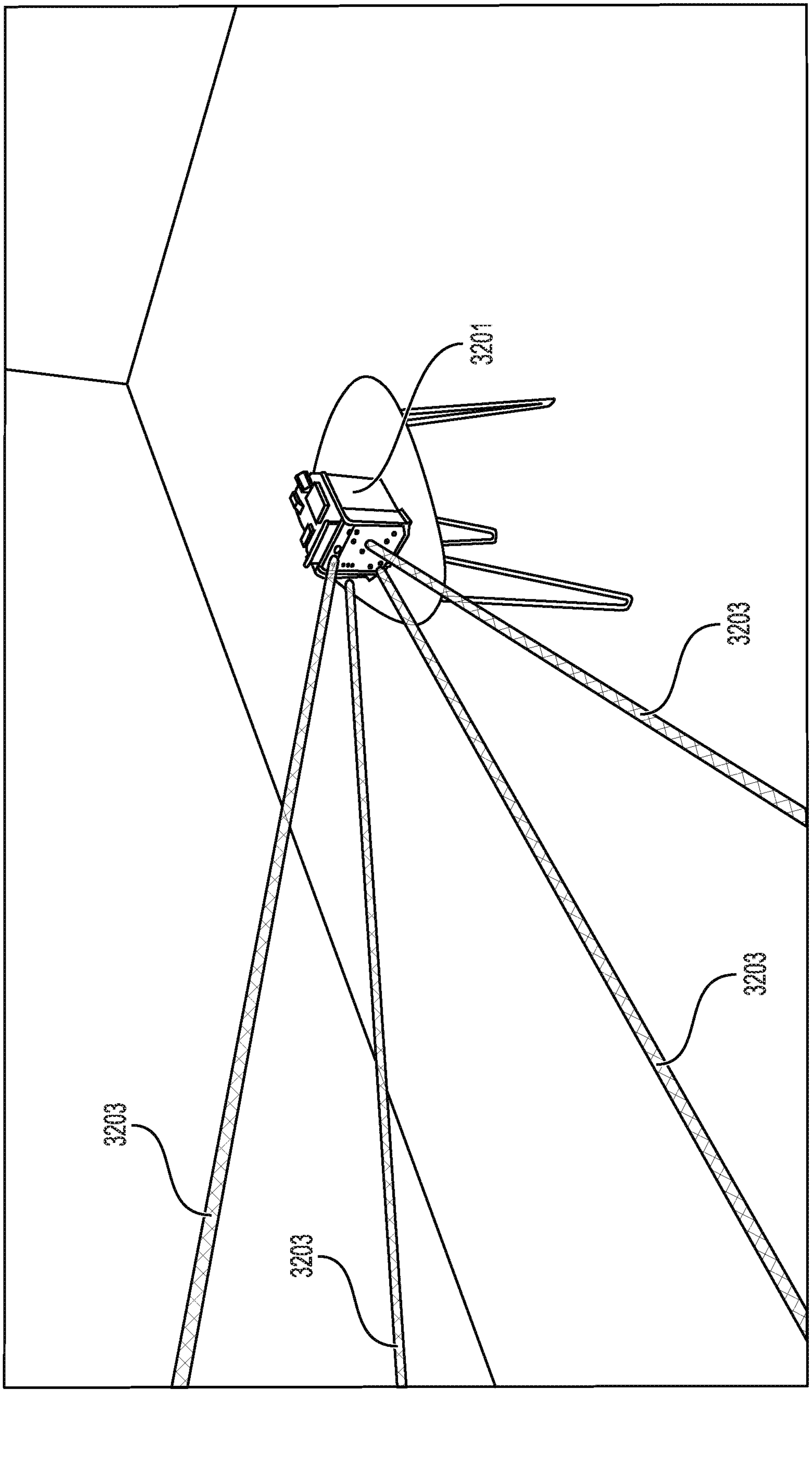
FIG. 32 is a schematic diagram showing an example of a view of a mixed reality environment wherein a user can interact with virtual content that is presented in the mixed reality environment, in accordance with embodiments of the present disclosure.
Figure 33:
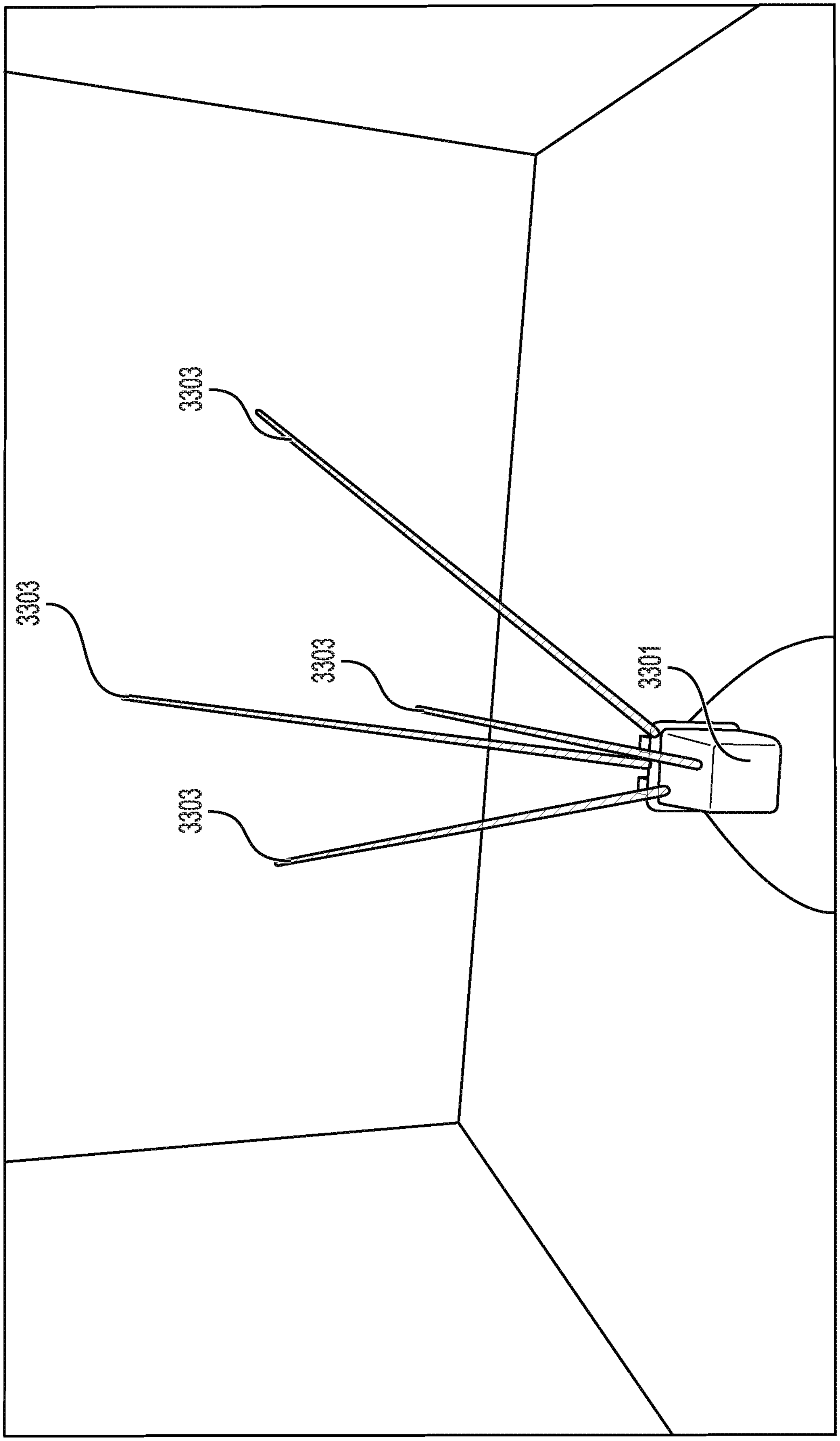
FIG. 33 is a schematic diagram showing an example of a view of a mixed reality environment wherein a user can interact with virtual content that is presented in the mixed reality environment, in accordance with embodiments of the present disclosure.

FIG. 32 illustrates an application of the disclosed system, utilizing a camera 3201 and using the mixed reality environment to determine the field of view 3203 of the camera. Similarly, FIG. 33 illustrates an application of the disclosed system, utilizing a camera 3301 and using the mixed reality environment to determine the field of view 3303 of the camera. The projected virtual object may represent the field of view of the camera, or what a camera is able to see.

Figure 34:
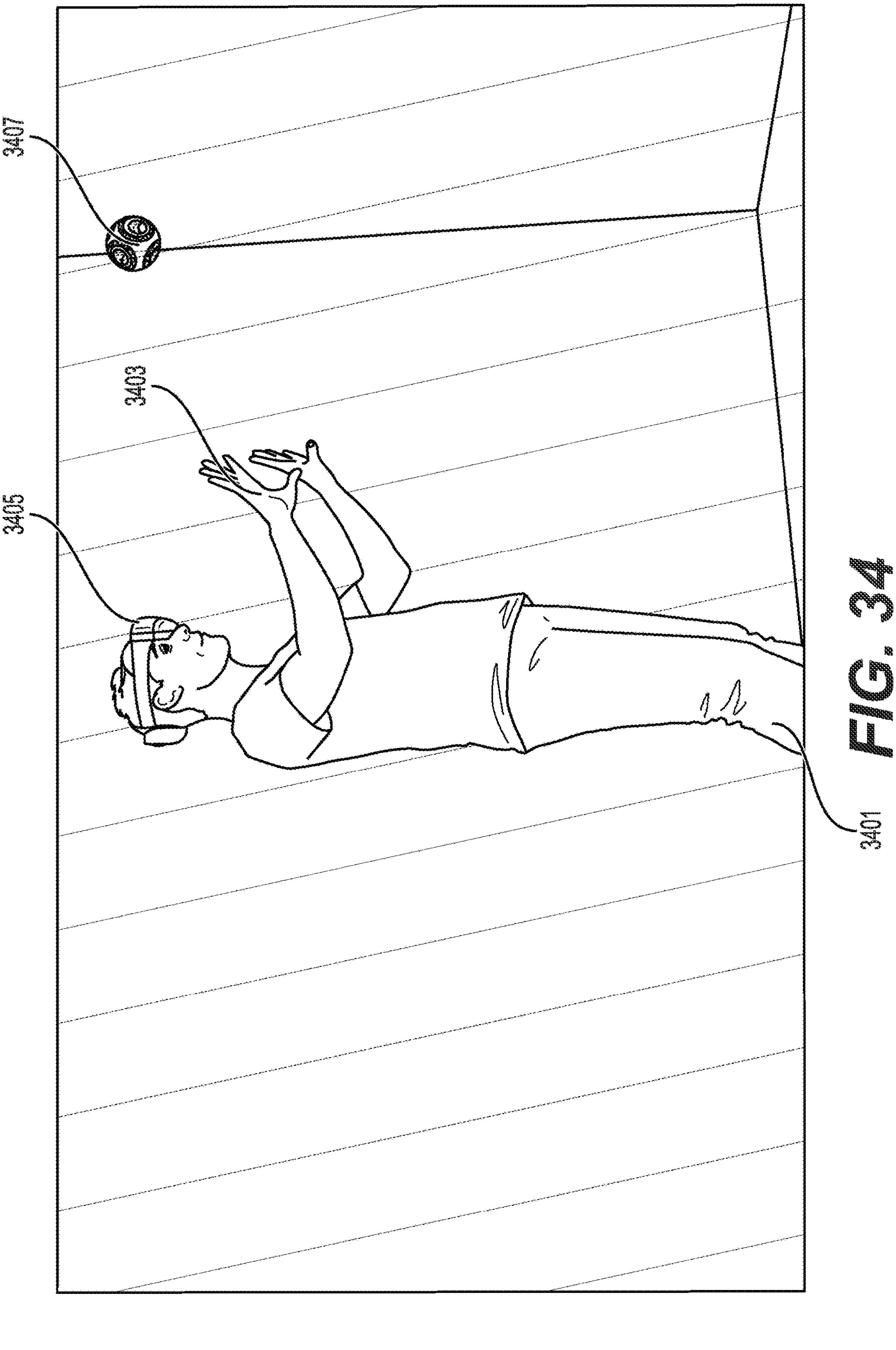
FIG. 34 is a schematic diagram showing an example of a view of a mixed reality environment wherein a user can interact with virtual content that is presented in the mixed reality environment, in accordance with embodiments of the present disclosure.

FIG. 34 illustrates a user 3401 of a mixed reality user device 3405 who is using gestures 3403 to generate and/or control a virtual object 3407 within the mixed reality environment. For example, the user 3401 launches a virtual object 3407 away from the user, and utilizes a "palms out" position, such that the virtual object moves away from the user.

Figure 35:
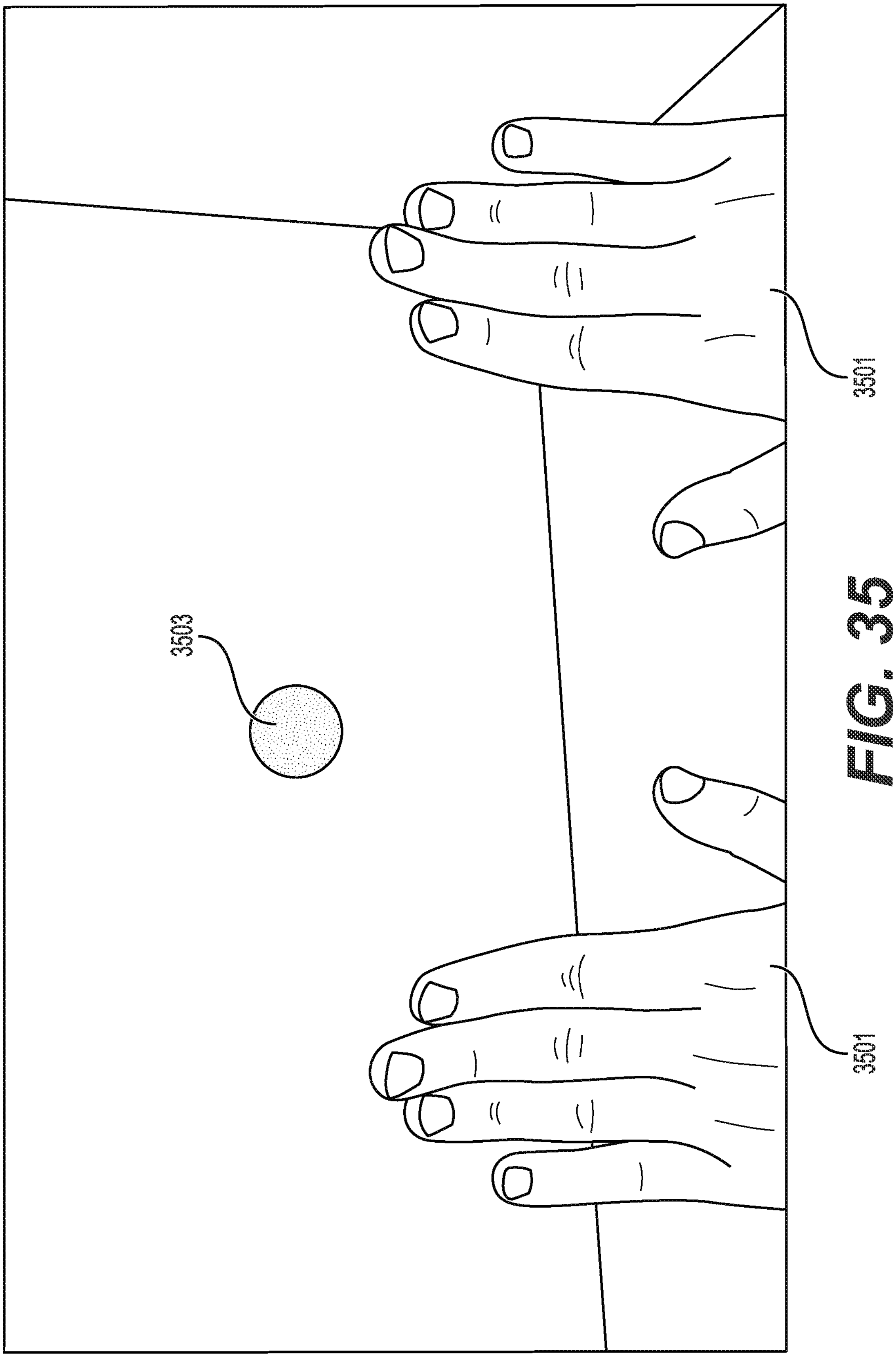
FIG. 35 is a schematic diagram showing an example of a view of a mixed reality environment wherein a user can interact with virtual content that is presented in the mixed reality environment, in accordance with embodiments of the present disclosure.
Figure 36:
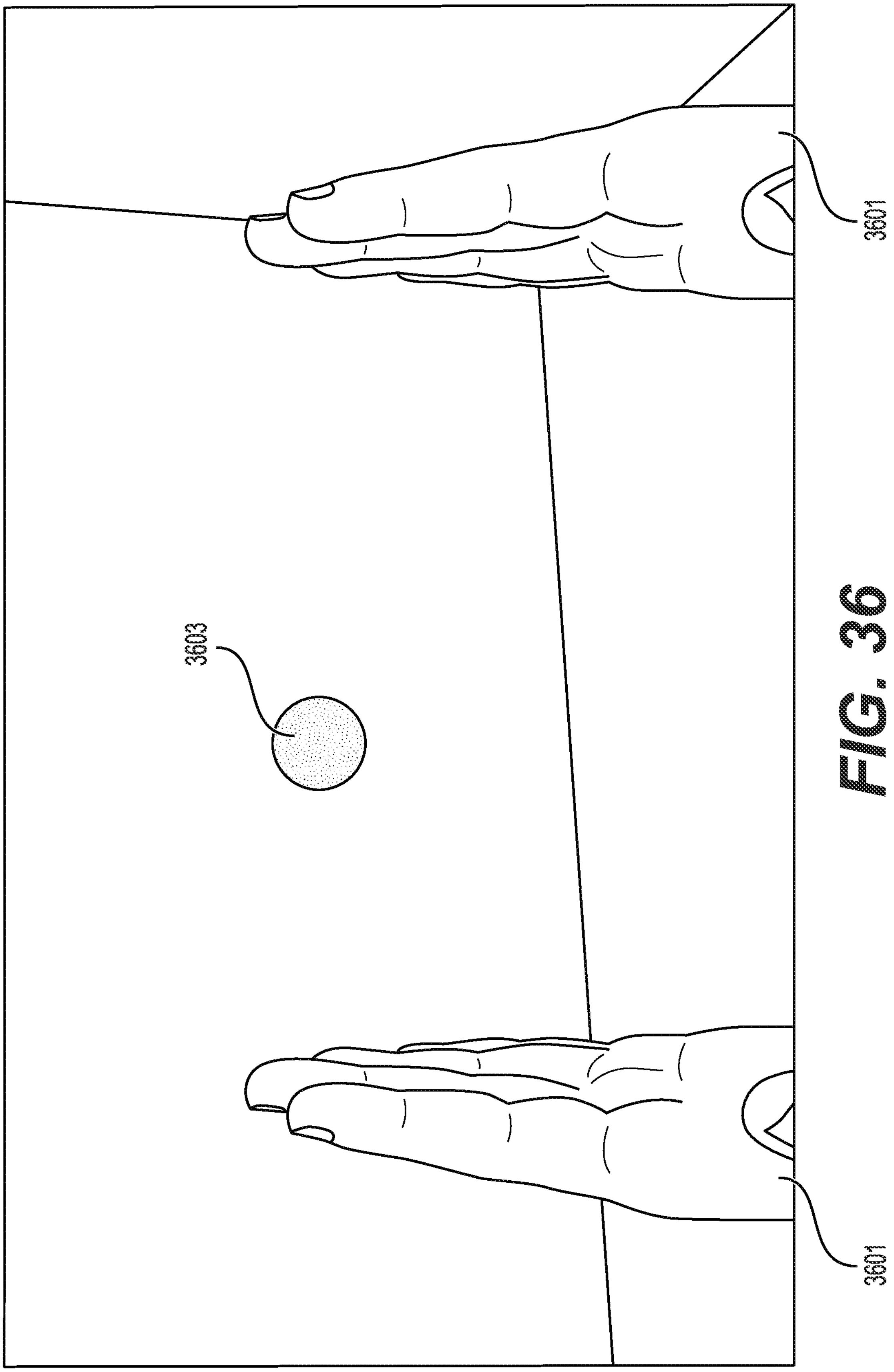
FIG. 36 is a schematic diagram showing an example of a view of a mixed reality environment wherein a user can interact with virtual content that is presented in the mixed reality environment, in accordance with embodiments of the present disclosure.
Figure 37:
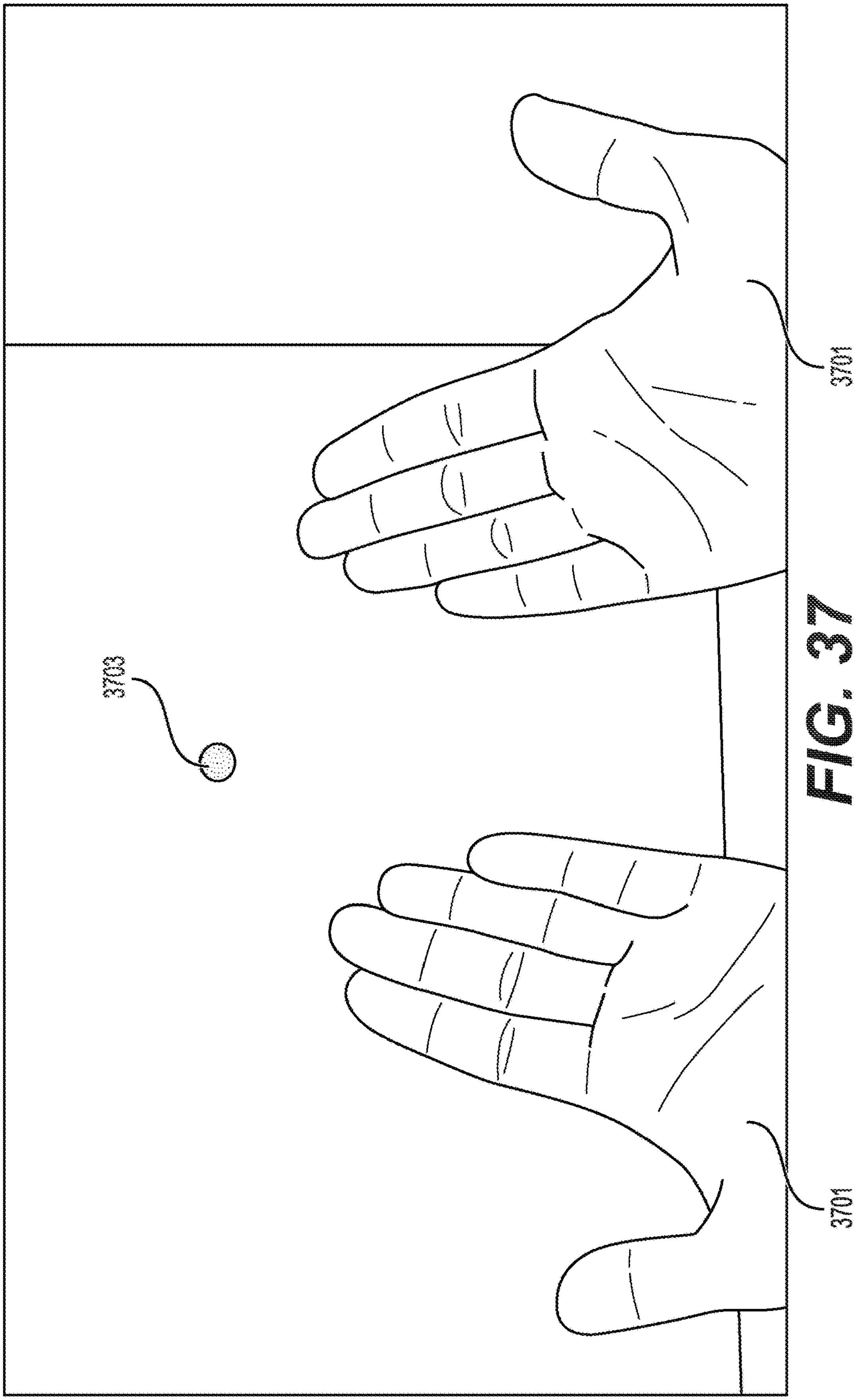
FIG. 37 is a schematic diagram showing an example of a view of a mixed reality environment wherein a user can interact with virtual content that is presented in the mixed reality environment, in accordance with embodiments of the present disclosure.
Figure 38:
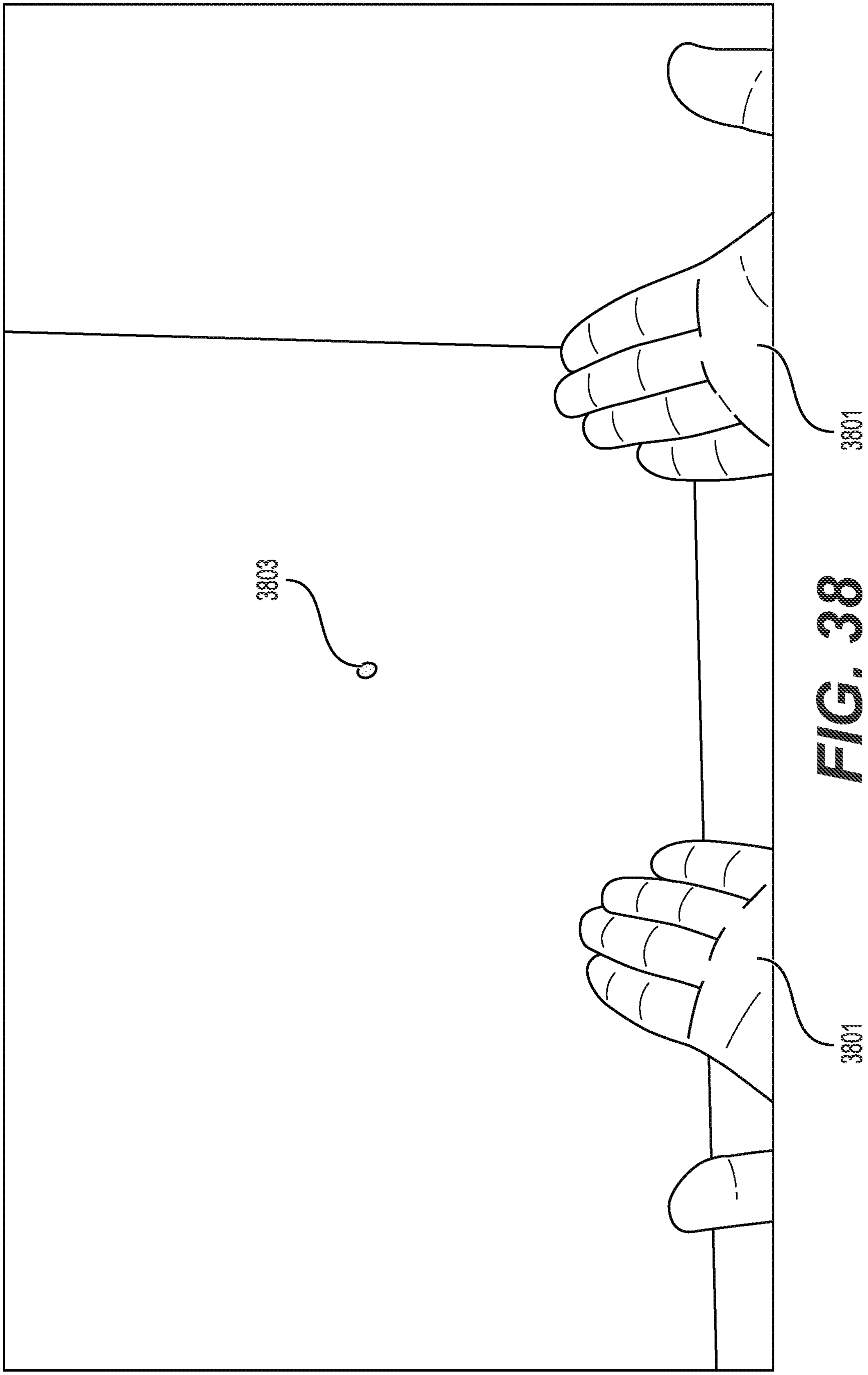
FIG. 38 is a schematic diagram showing an example of a view of a mixed reality environment wherein a user can interact with virtual content that is presented in the mixed reality environment, in accordance with embodiments of the present disclosure.
Figure 39:
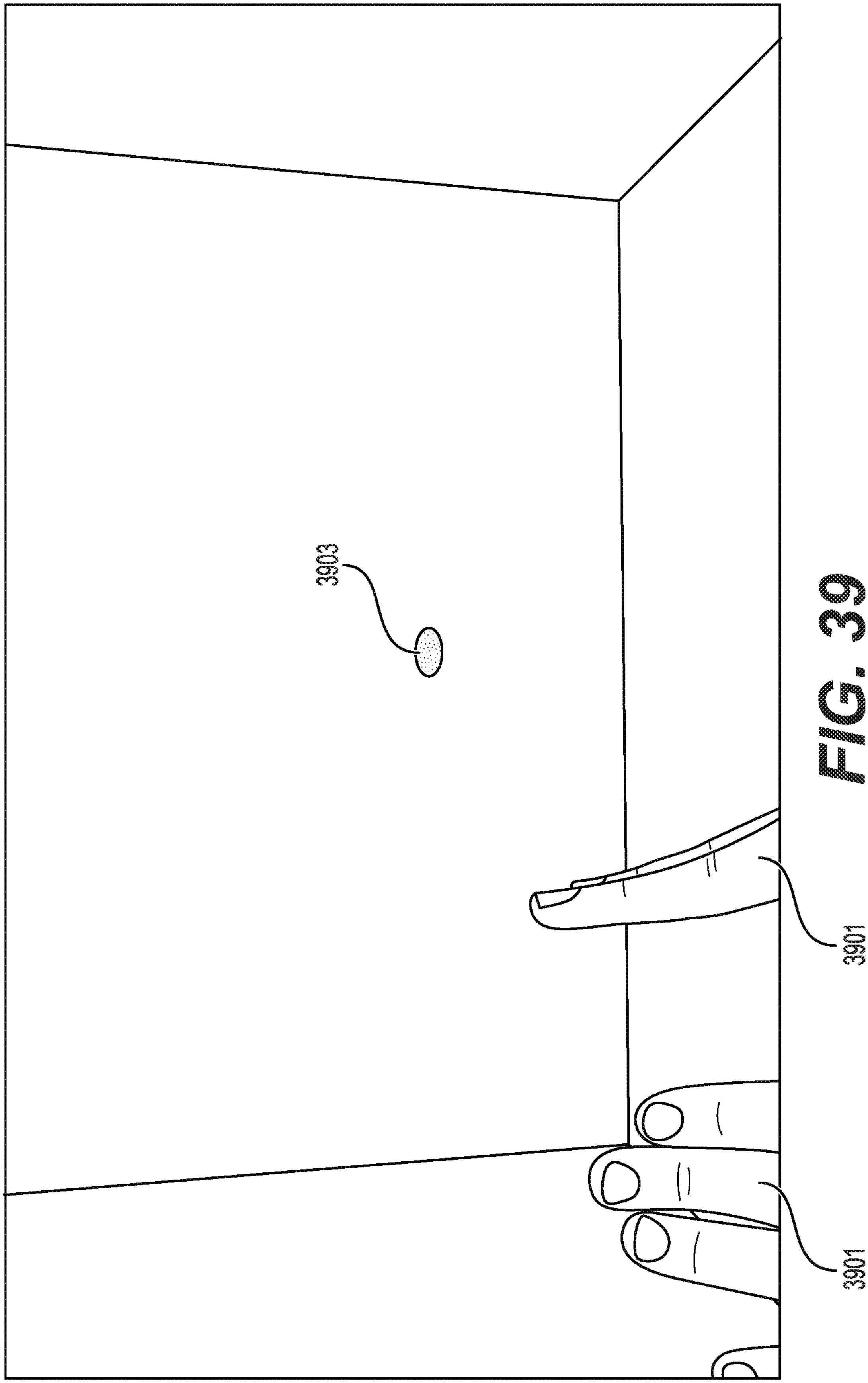
FIG. 39 is a schematic diagram showing an example of a view of a mixed reality environment wherein a user can interact with virtual content that is presented in the mixed reality environment, in accordance with embodiments of the present disclosure.

FIGS. 35-39 illustrates the perspective of a user of the mixed reality system, where the user utilizes gestures via their hands 3501 to control the virtual object 3503 in the mixed reality environment. As illustrated in FIGS. 35-36, as the positioning and gestures of the hands change from 3501 to 3601, the parameters of the virtual object 3603 may also change. For example, the size, color, and/or position of the virtual object may change. A neutral position, where no force is exerted on the virtual object 3603 is illustrated in FIG. 36. For example, when the user adopts a palms up gesture as shown in 3701, the virtual object 3703 may be projected farther away from the user, and in some embodiments, the virtual object may rise or traverse the Y-axis in the mixed reality environment. As the user tilts their hands further way from their body in pose 3801, as illustrated in FIG. 38, the virtual object 3803 may become smaller. Further, as the user utilizes a different gesture 3901, in FIG. 39, the virtual object 3903 takes a different corresponding shape. For example, the gesture may correspond to applying a force on the virtual object towards the left, in order to make a curved motion.

Figure 40:
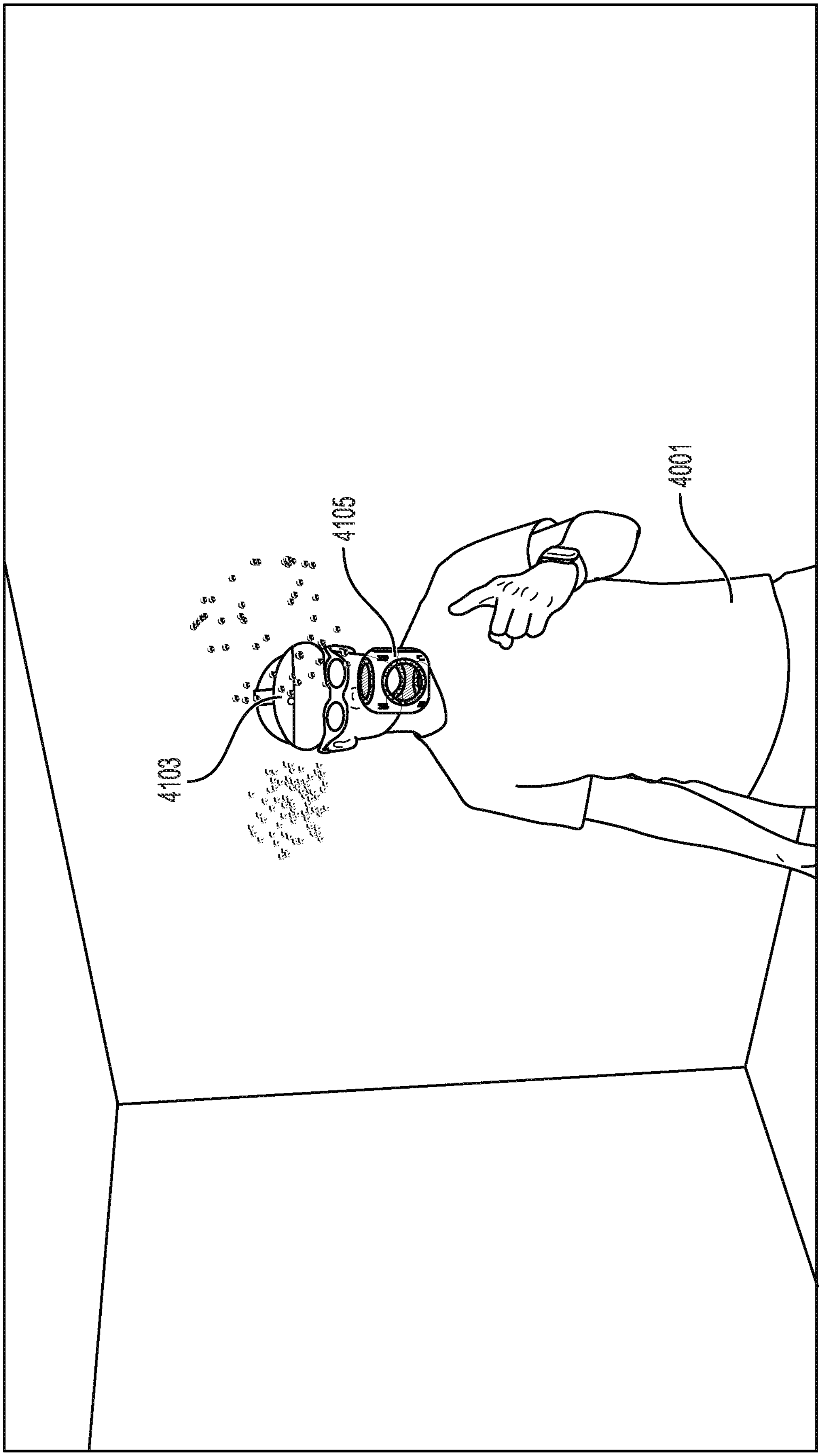
FIG. 40 is a schematic diagram showing an example of a view of a mixed reality environment wherein a user can interact with virtual content that is presented in the mixed reality environment, in accordance with embodiments of the present disclosure.

FIG. 40 illustrates a user of the mixed reality system within the mixed reality environment. For example, the user 4001 is using a mixed reality user device 4103 and is controlling a virtual object 4105. The example illustrated in FIG. 40 may correspond to a "pose-tap."

Figure 41:
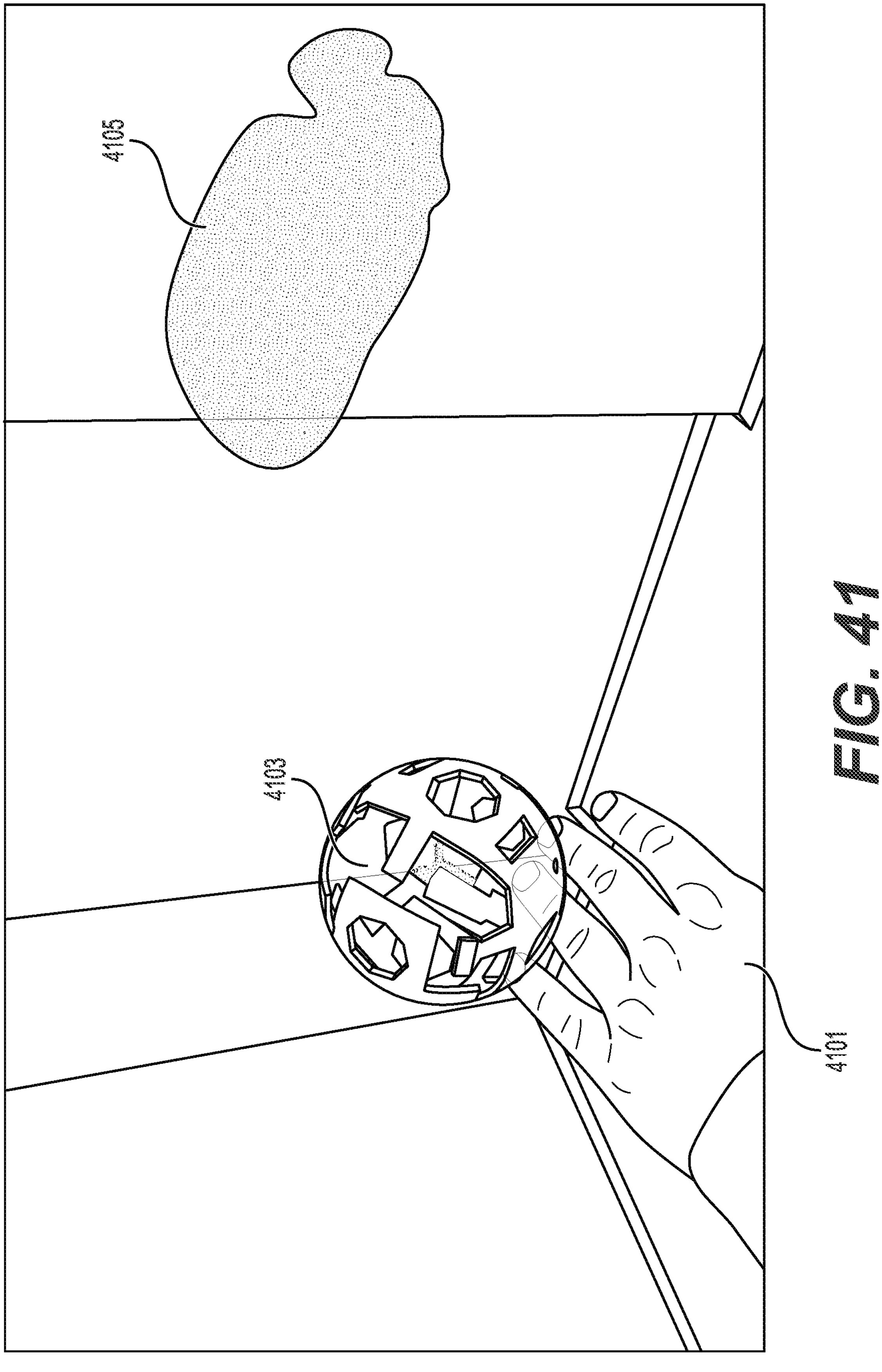
FIG. 41 is a schematic diagram showing an example of a view of a mixed reality environment wherein a user can interact with virtual content that is presented in the mixed reality environment, in accordance with embodiments of the present disclosure.

FIG. 41 illustrates another example of a user operating within the mixed reality environment. A user may gesture and virtually touch via hands 4101 a virtual object 4013 in order to control a second virtual object 4105. In some embodiments, the second virtual object 4105 may be a cloud.

Figure 42:
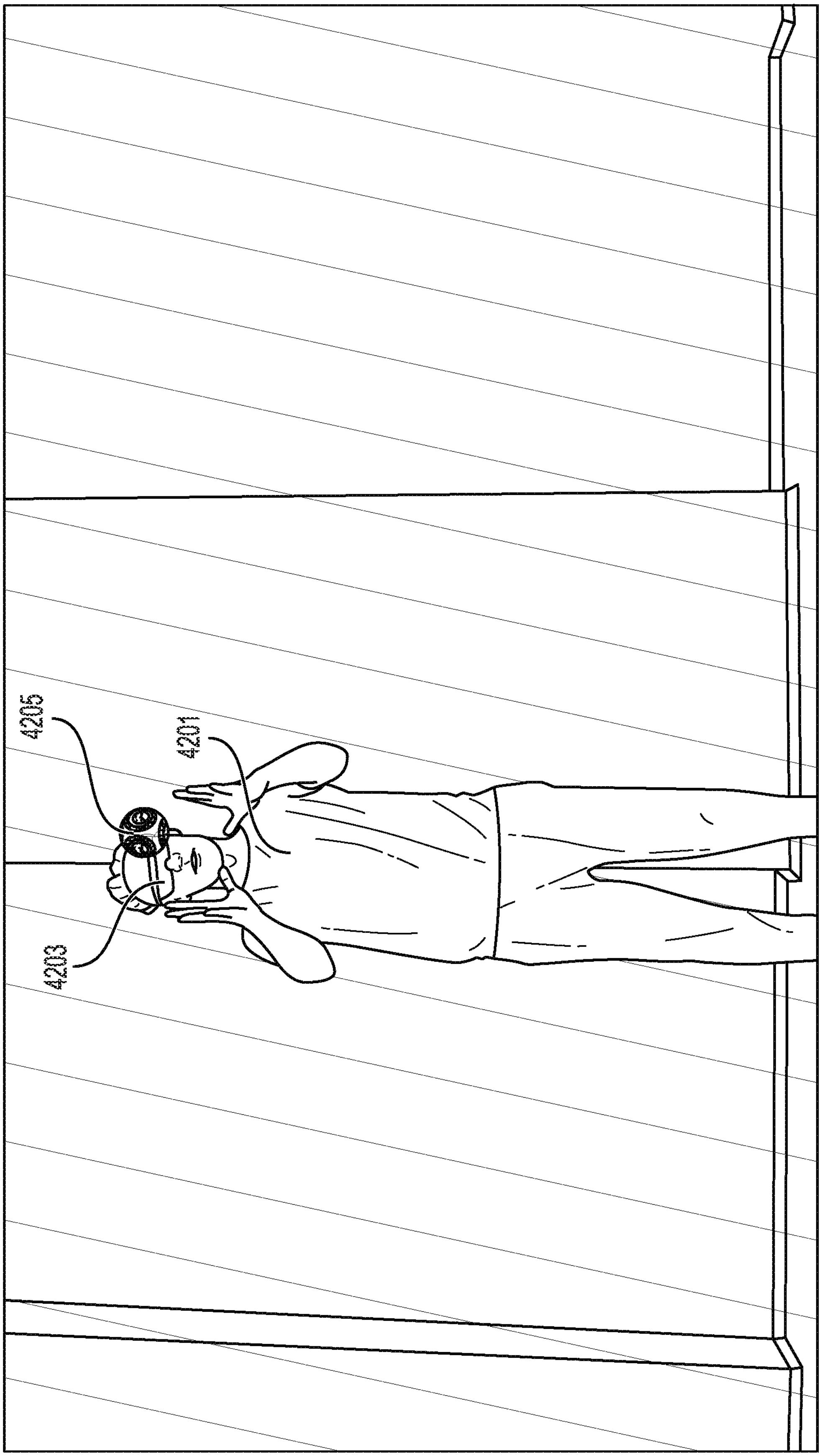
FIG. 42 is a schematic diagram showing an example of a view of a mixed reality environment wherein a user can interact with virtual content that is presented in the mixed reality environment, in accordance with embodiments of the present disclosure.

FIG. 42 illustrates a user of the mixed reality system within the mixed reality environment. For example, the user 4201 is using a mixed reality user device 4203 and is controlling a virtual object 4205. FIG. 42 may correspond to a "proximity float" where the user may create commands and suspend the virtual object 4205 in space.

Figure 43:
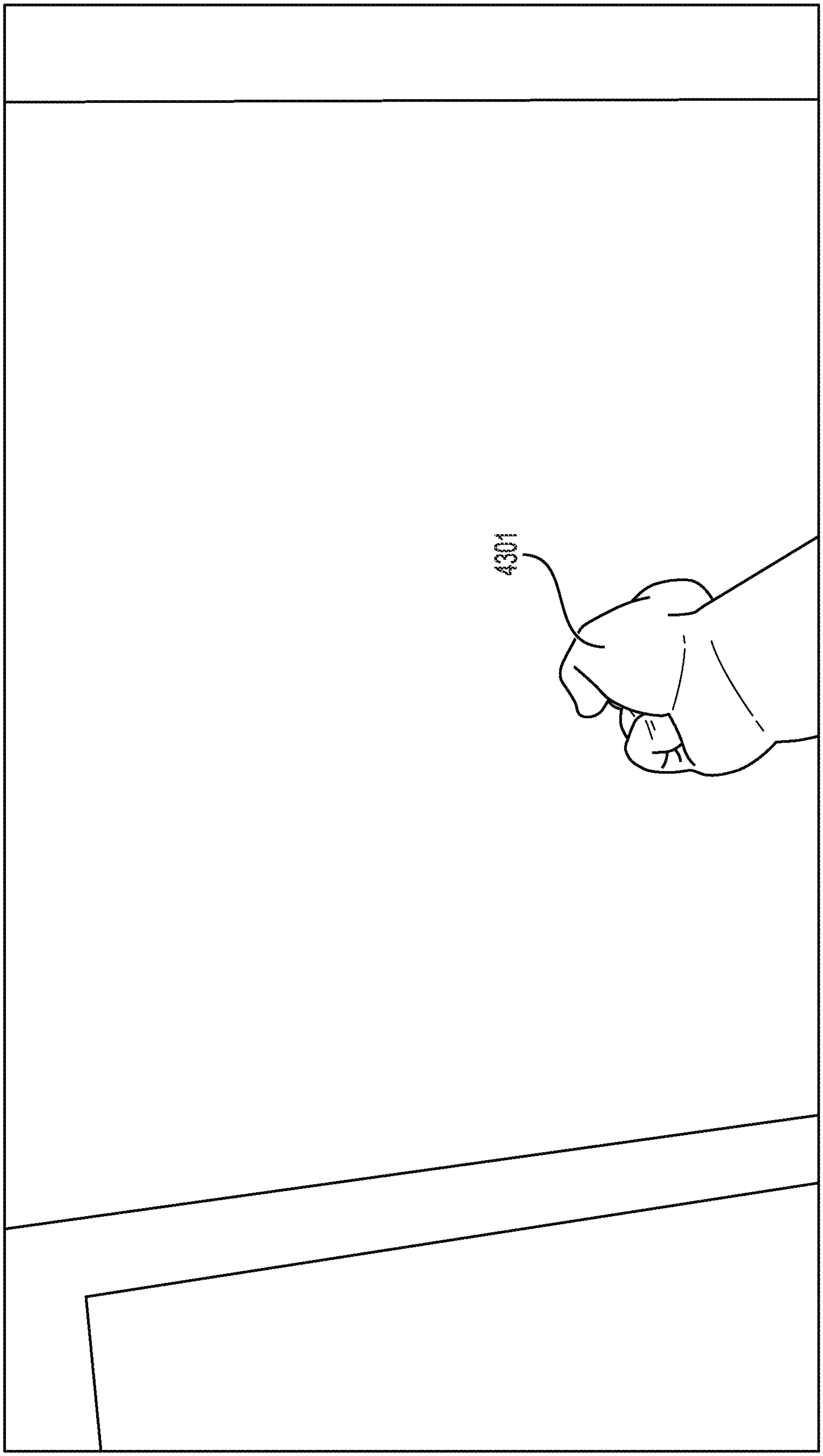
FIG. 43 is a schematic diagram showing an example of a view of a mixed reality environment wherein a user can interact with virtual content that is presented in the mixed reality environment, in accordance with embodiments of the present disclosure.

FIG. 43 illustrates a user of the mixed reality system within the mixed reality environment. For example, the user forms a gesture, a fist 4301 that may be associated with generating or spawning a virtual object.

Figure 44:
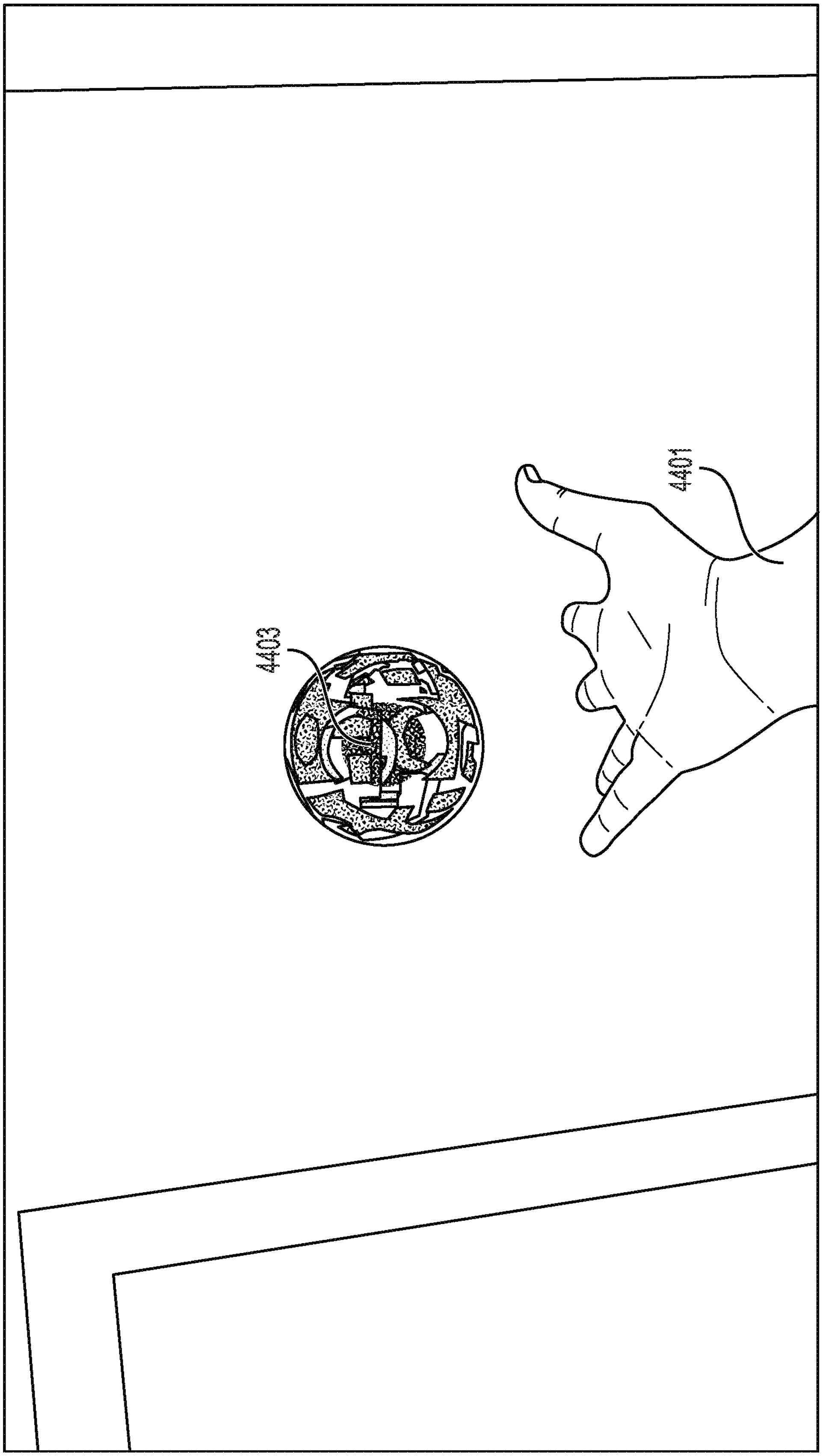
FIG. 44 is a schematic diagram showing an example of a view of a mixed reality environment wherein a user can interact with virtual content that is presented in the mixed reality environment, in accordance with embodiments of the present disclosure.

FIG. 44 illustrates a second step in how a user of the mixed reality system may generate or spawn a virtual object, when the fist 4301 in FIG. 43 is released to form an open palm gesture 4401, a virtual object 4403 may be generated within the mixed reality environment.

In some embodiments, the systems, methods and techniques described herein may utilized as a performance medium. For example, a user may perform based on their interactions with a virtual object. For example, a user may juggle a virtual object in the shape of a ball, dance with a virtual object in the shape of a balloon, and the like. In some embodiments, the virtual objects may act as if they have gravity. In another example, a performance may require the simultaneous, real-time control of secondary devices. For example, the virtual object may control parameters such as light and sound as it moves through the virtual air. The disclosed embodiments provide a highly programmable system, that offers a fine degree of control of multiple parameters, at fine scales that may be applied as presets or in a live setting.

In some embodiments, the described systems, methods and techniques may control a secondary device as part of a performance medium. For example, multiple parameters of a secondary device may be controlled using a single gesture. For example, a "swish" or "swipe" or similar sideways pass through space can send separate values corresponding to the X, Y, and Z axes and change parameters on the secondary device such as the hue, intensity, and location of lights within a set of stage lights.

In some embodiments, the disclosed systems provide advantages over conventional methods for moving virtual objects in space, by allowing hand motions to control objects within a mixed reality environment. In some embodiments, the disclosed systems provide methods and systems for controlling the movement of motorized dolly systems such as those used on film sets and at live events. For example, the disclosed systems may be used to control robotic components and dolly-systems that control full-sized digital cinema cameras. In this way, the disclosed systems may also be used to create cinematography paths that can be pre-programmed on a computer or tablet or pre-programmed using gestures in a mixed environment space. For example, a cinematographer, may move his or her hands and fingers through the set and every detail of his or her motions may be captured and sequenced as gestural data. The gestural path may be edited, adjusted, saved and copied into a camera path that can be recreated at a later time. Additionally, in some embodiments, the physical objects in the mixed reality environment can become "spatially aware" of their position within the mixed reality environment. For example, a virtual object may be assigned to the physical object and the spatial geometry or virtual map of the room may allow the system to know where the virtual object and corresponding physical object is within the environment. For example, the system may be configured to know where a dolly system is and how far it can travel before it hits a wall or furniture. In some embodiments, the system may be configured to send a warning to an operator in the mixed reality environment if the physical object is about to interact with other physical objects based on a determination of where the corresponding virtual object is.

In some embodiments, the mixed reality device may be configured to display the field of view and depth of the field cone for a camera positioned at the location in the mixed reality environment. Similarly, in some embodiments, the mixed reality device may be configured to display the focus change for a camera positioned at location within the mixed reality environment.

In some embodiments, the techniques described herein may allow for the simultaneous collaboration among mixed reality display devices of multiple users interacting with the graphical representations in the mixed reality environment. For example, multiple users can work side-by-side simultaneously in the same physical and virtual space. Further, multiple users may be able to see and manipulate the same virtual objects such as hover orbs.

In some embodiments, the server system may receive second user positional data from the mixed reality user device, where the second user positional data indicates a user requested adjustment to the virtual object. For example, a second user may indicate a second position for the virtual object that is different than what was advanced by a first user. The server system may then determine adjustment gestural data corresponding to the received second user positional data. The server system may then regenerate the virtual object to correspond to the adjustment gestural data, and have it projected back into the mixed reality environment for display by transmitting the regenerated virtual object to the mixed reality user device for display. Further, the server system may regenerate secondary device settings for the secondary device based on the adjustment gestural data and update the secondary device based on the regenerated secondary device settings. In this manner a second user can adjust both the virtual object and/or a secondary device paired with the virtual object.

In another example, multiple users can interact with the same virtual objects. For example, users may share preset virtual objects and interact with the virtual objects. Users may be able to play catch within the mixed reality environment. In particular, User A can create a virtual object or conjure an orb (which represents a preset package of data) and share it. For example, User A can conjure a specific shade of blue in the form of a virtual orb (this will be a color useful to the lighting on the set). Once this orb is conjured, User A can throw it to User B and User B can catch it (or absorb it) and now User B has that specific shade of blue as part of their arsenal in the form of a virtual orb.

In another example, multiple users can interact with the same virtual objects in a recreational activity. For example, the mixed reality environment may be configured to include a score counter, and interactions between the different wearable devices and control of the secondary devices within the mixed reality environment may result in a recreational activity. For example, in one embodiment, two users (Player A and Player B) may generate virtual objects that they then throw towards each other in the mixed reality environment (i.e., players may try to throw orbs at each other). If a virtual object makes contact with the other player, the sending player may receive points. Users may be able to generate or conjure different virtual objects or colored orbs that have different damage value and/or speeds. In some embodiments, the secondary devices may be configured to indicate whether a virtual object has been conjured and applied. For example, if a blue orb or a red orb is cast, secondary device lights may flash that color to indicate which virtual object made contact. Further, a secondary device such as a speaker may be configured to emit a noise, or a secondary device such as a smoke machine may be configured to emit smoke, when a virtual object has made contact. A player can activate a shield using different gesture such as two-handed poses (such as both hands in "peace sign" pose).

In another example, multiple users can interact with the same virtual objects in a recreational activity that is collaborative. For example, the mixed reality environment may be configured to provide a collaborative environment where two or more users may be able to play a game of catch by tapping, throwing and using virtual force to push a virtual object, for example using multi axes gestural interfaces. In some examples, as the virtual object is exchanged from one user to another, the virtual object can grow in power as represented by displaying an enhanced visual, or different setting in the virtual object. collaborative play to grow the presence and/or intensity of virtual objects. The same may be done for secondary devices.

In another example, multiple users can simultaneously interact with secondary devices within the mixed reality environment. For example, multiple users may simultaneously cast to different groupings of lights. For example, during a performance or a music video where lighting is changing by the second, User A can cast any colored orbs to Light Group A while User B casts orbs to Light Group B. In this way the lighting technicians can collaborate and receive feedback with the lights in a way that the input of the users is in response to each other.

In another example, multiple users may use the mixed reality environment to share virtual labels on physical objects. This may be particularly useful in an environment such as a film set. For example, lighting technician A can virtually "mark" a light that needs work. For example, the light could need the addition of a physical object such as diffusion material or a felt cutter (a "flag"). By laying marks through the set, lighting technician B can walk through and see what is needed to be done by looking at the virtual objects left behind by Lighting technician A. Simultaneously, lighting technician C who is on the truck with the equipment, can in real-time see a list forming of what is needed on set, and can gather the items to hand off to lighting technician B. In this way communication is in sync in physical and virtual space. This application may also be used before any lights are placed. In particular, lighting technician A could walk an empty set and drop virtual avatars for lights that will then be filled in with physical lights.

In some embodiments, the described systems and methods may be used to match colors within a mixed reality environment. For examples, users such as lighting technicians, may use the described systems to match the color of film lights, the professional LED lighting brought onto a film set, to the practical lights, the lights that already exist in a space. A user may use gestures to target a light in the physical space (a practical light), measure the color of that practical light, and capture that data in the form of a color preset. The captured color data may be visualized in the mixed reality environment as a virtual orb. The user may then send that color data in the form of the virtual orb to a film light, such that the color settings of the film light match that of the practical light. Alternatively, or additionally, the user may determine the color data for the practical light and store it for later use.

For example, the described methods and systems may use a gestural input in the form of the archer's bow described herein to match colors within a mixed reality environment. In some embodiments, if the scene being lit is on a city street at night, the user can target a street lamp to measure its color. Color may be measured by its green value, yellow value, and the like, by way of the camera on the wearable mixed reality device. In some embodiments, the wearable device may include a color meter. The color data may be used to generate a virtual object, an orb. In some embodiments, the virtual object may take on the color represented by the color data (corresponding to the measured color). In some embodiments, the generated color may also be added to a listing of preset colors made available to a user. In a further example, the user can then take that colored orb and target it to a film light (using the virtual archer's bow gesture, for example, the user can load the virtual bow with that colored orb and aim it at a film light).

For example, in a shared, multiple user environment, an audience member at a musical performance may be able to generate a colored orb or projected object (the color chosen is a reflection of the emotion of that part of the song) and on a cue throw it into the air with other audience members. On the next down beat, the system will send a message that will explode all the orbs creating a virtual fireworks display. The color value data of the user as well as a population of users projected objects may be processed to generate the stage lighting for the next part of the song. In this way, the real-world stage lighting for a section of the music has been crowd sourced by participating audience members.

In some embodiments, the disclosed mixed reality system may be used for the control of virtual objects and/or secondary objects. For example, the mixed reality system may include a gestural control system capable of multi-layered control of virtual objects and/or secondary objects using one or more gestures. For example, when a user's palms are open, the minimum and maximum position of the hands may be mapped and correspond to the maximum and minimum parameter values. For example, palms distanced far apart may correspond to the maximum value of a parameter of the secondary device setting or virtual object device setting. Palms close together may correspond to a minimum value of the parameter settings. A separate gesture, such as double fists, may be used to a select the particular value once the distance between the palms sets a tentative range. In combination, the gestures of an open palm followed by a closed fist may be used to select a broader value range of parameter settings. The user's selection of the parameter value may then be fine-tuned by switching to a separate set of gestures such as a pointer finger up gesture. The pointer finger up gesture may be used to "zoom in." Without the need for an intermediary gesture, the disclosed system provides increased fluidity to a user.

For example, using a first gesture control in the form of the distance between palms, a user may select a range between 60 and 70. Then using a second gesture control in the form of the pointer finger, the user may select a fine value, for example 66.7. In this manner, parameter settings may be set at fine resolutions using the mixed reality system.

Same or different broad gestures may be used to select parameters and navigate settings options for the mixed reality environment, including for example, parameters and settings of the mixed reality user device.

The described mixed reality system may utilize gesture-based control. To that end, the disclosed systems may include systems and methods for minimizing false positives.

A first method for reducing false positives and cross-talk may include gesture prioritization. For example, the system may be configured to prioritize gestures based on the degree of difficulty for the sensors, which may be indicative of the probability that the sensors will recognize the gesture accurately. In some embodiments, a higher priority may be given to gesture that requires more finger or hand articulation, than a gesture where the hand or limb is in a more relaxed state.

A second method for reducing false positives and cross-talk may include gesture masking. For example, the system may be configured to track recent user commands and prioritize families of gestures based on the past user commands and expected future user commands. For example, when the application first loads, the only gesture available may be a "Thumbs Up" gesture that may be used to select a light (selection mode) for subsequent gestures to act on, and the system may be blind to any other gestures. Then, once a light is selected, the system is in control mode and the sensor stops looking for Thumbs Up but is instead waiting for Palms Up (for broad control), Pointers Up (for fine control), or Double Fists (to deselect and return to the previous mode).

In some embodiments, gesture masking may also extend to masking of hands. For example, in control mode, the hand tracker is idle until it sees two hands, because all control poses require two hands. Conversely when in selection mode, the tracker is idle until it sees only one hand, because all selection operations require only one hand (making the "ThumbsUp" gesture). This single hand requirement drastically cuts down on false positives. If there are two hands present, the gesture may not register.

A third method for reducing false positives and cross-talk may include a gesture buffer. Users of the mixed reality device may not be precise with their gestures, or the tracking sensors may not accurately be able to track a gesture, both of which may cause misreadings. To mitigate the impact of misreadings, the disclosed systems may include a gesture buffer where the system disregards the recognition or termination of a gestural pose for a preselected amount of time. Examples of the preselected time may be between 0.5 and 0.7 seconds.

It should be appreciated that the above-described subject matter can be implemented as a computer-controlled apparatus, a computer process, a computing system, or as an article of manufacture such as a computer-readable storage medium.

Although separate software applications are stated, it is envisioned that one or more of the functionalities described above may be combined or separated into any number of software applications. In the embodiments described herein, controlling object operations may be visually (e.g., virtually) rendered or projected in a display of a mixed or virtual reality system. Moreover, these functions or operations may be visually applied to real objects or virtual objects displayed in the mixed or virtual reality system.

In some embodiments, two or more users in a mixed reality environment may collaborate with one another and/or with virtual content that is presented in the mixed reality environment. The techniques described herein can enhance mixed reality collaborations between users in mixed reality environments. In at least one example, the techniques may be directed to mixed reality social collaborations between two or more users who are physically located in a same real scene. The techniques described herein can have various applications, including but not limited to, enabling users that are located in a same real scene to share virtual content and/or interact with the virtual content in a mixed reality environment via mixed reality display devices. The techniques described herein enable enhanced user interfaces to be presented on displays of mixed reality devices thereby enhancing mixed reality collaborations between users and the mixed reality experience.

While the above detailed description has shown, described, and pointed out features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

The invention claimed is:

1. A system comprising:

a server comprising at least one processor programmed to perform steps comprising:

detecting movement data for a user of an extended reality user device;

updating a configuration of an external device based on the detected movement data at least in part by modifying a color of the external device; and modifying one or more characteristics of a virtual object displayed by the extended reality user device based on the updated configuration of the external device by modifying an appearance of the virtual object based on the color of the external device.

2. The system of claim 1, wherein the external device comprises one or more light emitting diodes, and wherein the configuration of the external device includes device settings comprising at least one of color, brightness, hue, saturation, luminosity, focus, ultraviolet channel, strobe, red channel, blue channel, green channel, white channel, amber channel, pan, tilt, roll, magnetometer, ambient light, heat, and intensity.

3. The system of claim 1, wherein the at least one processor is further programmed to:

receive second movement data from the extended reality user device, wherein the second movement data indicates a user requested adjustment to the virtual object;

determine adjustment movement data corresponding to the received second movement data; and regenerate the virtual object to correspond to the adjustment movement data.

4. The system of claim 1, wherein the at least one processor is further programmed to:

generate one or more pre-configured virtual objects for display by the extended reality user device, wherein each of the pre-configured virtual objects corresponds to a parameter of the external device; and update the external device based on the parameter corresponding to the pre-configured virtual object responsive to the virtual object interacting with the one or more pre-configured virtual objects in the extended reality environment generated by the extended reality user device.

5. The system of claim 1, wherein the virtual object comprises an orb.

6. The system of claim 1, wherein the movement data further corresponds to pose of a user's hand.

7. The system of claim 1, wherein the virtual object comprises a virtual overlay of the external device.

8. The system of claim 7, wherein the virtual object comprises a virtual path between the extended reality user device and the virtual overlay.

9. A method comprising:

detecting movement data for a user of an extended reality user device;

updating a configuration of an external device based on the detected movement data at least in part by modifying a color of the external device; and modifying one or more characteristics of a virtual object displayed by the extended reality user device based on the updated configuration of the external device by modifying an appearance of the virtual object based on the color of the external device.

10. The method of claim 9, wherein the external device comprises one or more light emitting diodes, and wherein the configuration of the external device includes device settings comprising at least one of color, brightness, hue, saturation, luminosity, focus, ultraviolet channel, strobe, red channel, blue channel, green channel, white channel, amber channel, pan, tilt, roll, magnetometer, ambient light, heat, and intensity.

11. The method of claim 9, further comprising:

receive second movement data from the extended reality user device, wherein the second movement data indicates a user requested adjustment to the virtual object;

determine adjustment movement data corresponding to the received second movement data;

regenerate the virtual object to correspond to the adjustment movement data.

12. The method of claim 9, further comprising:

generate one or more pre-configured virtual objects for display by the extended reality user device, wherein each of the pre-configured virtual objects corresponds to a parameter of the external device; and update the external device based on the parameter corresponding to the pre-configured virtual object responsive to the virtual object interacting with the one or more pre-configured virtual objects in the extended reality environment generated by the extended reality user device.

13. The method of claim 9, wherein the virtual object comprises an orb.

14. The method of claim 9, wherein the movement data further corresponds to pose of a user's hand.

15. The method of claim 9, wherein the virtual object comprises a virtual overlay of the external device.

16. The method of claim 15, wherein the virtual object comprises a virtual path between the extended reality user device and the virtual overlay.

* * * * *